(12) United States Patent
Kawahira et al.

(10) Patent No.: US 7,304,256 B2
(45) Date of Patent: Dec. 4, 2007

(54) SEATING DETECTION SWITCH

(75) Inventors: Tetsuya Kawahira, Sakura (JP); Takahiro Ishii, Sakura (JP); Mikihito Kojima, Wako (JP); Toyohiko Shindo, Wako (JP); Naotaka Kumakiri, Wako (JP); Masashi Yoshifuku, Wako (JP); Takashi Furukawa, Wako (JP); Nobuhiro Koyota, Wako (JP); Tsutomu Terasaki, Wako (JP)

(73) Assignees: Fujikura Ltd., Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/557,420

(22) PCT Filed: May 19, 2004

(86) PCT No.: PCT/JP2004/007131

§ 371 (c)(1),
(2), (4) Date: Nov. 18, 2005

(87) PCT Pub. No.: WO2004/105065

PCT Pub. Date: Dec. 2, 2004

(65) Prior Publication Data

US 2006/0278513 A1 Dec. 14, 2006

(30) Foreign Application Priority Data

May 20, 2003 (JP) ............................. 2003-141513
Jun. 25, 2003 (JP) ............................. 2003-180632

(51) Int. Cl.
*H01H 13/00* (2006.01)

(52) U.S. Cl. .................... 200/85 A; 200/85 R; 200/512

(58) Field of Classification Search ............. 200/85 A, 200/86 R, 512, 514, 515; 297/217.3, 180.1, 297/180.12

See application file for complete search history.

(56) References Cited

U.S. PATENT DOCUMENTS

| 3,718,791 | A | * | 2/1973 | Szablowski | ............... 200/85 A |
| 3,840,849 | A | * | 10/1974 | Lohr | ................... 200/61.58 B |
| 3,859,485 | A | * | 1/1975 | Blinkilde et al. | ......... 200/85 A |
| 6,392,178 | B1 | * | 5/2002 | Kuratani | ..................... 200/512 |
| 6,794,590 | B2 | * | 9/2004 | Federspiel | ................ 200/85 R |

FOREIGN PATENT DOCUMENTS

| JP | 09-315199 A | 12/1997 |
| JP | 11-297153 A | 10/1999 |
| JP | 2000-222981 A | 8/2000 |
| JP | 2000-348564 A | 12/2000 |
| JP | 2001-116636 A | 4/2001 |

* cited by examiner

*Primary Examiner*—Elvin Enad
*Assistant Examiner*—M. Fishman
(74) *Attorney, Agent, or Firm*—Sughrue Mion, PLLC

(57) ABSTRACT

A thin, film-form seating switch able to detect whether an occupant sits on the seat or not, wherein, with a spacer (5) in-between, a film-form substrate (3) is disposed on one surface of the spacer and a film-form member (7) on the other surface, a first conductor (13) equipped with a first terminal (9) and a first electrode (11A) conductive with this and a second conductor (19) equipped with a second terminal (15) and a second electrode (17A) conductive with this are fixed to one surface of the film-form substrate, and a third conductor (21A) for letting the first electrode conduct with the second electrode when an occupant is seated is fixed to the film-form member (7). The above arrangement solves a conventional problem that it is troublesome to connect the connection terminals of wires or the like provided on a wiring harness or the like to respective terminals that are separately provided on a film-form substrate and a film-form member.

9 Claims, 45 Drawing Sheets

SEATING DETECTION SWITCH

TECHNICAL FIELD

The present invention relates to a seating detection switch for detecting whether or not a person has sat down in a seat, and more specifically, the present invention relates to a film-form seating detection switch providing a three layer construction of a film-form substrate, a film-form spacer and a film-form member superposed in this order.

BACKGROUND ART

Conventional film-form seating detection switches are known which are capable of detecting when a person has sat down in a seat, disclosed in for example Japanese Unexamined Patent Publication No. 9-315199 and Japanese Patent Publication No. 2909961. Such conventional seating detection switches comprise one electrode fixed to one surface of one film of a pair of films, electrically connected via one wire, another electrode fixed to the surface of the other film of the pair of films opposing the surface of the first film, electrically connected via one wire, and a spacer arranged between both those films such that these two electrodes are normally separated and in mutual opposition. In this arrangement, if a person sits down in a seat on which such a seating detection switch is disposed, the opposing electrodes come into contact thereby becoming conductive, in response to the weight of the sitting person.

FIG. 1 is a schematic view of the structure of a conventional seating detection switch 300. FIG. 2 is a cross-sectional view of the seating detection switch 300 of FIG. 1 along the line II-II.

As shown in FIG. 2 this conventional seating detection switch 300 comprises an insulating, film-form spacer 304 interposed between a film-form substrate 302 arranged on one of the surfaces of the spacer 304 and a film-form member 306 arranged on the other surface of the spacer 304.

This conventional seating detection switch 300 is used arranged at the rear side of the surface covering of a seat in which a person can sit down. This switch 300 is thus used as a seating detection device that operates in response to the body weight of a passenger that sits down in the seat to detect whether or not the passenger is seated in the seat.

FIG. 3 is a schematic view of the structure of the film-form substrate 302 forming the conventional seating detection switch 300. As shown in FIG. 2 and FIG. 3, on the surface of the film-form substrate 302 facing the film-form member 306 (the inner side surface), a plurality of contact points 308A-308D are each disposed mutually separated, in order to detect the seating of a passenger in the seat.

As shown in FIG. 3, these contact points 308A-308D are electrically connected to each other via a conductive wire (conduction route) 310 that is wired on the inner side surface. A first terminal 312 is disposed at one end of the wire 310, acting to connect this conventional seating detection switch 300 to another electronic device (for taking signals from the seating detection switch).

The wire 310 is disposed separating into a plurality of branches in the direction moving away from the terminal 312. Each of the contacts 308A-308D are disposed over the wiring, extending along the wiring branches (refer to FIG. 3).

FIG. 4 is a schematic view of the structure of the spacer 304 forming the conventional seating detection switch 300. This spacer 304 is of the same form as the film-form substrate 302 and provides a plurality of openings 320A-320D. Each of these openings 320A-320D is disposed in a position that corresponds to the respective positions at which the contacts 308A-308D are disposed.

FIG. 5 is a schematic view of the structure of the film-form member 306 comprising a conventional seating detection switch 300. This film-form member 306 is of the same form as the film-form substrate 302. A plurality of contacts 314A-314D that correspond to each of the contacts 308A-308D and each of the openings 320A-320D are disposed on the surface of the film-form member 306 facing the film-form substrate 302 (the inner side surface). Further, on that inner side surface in the same manner as the film-form substrate 302, are disposed a conductive wire (conduction route) 316 and a second terminal 318 for taking signals from the seating detection switch (refer to FIGS. 2 and 5).

FIG. 6 is a circuit diagram of the conventional seating detection switch 300. The contacts 314A-314D and the corresponding contacts 308A-308D are normally spaced apart by the spacer 304. When a passenger sits down in the seat, the film-form substrate 302 and film-form member 306 bend, the contacts 314A-340D and the corresponding contacts 308A-308D (for example contact 308A to contact 314A) contact each other, and the first terminal 312 and second terminal 318 enter a condition of mutual electrical conduction (in other words, they are connected), thereby enabling the seating of the passenger to be detected.

In the conventional seating detection switch the surface on which one of the electrodes is formed is taken as the front surface and the surface on which the other electrode is formed is the rear surface. One of the terminals connected by an electrical wire to one of the electrodes is disposed on the front surface of this conventional seating detection switch, while the other terminal connected by an electrical wire to the other electrode is disposed on the rear surface of this conventional seating detection switch.

In this way, as one of the terminals is disposed on the opposite surface to the other terminal, after a connection terminal of an electrical wire provided by a wiring harness or the like is connected to one of the terminals, it becomes necessary, in the case of this conventional seating detection switch, that the switch be turned over to enable a connection to be made to the other terminal. Thus, a problem arises in that it is troublesome to connect a connection terminal of an electrical wire (signal wire) provided by a wiring harness to each of the terminals.

Further, when a conventional seating detection switch is installed for example on a seat and a person sits down in the seat, a part of the conventional switch (e.g. the part in the vicinity of the seat back of the seat) is substantially curved.

As the conventional seating detection switch has a triple layer construction consisting of a film pairing with a spacer disposed therebetween, significant stress arises inside the seating detection switch in the parts subject to such curving and this may cause the switch to sustain damage.

Moreover, the conventional seating detection switch 300 is configured such that in any single contact pairing comprised of the contacts 308A-308D with the corresponding contacts 314A-314D (e.g. the contact pairing formed by contact 308A and 314A), if the opposing contacts of the pair come into contact with each other the first terminal 312 and second terminal 318 enter a condition of electrical conduction.

Accordingly, a problem arises due to concern about the switch incorrectly detecting that a person has sat down in the seat if for example the edge of some luggage is positioned over a single contact pairing causing the contacts of that contact pairing to come into contact with each other, even though a person has not actually sat down in the seat.

DISCLOSURE OF INVENTION

With the foregoing in view, in order to solve the above described problems it is an object of the present invention to provide a thin film-form seating detection switch capable of detecting whether or not a passenger is seated in a seat, wherein the connection terminals of electrical wires or the like provided by a wiring harness for example is simply connected to the respective terminals of this seating detection switch.

It is a further object of the present invention to provide a thin film-form seating detection switch capable of detecting whether or not a passenger is seated in a seat, wherein even if the seat is substantially bent to curve, the substantially curved part does not easily sustain damage.

A still further object of the present invention is to provide a film-form seating detection switch for detecting whether or not a person is seated in a seat, in which erroneous detections of the seating of a person are substantially prevented.

In order to achieve the above objects, according to one aspect of the present invention, a thin film-form seating detection switch capable of detecting whether or not a passenger is seated in a seat is provided, which comprising: a film-form substrate made of insulating material; a first conductor fixed to one of the surfaces of the film-form substrate, including a first terminal at one end and a first electrode at the other end; a second conductor fixed to said one of the surfaces of the film-form substrate including a second terminal at one end and a second electrode at the other end, said second conductor being insulated from said first conductor; a film-form member disposed on said one of the surfaces of the film-form substrate, said film-form member being slightly removed from the film-form substrate via a spacer and substantially parallel to the film-form substrate; and a third conductor fixed to the surface of the film-form member facing the film-form substrate, wherein when a passenger sits down in a seat on which the seating detection switch is provided, at least one of a part of the film-form substrate and a part of the film-form member bends due to the weight of the passenger, and the first electrode and the second electrode enter a condition of mutual conductivity via the third conductor.

According to another aspect of the invention, the seating detection switch is provided, wherein the first terminal and the second terminal are disposed in mutual proximity and the film-form substrate is formed in continuity between said terminals.

According to another aspect of the invention, the seating detection switch is provided, wherein a part of seating detection switch that curves substantially when a passenger sits down in the seat is reinforced.

According to another aspect of the invention, the seating detection switch is provided, wherein the part that curves substantially is reinforced by removing the spacer and the film-form member from the part that curves substantially and providing an insulating, thin resistance layer on the surface of the film-form substrate on which the first and second conductors are disposed so as to cover the first conductor and the second conductor.

According to another aspect of the invention, the seating detection switch is provided, wherein the resistance layer enters in slightly between the spacer and the film-form substrate.

According to another aspect of the invention, the seating detection switch is provided, wherein the surface of the resistance layer is covered with a flexible, thin, film-form protective tape.

According to another aspect of the invention, the seating detection switch is provided, wherein a plurality of first electrodes are formed toward said other end of the first conductor, a plurality of second electrodes corresponding to the plurality of first electrodes are formed toward said other end of the second conductor, and a plurality of third conductors are formed on the film-form member corresponding to the first electrodes and the second electrodes thereby forming an OR circuit.

According to another aspect of the invention, the seating detection switch is provided, wherein a plurality of first electrodes are formed toward said other end of the first conductor, a plurality of second electrodes corresponding to the plurality of first electrodes are formed toward said other end of the second conductor, and a plurality of third conductors are formed on the film-form member corresponding to the first electrodes and the second electrodes thereby forming an AND circuit.

According to another aspect of the invention, a thin, film-form seating detection switch that is arranged at the rear side of the cover of a seat is provided, which internally providing a plurality of contacts each of which is conductive with the respective corresponding terminal of a plurality of terminals, that can detect whether or not a passenger is seated in the seat by detecting whether or not the contacts are mutually conducting, wherein the terminals are disposed on one of the surfaces of the film-form seating detection switch.

According to another aspect of the invention, a thin, film-form seating detection switch capable of detecting whether or not a passenger is seated in a seat is provided, which comprising: a film-form substrate made of insulating material; a first conductor fixed to one of the surfaces of the substrate, including a first terminal at one end and a first electrode at the other end; a film-form member made of insulating material, disposed on said one of the surfaces of the substrate, and slightly removed from the substrate via a spacer and substantially parallel to the substrate; a third conductor fixed to the surface of the member facing the substrate, including a fourth electrode at one end and a third electrode at the other end; and a second conductor fixed to said one of the surfaces of the substrate, including a second terminal at one end and a second electrode at the other end that is conductive with the third electrode of the third conductor, said second conductor being insulated from the first conductor and being conductive with the second electrode, wherein when a passenger sits down in a seat on which the seating detection switch is provided, at least one of a part of the substrate and a part of the member bends due to the weight of the passenger, and the first electrode and the fourth electrode enter a condition of mutual conductivity.

According to another aspect of the invention, a seating detection switch is provided, which comprising a film-form substrate, a planar spacer, a film-form member, and a first terminal and a second terminal, in which the film-form substrate and the film-form member are disposed parallel and mutually spaced apart, the spacer is interposed therebetween, such that when a passenger sits down in a seat on which the seating detection switch is provided, at least one of a part of the film-form substrate and a part of the film-form member bends due to the weight of the passenger, and the first terminal and the second terminal enter a condition of mutual conductivity, wherein instead of the spacer, double-sided tape that is thinner than the spacer is provided at the part that curves substantially due to the action of a passenger sitting down.

According to another aspect of the invention, the seating detection switch is provided, which comprising: a first conductor fixed to one of the surfaces of the film-form substrate of insulating material, including a first terminal at one end and a first electrode at the other end; and a second conductor fixed to one of the surfaces of the film-form member of insulating material, including a second terminal at one end and a second electrode at the other end, wherein when a passenger sits down in a seat on which the seating detection switch is provided the first electrode and the second electrode come into mutual contact and the first terminal and the second terminal enter a condition of mutual conductivity.

According to another aspect of the invention, the seating detection switch is provided, which comprising: a first conductor fixed to one of the surfaces of the film-form substrate of insulating material, including a first terminal at one end and a first electrode at the other end; a second conductor fixed to said one of the surfaces of the film-form substrate, including a second terminal at one end and a second electrode at the other end, said second conductor being insulated from the first conductor; and a third conductor fixed to said one of the surfaces of the film-form substrate, wherein the first terminal and the second terminal are disposed in mutual proximity, and the film-form substrate is formed in continuity, disposed between these two terminals, when a passenger sits down in a seat on which the seating detection switch is provided the first electrode and the second electrode come into mutual contact via the third conductor, and the first terminal and the second terminal enter a condition of mutual conductivity.

According to another aspect of the invention, the seating detection switch is provided, wherein the double sided tape is formed of a flexible nonwoven fabric, impregnated with an adhesive agent, or is formed simply of an adhesive agent.

According to another aspect of the invention, film-form seating detection switch constructed having a film-form spacer interposed, a film-form substrate arranged on one surface of the spacer, and a film-form member arranged on the other surface of the spacer is provided, which comprising: a first terminal provided in the seating detection switch; a second terminal provided in the seating detection switch spaced apart from the first terminal; a first contact arrangement including an appropriate number of contacts that are electrically conductive with the first terminal disposed on the surface of the film-form substrate facing the film-form member; a second contact arrangement including an appropriate number of contacts that are electrically conductive with the second terminal disposed on the film-form substrate surface facing the film-form member substantially apart from the first contact arrangement; a third contact arrangement including an appropriate number of contacts arranged opposing the respective contacts of the first contact arrangement, disposed on the film-form member surface facing the film-form substrate, so as to be capable of coming into contact with the respective contacts; and a fourth contact arrangement including an appropriate number of contacts arranged opposing the respective contacts of the second contact arrangement, disposed on the film-form member surface facing the film-form substrate, so as to be capable of coming into contact with the respective contacts, wherein the appropriate contacts of the third contact arrangement and the appropriate contacts of the fourth contact arrangement become directly, mutually conductive or become mutually conductive via another contact arrangement provided on the film-form substrate and/or the film-form member.

According to another aspect of the invention, the seating detection switch is provided, wherein all of the contacts of the third contact arrangement and the fourth contact arrangement are mutually, electrically conductive.

According to another aspect of the invention, the seating detection switch is provided, wherein some of the contacts of the third contact arrangement and some of the contacts of the fourth contact arrangement are mutually, electrically conductive, while the remainder of the contacts of the third contact arrangement and the remainder of the contacts of the fourth contact arrangement are mutually, electrically conductive.

According to another aspect of the invention, the seating detection switch is provided, comprising: a fifth contact arrangement including an appropriate number of contacts disposed on the film-form substrate surface facing the film-form member, substantially apart from the first contact arrangement and the second contact arrangement; a sixth contact arrangement including an appropriate number of contacts disposed on the film-form substrate surface facing the film-form member, substantially apart from the first contact arrangement, the second contact arrangement and the fifth contact arrangement; a seventh contact arrangement including an appropriate number of contacts disposed on the film-form member surface facing the film-form substrate, opposing the respective contacts of the fifth contact arrangement, so as to be capable of coming into contact with the respective contacts; and an eighth contact arrangement including an appropriate number of contacts disposed on the film-form member surface facing the film-form substrate, opposing the respective contacts of the sixth contact arrangement, so as to be capable of coming into contact with the respective contacts, wherein all of the contacts of the fifth contact arrangement and the sixth contact arrangement are mutually, electrically conductive, all of the contacts of the third contact arrangement and the seventh contact arrangement are mutually, electrically conductive, and all of the contacts of the fourth contact arrangement and the eighth contact arrangement are mutually, electrically conductive.

According to another aspect of the invention, the seating detection switch is provided, comprising: a fifth contact arrangement including an appropriate number of contacts disposed on the film-form member surface facing the film-form substrate substantially apart from the third contact arrangement and the fourth contact arrangement; a sixth contact arrangement including an appropriate number of contacts disposed on the film-form member surface facing the film-form substrate corresponding to but just apart from the respective contacts of the fifth contact arrangement; and a seventh contact arrangement having an appropriate number of contacts disposed on the film-form substrate surface facing the film-form member opposing respectively, each of an appropriate number of contact pairs comprised of each of the contacts of the fifth contact arrangement and each of the contacts of the sixth contact arrangement, so as to be capable of coming into contact with each of those contact pairs, wherein all of the contacts of the third contact arrangement and the fifth contact arrangement are mutually, electrically conductive and all of the contacts of the fourth contact arrangement and the sixth contact arrangement are mutually, electrically conductive.

According to another aspect of the invention, film-form seating detection switch having a film-form spacer interposed, a film-form substrate arranged on one surface of the spacer and a film-form member arranged on the other surface of the spacer is provided, which comprising: a first terminal provided in the seating detection switch; a second terminal provided in the seating detection switch spaced apart from the first terminal; a first contact arrangement including an appropriate number of contacts that electrically connect to the first terminal, disposed on the film-form substrate surface facing the film-form member; a second contact arrangement including an appropriate number of contacts that electrically connect to the second terminal, disposed on the film-form substrate surface facing the film-form member, substantially apart from the first contact arrangement; a third contact arrangement including an appropriate number of contacts disposed on the film-form substrate surface facing the film-form member, corresponding to but just apart from the respective contacts of the first contact arrangement; a fourth contact arrangement including an appropriate number of contacts disposed on the film-form substrate surface facing the film-form member, corresponding to but just apart from the respective contacts of the second contact arrangement; a fifth contact arrangement including an appropriate number of contacts disposed on the film-form member surface facing the film-form substrate, opposing respectively, an appropriate number of contact pairs comprised of each of the contacts of the first contact arrangement and each of the contacts of the third contact arrangement, so as to be capable of coming into contact with the respective contact pairs; and a sixth contact arrangement including an appropriate number of contacts disposed on the film-form member surface facing the film-form substrate opposing respectively, an appropriate number of contact pairs comprised of each of the contacts of the second contact arrangement and each of the contacts of the fourth contact arrangement, so as to be capable of coming into contact with the respective contact pairs, wherein the appropriate contacts of the fifth contact arrangement and the appropriate contacts of the sixth contact arrangement are directly, electrically conductive or are mutually, electrically conductive via another contact arrangement provided on the film-form substrate and/or the film-form member.

According to another aspect of the invention, the seating detection switch is provided, wherein all of the contacts of the third contact arrangement and the fourth contact arrangement are mutually, electrically conductive.

According to another aspect of the invention, the seating detection switch is provided, wherein some of the contacts of the third contact arrangement and some of the contacts of the fourth contact arrangement are mutually, electrically conductive, while the remainder of the contacts comprising the third contact arrangement and the remainder of the contacts comprising the fourth contact arrangement are mutually, electrically conductive.

BEST MODE FOR CARRYING OUT THE INVENTION

Figure 1:
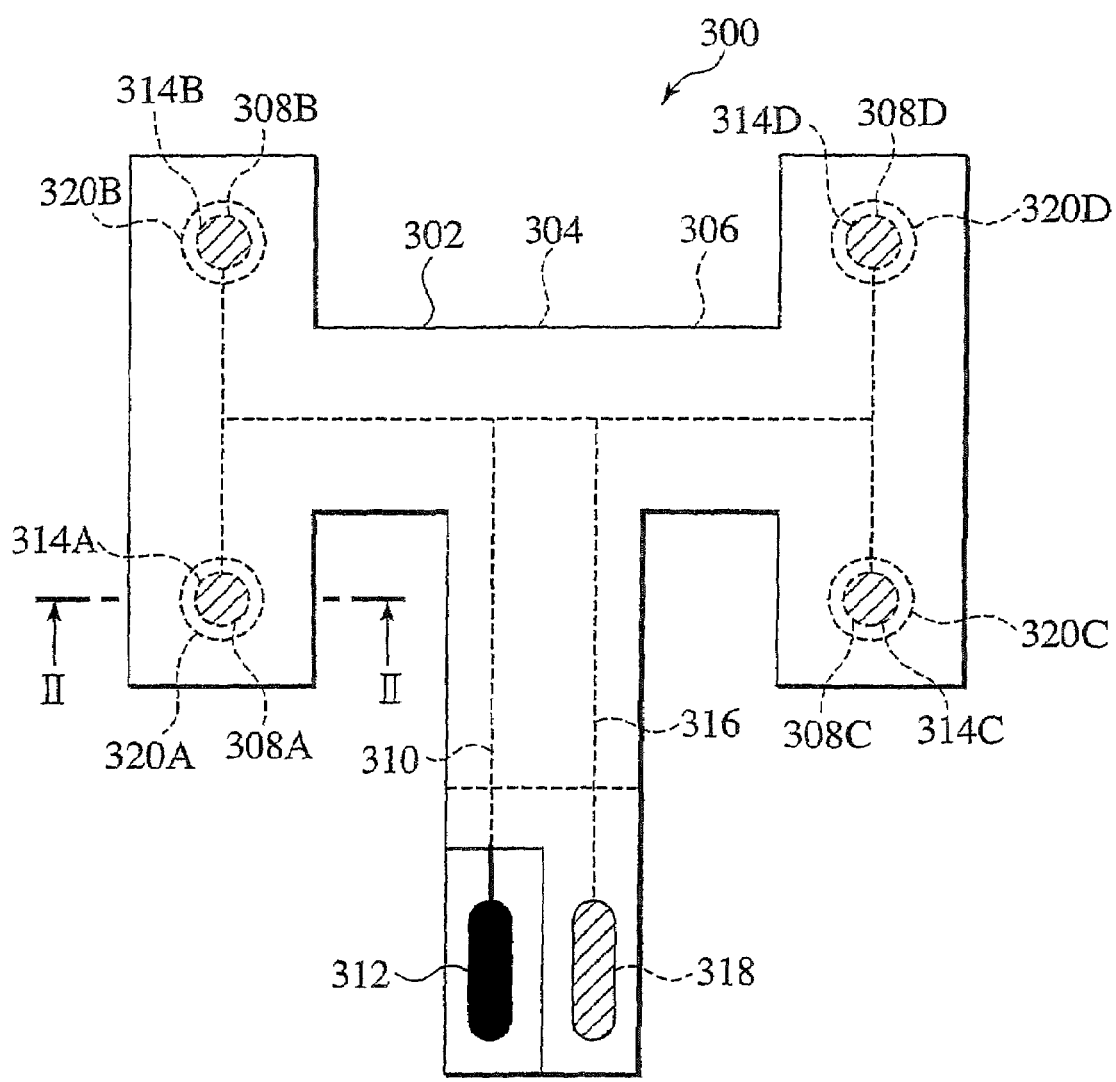
FIG. 1 is a schematic view of a conventional seating detection switch.

Exemplary embodiments of the invention will now be described with reference to the accompanying drawings. In these drawings, like reference numerals identify like elements.

First Embodiment

Figure 7:
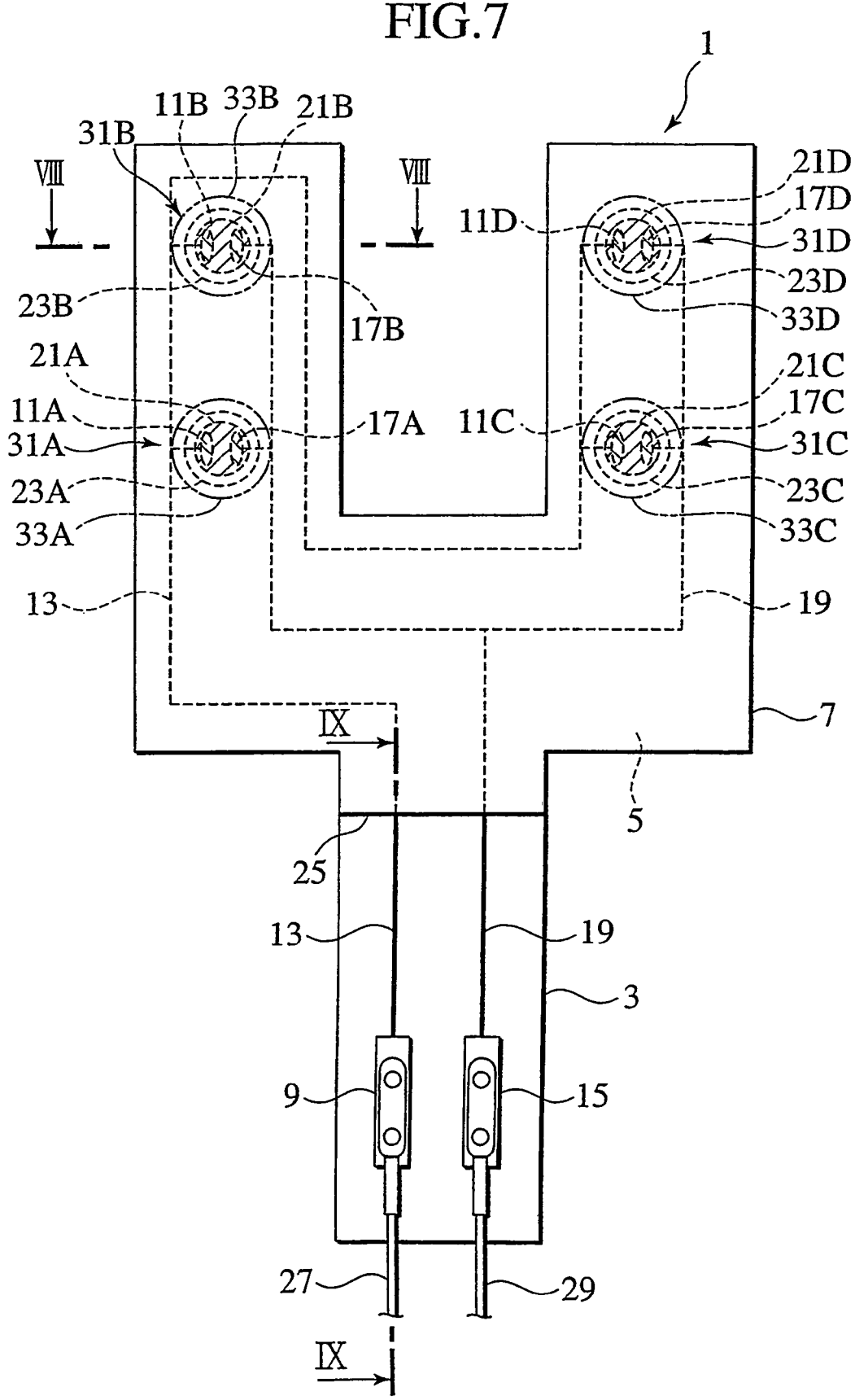
FIG. 7 is a schematic view of a seating detection switch according to a first embodiment of the present invention.
Figure 8:
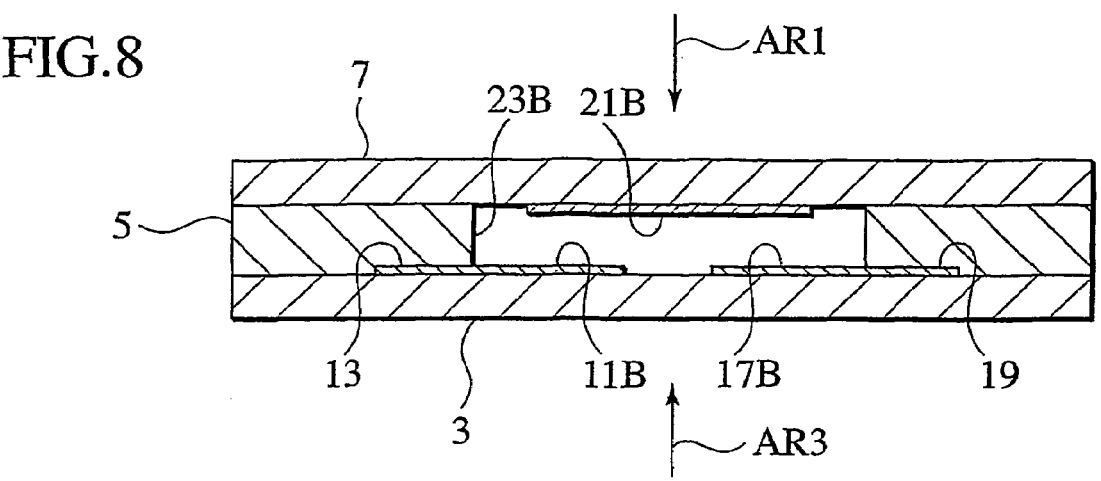
FIG. 8 is a cross-sectional view along the line VIII-VIII of FIG. 7.
Figure 9:
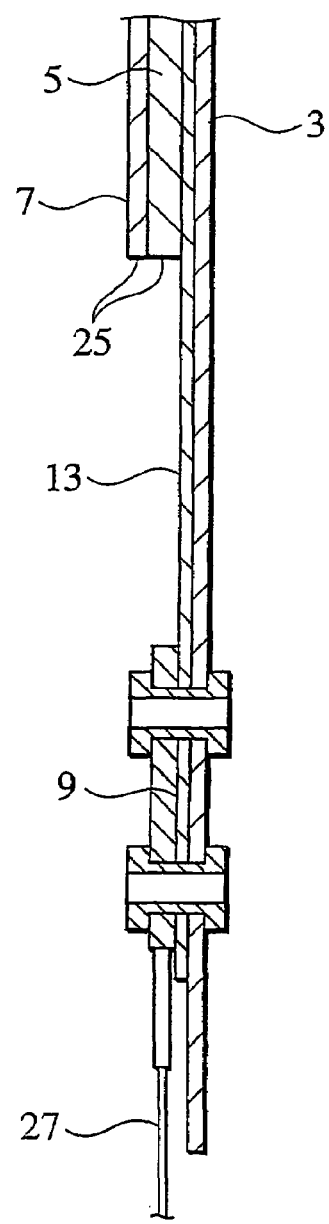
FIG. 9 is a cross-sectional view along the line IX-IX of FIG. 7.

FIG. 7 schematically depicts a seating detection switch according to a first embodiment of the present invention. FIG. 8 is a cross-sectional view along the line VIII-VIII of FIG. 7. FIG. 9 is a cross-sectional view along the line IX-IX of FIG. 7. In FIG. 8 and FIG. 9 the seating detection switch 1 is drawn expanded in the direction of the thickness thereof (in FIG. 8 the vertical direction and in FIG. 9 a horizontal direction).

The seating detection switch 1 is arranged for example on the rear side of the covering of the seat of a car, and provides a thin, film-form seating detection switch capable of detecting whether or not a passenger is sitting in the seat.

The seating detection switch 1 comprises a film-form substrate 3 made of insulating material. A film-form member 7 made of insulating material is disposed over one of the surfaces of the film-form substrate 3, substantially parallel to and just apart from the film-form substrate 3, via a spacer 5 made of insulating material.

Figure 10:
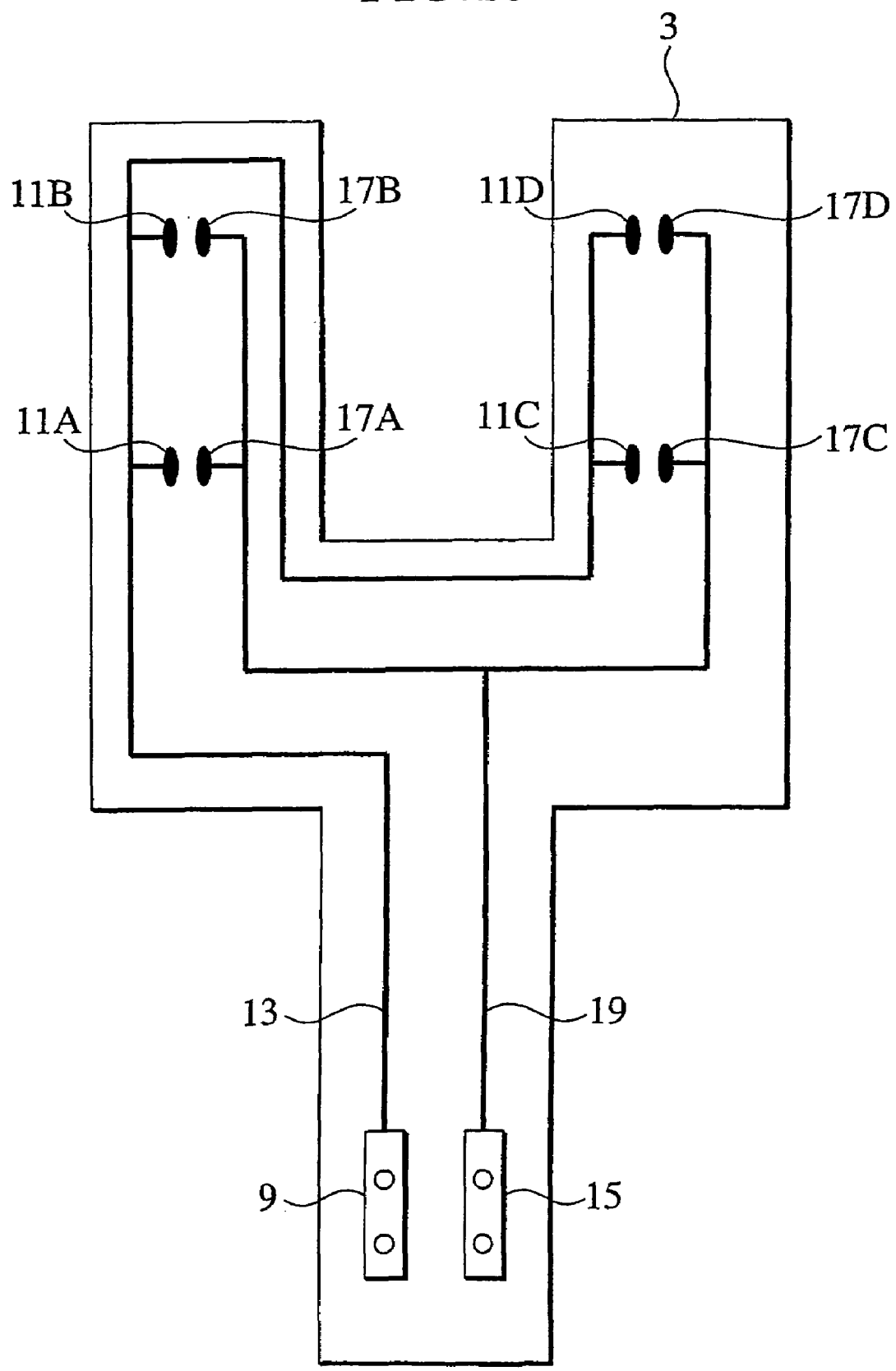
FIG. 10 is a schematic view of the film-form substrate comprising the seating detection switch according to the first embodiment.

FIG. 10 is a schematic view of the film-form substrate 3 of the seating detection switch 1. On the same surface over which the film-form member 7 is disposed (the surface to the rear side in FIG. 10) a long thin conductor (first conductor) 13 is fixed, which is provided with a terminal (first terminal) 9 at one end, and electrodes (first electrodes) 11A, 11B, 11C and 11D toward the other end. On the same surface of the film-form substrate 3, another long thin conductor (second conductor) 19 insulated from the conductor 13 is fixed, which is provided with a terminal (second terminal) 15 at one end, and electrodes (second electrodes) 17A, 17B, 17C and 17D toward the other end.

Figure 11:
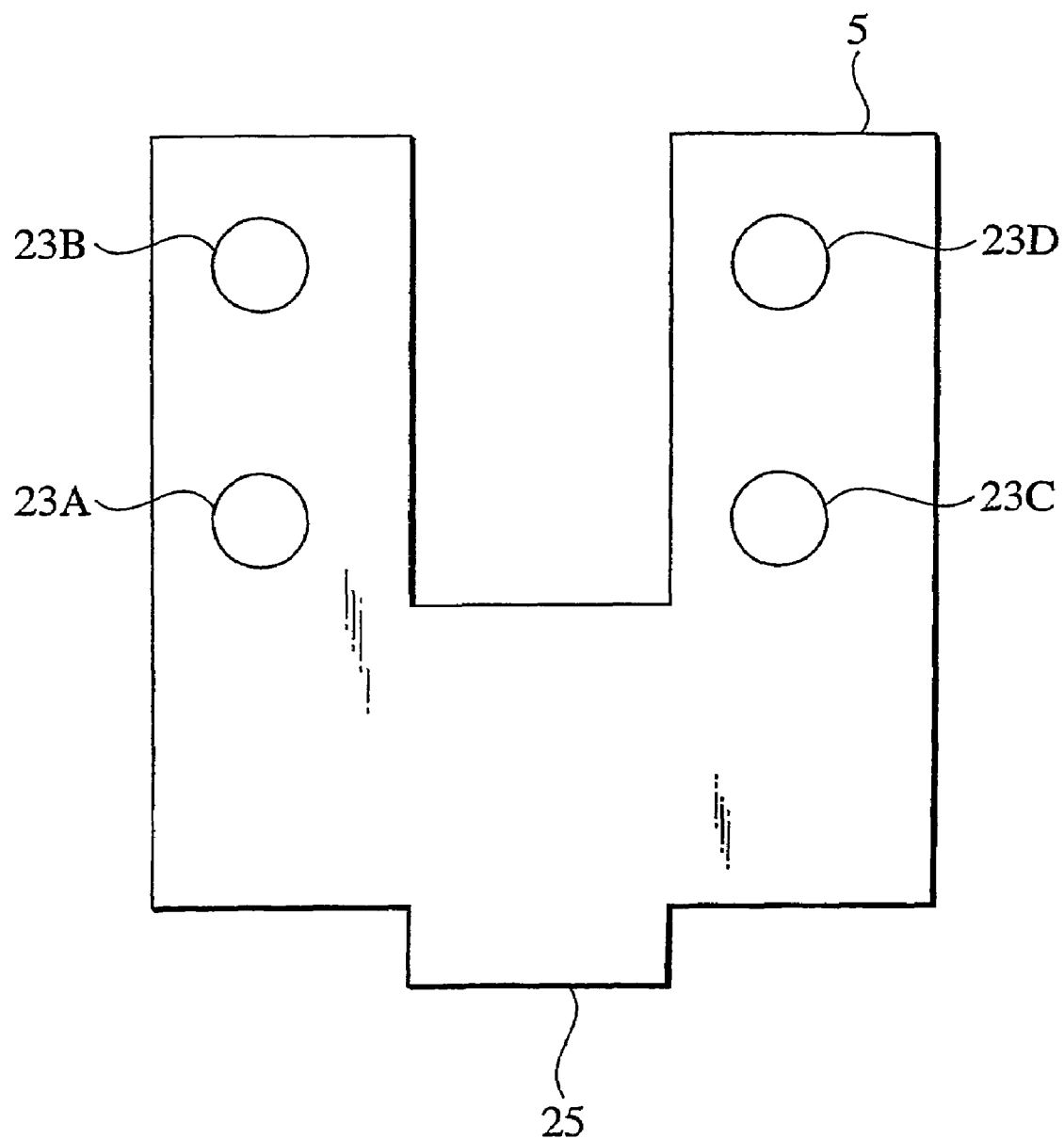
FIG. 11 is a schematic view of the spacer comprising the seating detection switch according to the first embodiment.

FIG. 11 is a schematic view of the spacer 5 of the seating detection switch 1. The spacer 5 has an adhesive agent on both surfaces thereof and fixes the film-form substrate 3 and the film-form member 7 (refer FIGS. 8 and 9).

Figure 12:
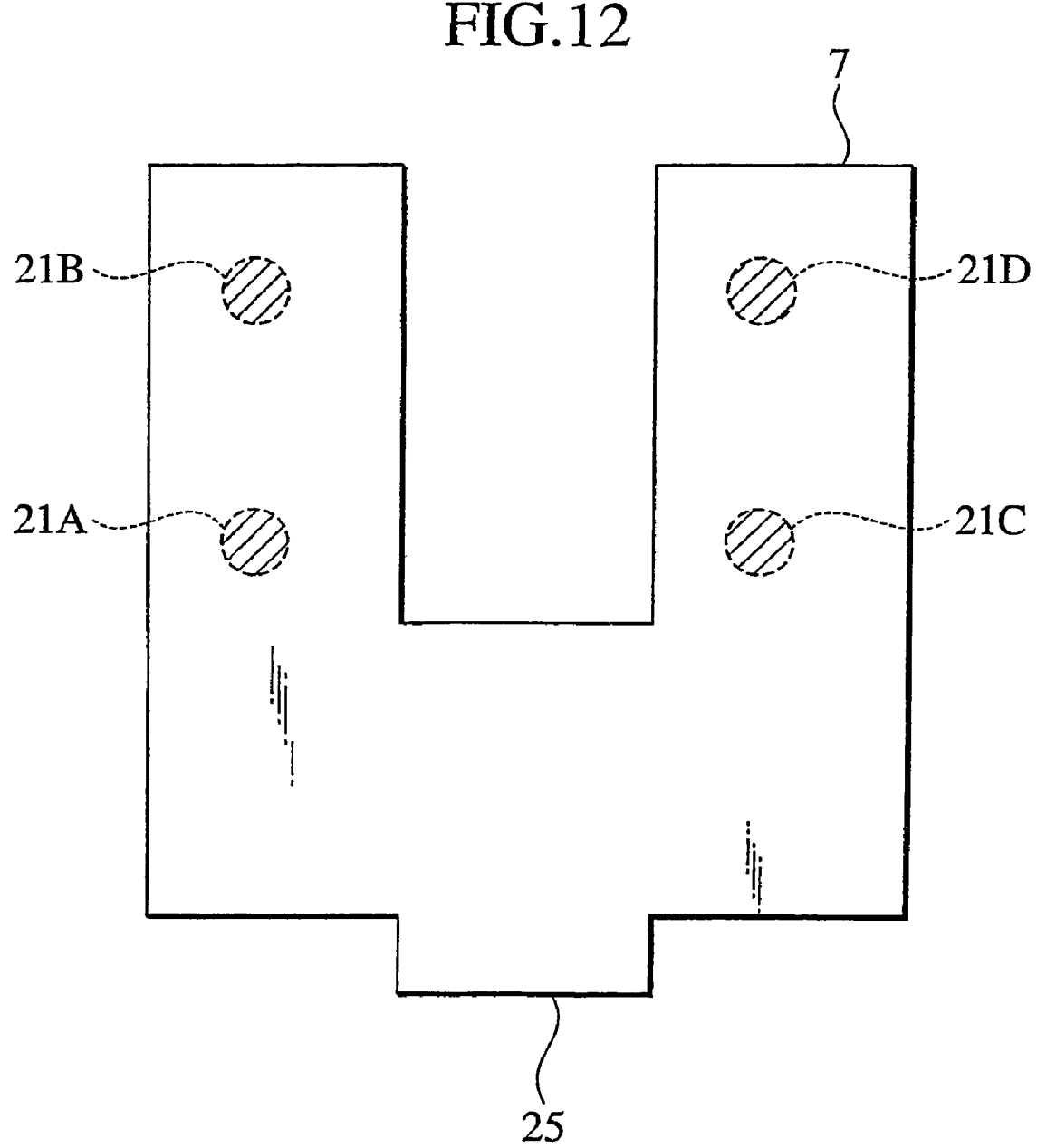
FIG. 12 is a schematic view of the film-form member comprising the seating detection switch according to the first embodiment.

FIG. 12 is a schematic view of the film-form member 7 of the seating detection switch 1. Thin conductors (third conductors) 21A, 21B, 21C and 21D are fixed to the surface of the film-form member 7 facing the film-form substrate 3 (the rear surface in FIG. 12).

The seating detection switch 1 shown in FIG. 7 is constructed with the spacer 5 shown in FIG. 11 layered on without being reversed over (the front surface of) the film-form substrate 3 shown in FIG. 10 and with the film-form member 7 shown in FIG. 12 layered on without being reversed over (the front surface of) the spacer 5.

More specifically, as shown in FIG. 10, on the film-form substrate 3 the electrode 11A and the electrode 17A are in mutual proximity, opposing each other. Similarly, the electrode 11B and the electrode 17B, the electrode 11C and the electrode 17C, as well as the electrode 11D and the electrode 17D are each disposed in the same manner as the electrodes 11A and 17A. Each of these electrodes has for example, a comb-shaped form.

As shown in FIG. 11 through holes 23A, 23B, 23C and 23D are formed in the spacer 5. As shown in FIG. 7, the through hole 23A is in the position corresponding to the electrode 11A and the electrode 17A when the spacer 5 is fixed by for example being adhered in a determined position over the film-form substrate 3. In the same manner, the through hole 23B is in a position corresponding to the position of the electrode 11B and the electrode 17B, the through hole 23C is in position corresponding to the position of the electrode 11C and the electrode 17C, and the through hole 23D is in position corresponding to the position of the electrode 11D and the electrode 17D.

The through hole 23A is formed somewhat larger than the location at which each of the electrodes 11A and 17A are disposed, thereby surrounding this location. Each of the other through holes 23B, 23C and 23D is formed larger than the location at which each of their respective corresponding electrode pairs are disposed and surrounding that corresponding location in the same manner as the through hole 23A.

When the film-form member 7 is secured by for example being adhered in a determined position on the spacer 5 affixed to the film-form substrate 3, the conductor 21A is positioned so as to correspond to the position of the electrode 11A, the electrode 17A and the through hole 23A. In the same manner, the conductor 21B is positioned corresponding to the position of the electrode 11B, the electrode 17B and the through hole 23B; the conductor 21C is positioned corresponding to the position of the electrode 11C, the electrode 17C and the through hole 23C; and the conductor 21D is positioned corresponding to the position of the electrode 11D, the electrode 17D and the through hole 23D.

The through hole 23A is formed larger then the conductor 21A and surrounds the 21A. Each of the other through holes 23B, 23C and 23D are also formed larger than the respective conductors 21B, 21C and 21D so as to surround these respective conductors in the same manner as the through hole 23A.

The conductor 21A is formed to a size sufficient to surround the outer diameters (outlines) of the electrode 11A and the electrode 17A (the envelope of the outer diameter of the electrode 11A and the outer diameter of the electrode 17A). In the same manner, each of the conductors 21B, 21C and 21D is formed sufficiently large to surround the outer diameters of each of the respective corresponding electrodes.

In this seating detection switch 1 the terminal 9, formed for example in a rectangular form on one of the surfaces of the film-form substrate 3 and the terminal 15, formed on the film-form substrate 3 in the same manner as the terminal 9, are disposed in mutual proximity and parallel with respect to each other. Between the terminal 9 and the terminal 15 the film-form substrate 3 is formed continuously connected (see FIGS. 7 and 10).

As shown in FIG. 7, the spacer 5 and the film-form member 7 are not disposed in the locations of the terminal 9 and the terminal 15 or in that vicinity. Accordingly, the end faces 25 of the spacer 5 and the film-form member 7 are positioned in a place somewhat removed from the terminals 9 and 15, such that the terminals 9 and 15 and parts of the terminals 9 and 15 side of the conductors 13 and 19 are exposed.

Each of the terminals 9 and 15 are connected to each of signal wires 27 and 29 of a wiring harness via a connector or eyelet or the like (see FIGS. 7 and 9). A thin insulating cover may be applied to the exposed parts of the conductors 13 and 19 to protect those exposed parts. The electrodes, the terminals and the conductors are preferably formed by a printing technique and the like.

The operation of the seating detection switch 1 when mounted on the seat of a car will now be described.

In the normal condition of the seating detection switch 1, the conductor 21A is insulated from the electrodes 11A and 17A (at the least, from one of either of those electrodes), thus the electrode 11A and the electrode 17A are mutually insulated (see FIG. 8).

In the same manner, each of the other conductors 21B, 21C and 21D are insulated from their corresponding respective electrodes. In this condition the seating detection switch 1 is in the OFF condition.

When a passenger sits down in the seat equipped with the seating detection switch 1, at least one of part of the film-form substrate 3 (the locations where the electrodes 11A and 17A etc. are disposed) or part of the film-form member 7 (the location where the conductor 21A is disposed) bends in response to the body weight of the passenger (bending in response to force in the direction of the arrow AR1 or arrow AR2 in FIG. 8). Thus, at least one pair from among the electrodes 11A and 17A, electrodes 11B and 17B, electrodes 11C and 17C, and electrodes 11D and 17D become mutually conductive through at least one from among the conductors 21A, 21B, 21C or 21D.

This conduction causes the first terminal 9 and the second terminal 15 to become mutually conductive and information that the seating detection switch 1 has entered the ON condition is transmitted to for example, a control device (not shown in the drawings) of the car via a signal wire of the wiring harness.

As the terminals 9 and 15 of the seating detection switch 1 are disposed on one of the surfaces of the seating detection switch 1 (or the film-form substrate 3), when a connection terminal of an electric wire (signal wire) attached to a wiring harness or the like is connected to those terminals there is no need to turn the seating detection switch 1 over. Accordingly, a connection terminal of an electric wire attached to a wiring harness or the like can be easily connected to the terminals 9 and 15 of the seating detection switch 1.

Further, as the terminals 9 and 15 of the seating detection switch 1 are arranged in mutual proximity and the film-form substrate 3 are formed continuously between these two terminals, if for example a pulling force is exerted on either one of the signal wires 27 or 29, this pulling force can be received by that part having the film-form substrate 3 laid continuously between the terminal 9 and the terminal 15. This provides an improved degree of strength in response to an external force such as pulling force applied by a signal wire extending from the seating detection switch 1.

Here, the part of the seating detection switch 1 comprised of the electrodes 11A and 17A and the conductor 21A is referred to as a switch portion (contact) 31A. In the same manner, the part comprised of the other electrodes 11B and 17B as well as the conductor 21B is referred to as a switch portion 31B and the remaining groupings of the electrodes 11C and 17C with the conductor 21C and of the electrodes 11D and 17D with the conductor 21D, are respectively referred to as a switch portion 31C and a switch portion 31D (see FIG. 7). It is evident from the above description that OR circuit is formed by these switch portions 31A, 31B, 31C and 31D.

In this seating detection switch 1 there are four switch portions 31A, 31B, 31C and 31D, however it is also suitable for there to be one switch portion or a plurality of switch portions.

In the seating detection switch 1, the film-form substrate 3 (or the seating detection switch 1) extends as one single body on the side of the terminals 9 and 15, and extends as two branches on the side of the switch portions 31A and 31B, and 31C and 31D, however as described subsequently with respect to the second embodiment of this invention, the film-form member may be of another suitable form.

Further, the shape and position of installation of the conductor 13 or the conductor 19 may be changed to accommodate change in the shape of the film-form substrate or the number of switch porsions.

When forming these switch portions 31A, 31B, 31C and 31D, the spacer 5 or the film-form member 7 may also be formed as individual round shaped members 33A, 33B, 33C and 33D as shown by the double dash chain line in FIG. 7.

Second Embodiment

Figure 13:
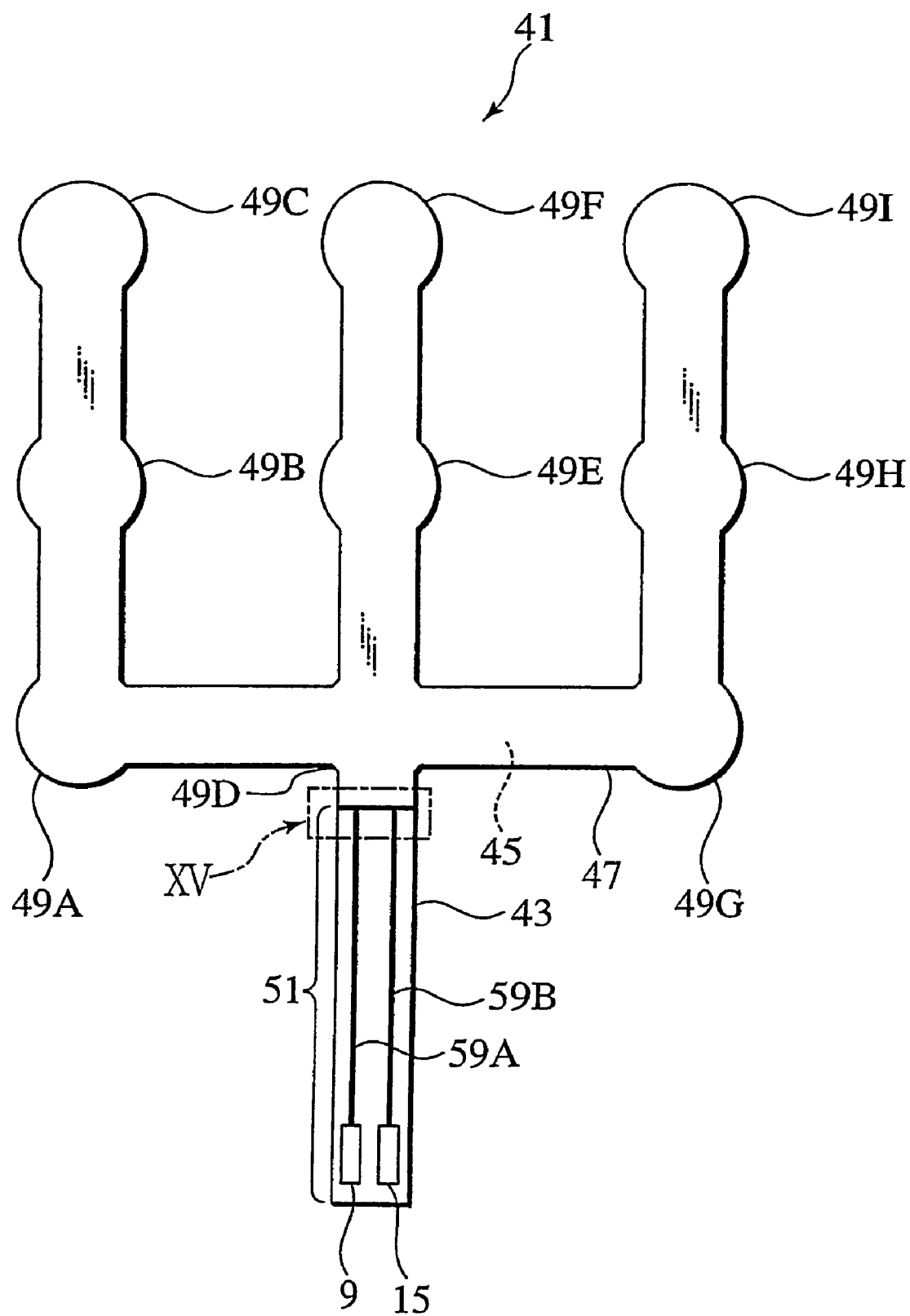
FIG. 13 is a schematic view of a seating detection switch according to a second embodiment of the present invention.

FIG. 13 is a schematic view of the seating detection switch 41 according to a second embodiment of the present invention.

This seating detection switch 41 differs from the seating detection switch 1 in the shape of the film-form substrate 43, the spacer 45 and the film-form member 47, and in respect of the provision of the nine switch portions 49A-49I. In all other respects this switch 43 is substantially the same as the switch 1.

That is to say, the film-form substrate 43, spacer 45 and film-form member 47 of the seating detection switch 41 branch into three on the side of the switch 41 opposite to that side where the terminals 9 and 15 are arranged, and three switch portions are arranged on each of these three branches. The switch portions 49A-49I form an OR circuit.

At the side of the film-form substrate 43 at which the terminals 9 and 15 are disposed, an extending part 51 is provided at which the spacer 45 and the film-form member 47 are removed.

The seating detection switch 41 installed on a car seat 53 will now be described.

Figure 14:
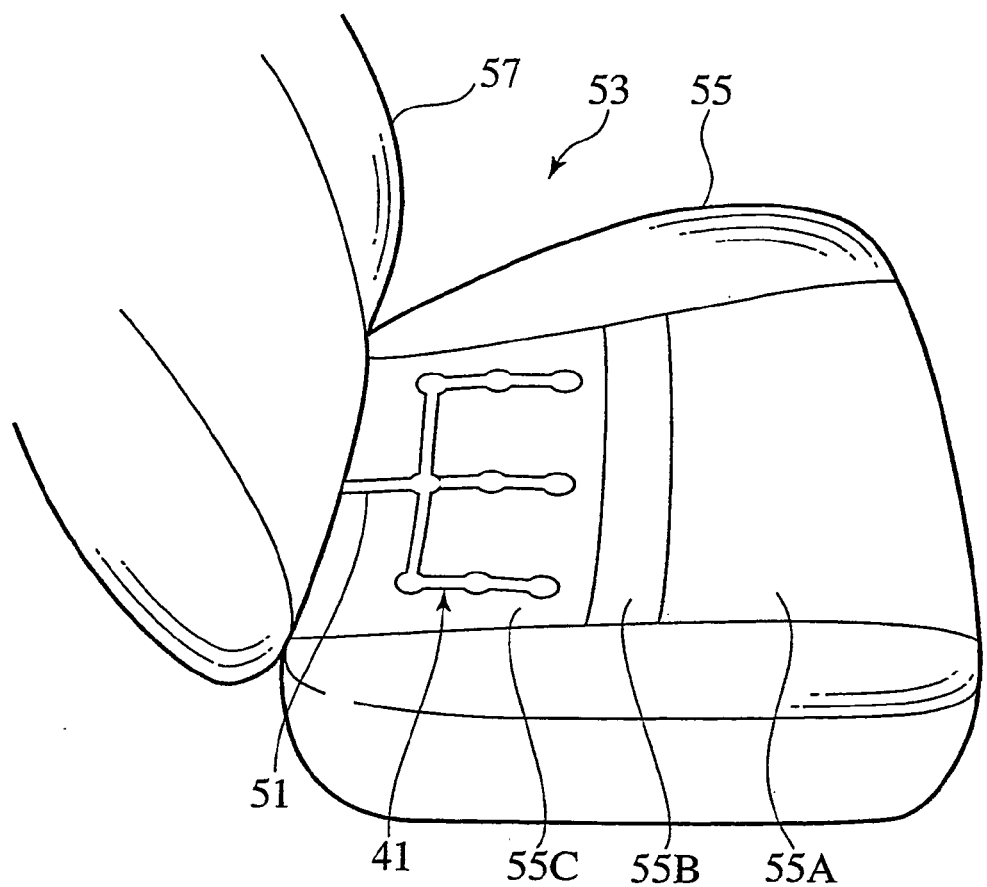
FIG. 14 shows the seating detection switch of the second embodiment installed on a car seat.

FIG. 14 shows the seating detection switch 41 installed on the seat 53 of a car with the external covering of the seat 53 removed. Accordingly, when a car in which the seat 53 is installed is sold for use, the seating detection switch 41 would be covered with the external covering and therefore could not be seen from the outside.

The seat 53 comprises a seating part 55 and seat back 57. For comfortable seating of a passenger the center area of the seating part 55 in the widthwise direction is divided into three parts; a front part 55A, a center part 55B and a rear part 55C.

The seating detection switch 41 is installed conforming to the surface of the rear part 55C so that that side of the switch 41 having the extending part 51 where the spacer and the film-form member are removed, faces toward the rearward of the seat 53. The end of the extending part 51 (the end part at the rear of the seat 53) enters in between the seating part 55 and the seat back 57, while a wiring harness extends from the terminals 9 and 15 disposed at the end of the extending part 51. The terminals 9 and 15 and the wiring harness are concealed by the image of the seat 53 and therefore do not appear in FIG. 14.

When a passenger sits in the seat 53 at least one from among the switch portions 49A-49I becomes conductive (turns ON) in response to the weight of the passenger, and that part of the rear part 55C of the seat 53 where the bodyweight of the passenger is exerted substantially, that is to say, the area from just in front of the border of the rear part 55C and the seat back 57 to the border of the rear part 55C and the center part 55B is substantially depressed down. The seating detection switch 41 curves (bends) substantially at the extending part 51 in response to this downward depression.

As described above, the extending part 51 has the spacer 45 and the film-form member 47 removed, comprises the film-form substrate 43 and conductive wires fixed thereto and is thin in the thickness. Thus, even if the seating detection switch 41 curves (bends) substantially in the thickness direction at the extending part 51, the stress arising in the film-form substrate 43 at the extending part 51 is small. Accordingly even though the extending part 51 is subject to being substantially curved repeatedly due to the action of passengers sitting down in and standing up from the seat 53, the extending part 51 is resilient and does not sustain damage easily.

Further, the spacer 45 having an adhesive agent applied to both surfaces thereof is not installed at the extending part 51. Thus, even though this substantial bending action occurs repeatedly, there is no concern that the conductive wires of the first conductor 59A and the second conductor 59B fixed to the film-form substrate 43 will transfer from the film-form substrate 43 to the spacer 45 and peel away. Accordingly, it is extremely difficult for damage to occur to the seating detection switch 41 due to cutting of the wires of the conductive wires 59A and 59B.

In the above description the extending part 51 is resilient to being bent as it is formed as a long thin member, however this extending part 51 may also be strengthened by being constructed in other configurations. Concrete examples of such strengthening configurations will now be described.

Figure 15:
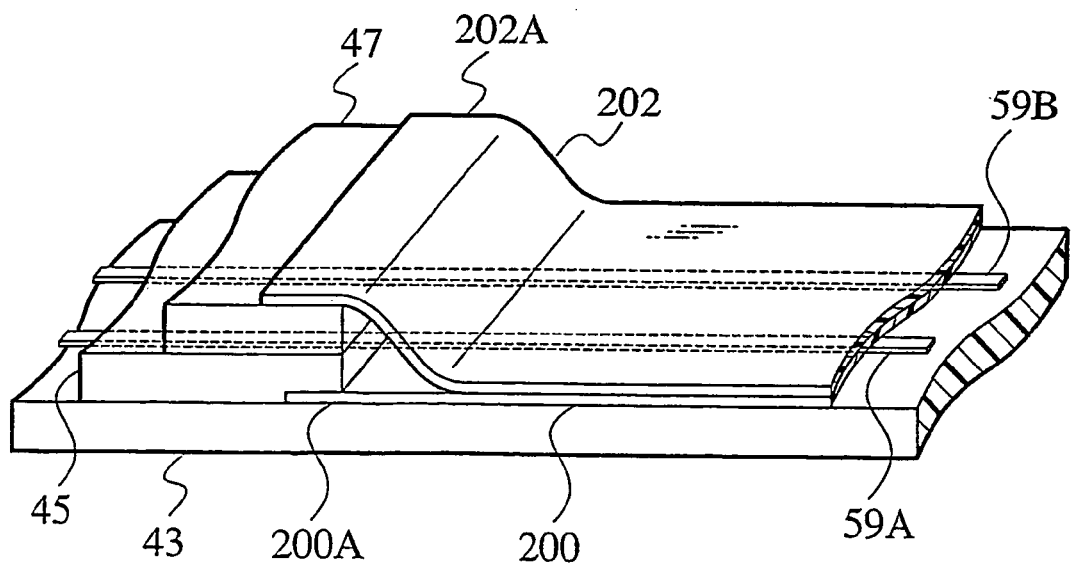
FIG. 15 is an expanded perspective view of the part XV of FIG. 13.

FIG. 15 is an expanded perspective view of XV in FIG. 13.

The extending part 51 that bends substantially, has the spacer 45 and the film-form member 47 removed and is strengthened as an insulating resistance layer 200 is disposed over one surface of the film-form substrate 43 so as to cover the first conductor (conductive wire) 59A and the second conductor (conductive wire) 59B.

The resistance layer 200 is formed of a synthetic resin such as polyester or the like, and is disposed on one surface of the film-form substrate 43 by being printed thereon. The resistance layer 200 is of a thickness of 15 μm or thereabouts and has the flexibility.

The resistance layer 200 is formed on one of the surfaces of the film-form substrate 43 at the extending part 51 that bends substantially, after the electrode 59A and the electrode 59B are formed on that surface of the film-form substrate 43.

The film-form member 47 comprises an insulating member of a thickness of about 100 μm. The spacer 45 comprises for example an insulating member of a thickness of about 150 μm and has an adhesive agent applied to both surfaces to facilitate the laminating together of the film-form substrate 43 and the film-form member 47. The thickness of the spacer 45 must be such that a contact of the film-form substrate 43 and a contact of the film-form member 47 are normally separate from each other.

Here, if a bending force is applied to a planar member like the seating detection switch 41, making one of the surfaces convex and the other surface concave, the degree of shape transformation at the center line in the thickness direction of the planar member is substantially zero, while the degree of shape transformation increases, substantially proportionately, toward one surface or the other surface away from the centerline.

If the seating detection switch 41 curves at that part where the film-form member 47 and the spacer 45 are provided, in other words, the part where the film-form substrate 43 and the film-form member 47 are mutually affixed together via the spacer 45, the bending between the layers is substantial. That is to say, at this part, the seating detection switch 41 becomes thicker as the film-form substrate 43, the spacer 45 and the film-form member 47 are layered together, and as the distance from the centerline of this thickness to one of the surfaces of the film-form substrate 43 is substantial, the degree of shape transformation of a conductor (the conducting wires 59A or 59B) disposed on one of the surfaces of the film-form substrate 43 is substantial.

Accordingly, there is concern that due to the curving action applied to this part or the repetition of such curving action a conductive wire (conductive wire 59A or 59B) disposed on one of the surfaces of the film-form substrate 43 may be damaged, and break.

Moreover, if this part of the seating detection switch 41 is made to curve substantially, when the temperature is low the adhesive agent applied to the spacer 45 may be hardened and due to this hardening, a conductor (conductive wire 59A or conductive wire 59B) disposed on one of the surfaces of the film-form substrate 43 may transfer toward the adhesive agent layer causing damage to the conductor and the breaking of the wire.

However, at the part of the seating detection switch 41 that curves substantially ([the extending part 51; tail part 51]) the spacer 45 and the film-form member 47 are removed and an insulating resistance layer 200 is disposed on one of the surfaces of the film-form substrate 43 so as to cover each of the conductors (conductive wires 59A and 59B). Accordingly, in this part that is subject to substantial curvature, the distance from the centerline in the thickness direction to the surface of the film-form substrate 43 is small, and the degree of shape transformation affecting a conductor (conductive wires 59A and 59B) disposed on that surface of the film-form substrate 43 is small.

Accordingly, the degree of shape transformation of the conductor (conductive wires 59A and 59B) disposed on one of the surfaces of the film-form substrate 43 is less than that of a part where the spacer 45 and the film-form member 47 are installed and it is more difficult for wire damage to occur due to breakage. Moreover, as the resistance layer 200 does not provide an adhesive layer and has the flexibility, even under low temperature conditions there is no concern that such a conductor will transfer toward the resistance layer, therefore there is no concern of breaking of the conductor caused by such transferring.

Here, for easy understanding, the embodiment will be described using concrete numerals, however this should not be understood as restricting this embodiment within such numerals. Provided that the conductor (conductive wire 59A or conductive wire 59B) disposed on one of the surfaces of the film-form substrate 43 does not easily sustain wire breakage due to the curvature of the extending part 51 of the seating detection switch 41, any of the numeral values provided below may be suitably changed.

The film-form substrate 43 is made in thickness of 100 μm, the spacer 45 in thickness of 150 μm, the film-form member 47 in thickness of 100 μm, and the resistance layer 200 in thickness of 15 μm. The thickness of the thin conductors (conductive wires 59A and 59B) and the thickness of the adhesive layer disposed on the spacer 45 are not detailed here, as being extremely thin in comparison to the thickness of each of those other members.

At those parts where the spacer 45 and the film-form member 47 are provided the thickness of the seating detection switch 41 equals 350 μm (100 μm+150 μm+100 μm). Accordingly, the centerline is positioned in the location 175 μm (350 μm/2) from one of the surfaces of the seating detection switch 41 (the surface of the film-form substrate 43). Further, the conductors (conductive wires 59A and 59B) disposed on the film-form substrate 43 are positioned 75 μm (175 μm−100 μm) from one of the surfaces of the seating detection switch 41.

On the other hand, at those parts where the spacer 45 and the film-form member 47 are removed and the resistance layer 200 is installed, the thickness of the seating detection switch 41 is 115 μm (100 μm+15 μm). Thus, the centerline in the thickness direction of these parts is positioned 57.5 μm (115 μm/2) from one of the surfaces of the seating detection switch 41 (the surface of the film-form substrate 43). Further, the conductors (conductive wires 59A and 59B) installed on the film-form substrate 43 are positioned 42.5 μm (100 μm−57.5 μm) from one of the surfaces of the seating detection switch 41.

Thus, when the seating detection switch 41 is bent to curve the degree of shape transformation of the conductive wire is less when bending occurs in those parts where the film-form member 47 and the spacer 45 are removed and the resistance layer 200 is installed, than when bending occurs in parts where the spacer 45 and the film-form member 47 are present.

Moreover, the resistance layer 200 of the seating detection switch 41 is formed so as to enter slightly in between the spacer 45 and the film-form substrate 43.

In other words, rather than to the boundary between parts where the spacer 45 and the film-form member 47 are present and parts where they are removed, to the side of the seating detection switch 41 where the spacer 45 and the film-form member 47 are installed, the resistance layer 200 extends slightly so as to be formed between the spacer 45 and the film-form substrate 43 (see resistance layer 200A in FIG. 15). That is to say, for a very short distance only, the spacer 45, the film-form member 47 and the resistance layer 200 overlap.

As in the seating detection switch 41 the spacer 45, the film-form member 47 and the resistance layer 200 overlap, the concentration of stress sustained by the conductors (the conductive wires 59A and 59B) disposed on the film-form substrate 43 is avoided at the boundary between those parts where the spacer 45 and the film-form member 47 are present and those parts where they are removed, thereby alleviating concern of damage and consequent wire breakage affecting those conductors.

Again, in the seating detection switch 41, the surface of the resistance layer 200 is covered with a thin, film-form protective tape 202 that is flexible. This protective tape 202 provides an adhesive agent on one surface. After the conductors (conductive wires 59A, 59B) are formed on one surface of the film-form substrate 43, the resistance layer 200 is formed and the spacer 45 and the film-form member 47 are installed, the protective tape 202 is affixed to the surface of the resistance layer 200 using this adhesive layer.

The protective tape 202 may be wrapped over the part having the spacer 45 and the film-form member 47 (a part 202A may be formed as shown in FIG. 15), or it may be formed over the entirety of the film-form member 47 side of the resistance layer 200.

As the protective tape 202 is provided, the resistance layer 200 can be protected. Further, as the resistance layer 200 is provided, the adhesive part of the protective tape 202 does not come into direct contact with the conductors (conductive wires 59A, 58B) disposed on one surface of the film-form substrate 43. Thus, even when the seating detection switch 41 is bent to curve, the conductor (conductive wire 59A or 58B) is prevented from peeling away.

Moreover, if for example the thickness of the protective tape 202 is 50 μm, at the part where the spacer 45 and the film-form member 47 are installed the thickness of the seating detection switch 41 becomes 350 μm (100 μm+150 μm+100 μm). Accordingly, the centerline in the thickness direction of this part is positioned 175 µm (350 µm/2) from one of the surfaces of the seating detection switch 41 (the surface of the film-form substrate). Further, a conductor disposed on the film-form substrate 43 is positioned 75 µm(175 µm−100 µm) from one of the surfaces of the seating detection switch 41.

On the other hand, at the part with the spacer 45 and the film-form member 47 removed and the resistance layer 200 and the protective tape 202 are installed, the thickness of the seating detection switch 41 becomes 165 µm (100 µm+15 µm+50 µm). Thus, the centerline in the thickness direction in this part is positioned 82.5 µm(165 µm/2) from one surface of the seating detection switch 41 (the surface of the film-form substrate 43). Moreover, the conductors (conductive wires 59A and 58B) disposed on the film-form substrate 43 are positioned 17.5 µm (100 µm−82.5 µm) from one of the surfaces of the seating detection switch 41.

Accordingly, when the seating detection switch 41 is bent to curve, the degree of shape transformation of the conductor (conductive wire 59A or conductive wire 58B) is less in the case where the protective tape 202 is provided than in the case when this tape is not provided, thereby suppressing damage to such a conductive wire when such bending occurs.

Third Embodiment

Figure 16:
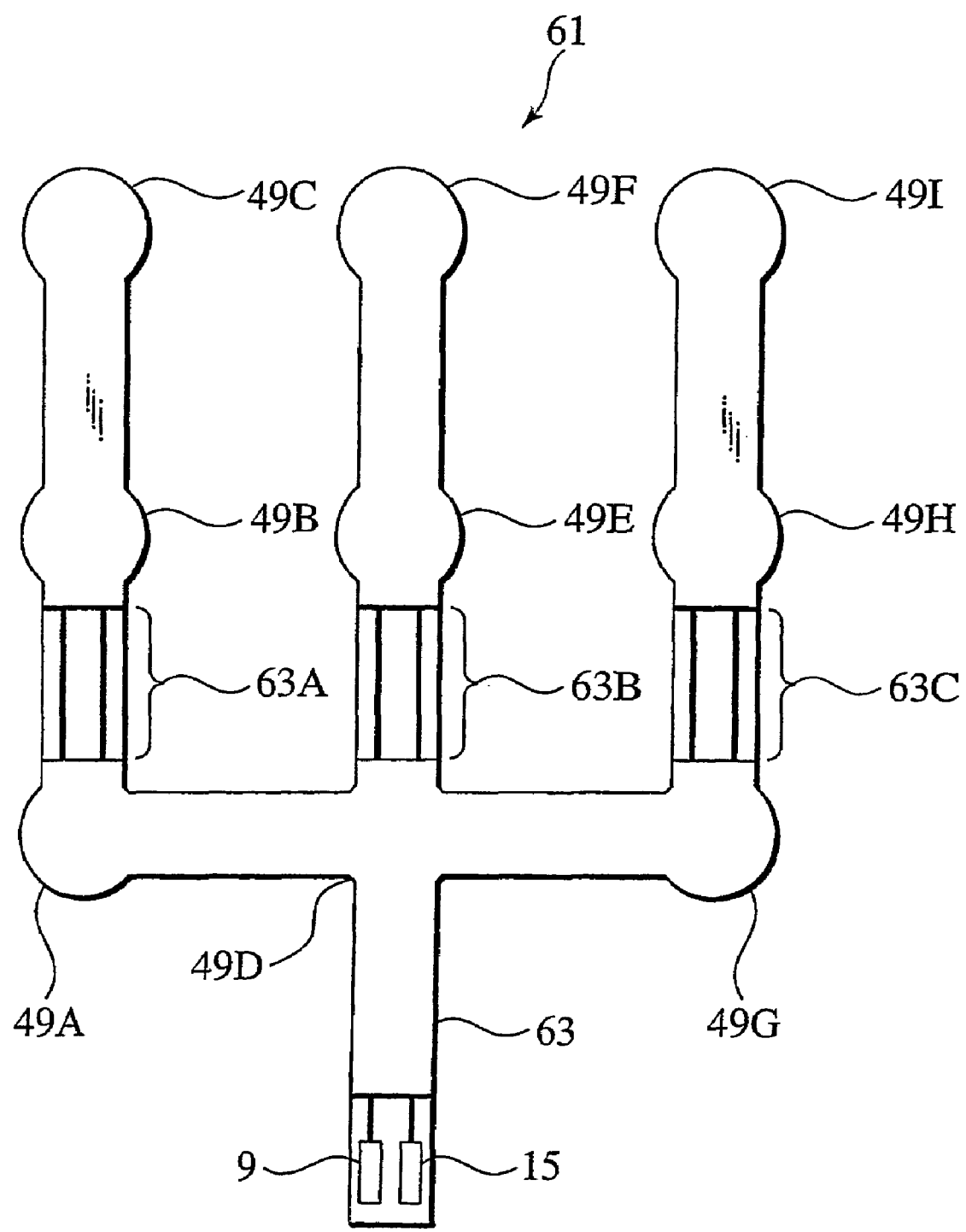
FIG. 16 is a schematic view of a seating detection switch according to a third embodiment of the present invention.

FIG. 16 is a schematic view of a seating detection switch according to a third embodiment of the present invention.

The seating detection switch 61 in FIG. 16 differs from the seating detection switch 41 according to the second embodiment, in that parts 63A, 63B and 63C at which the spacer and film-form member are removed are further away from the terminals 9 and 15 and are each formed long over the central portion of the film-form substrate 63 that branches into three. In all other respects this seating detection switch 61 is generally the same as the seating detection switch 41.

The seating detection switch 61 installed on a car seat 73 will now be described.

Figure 17:
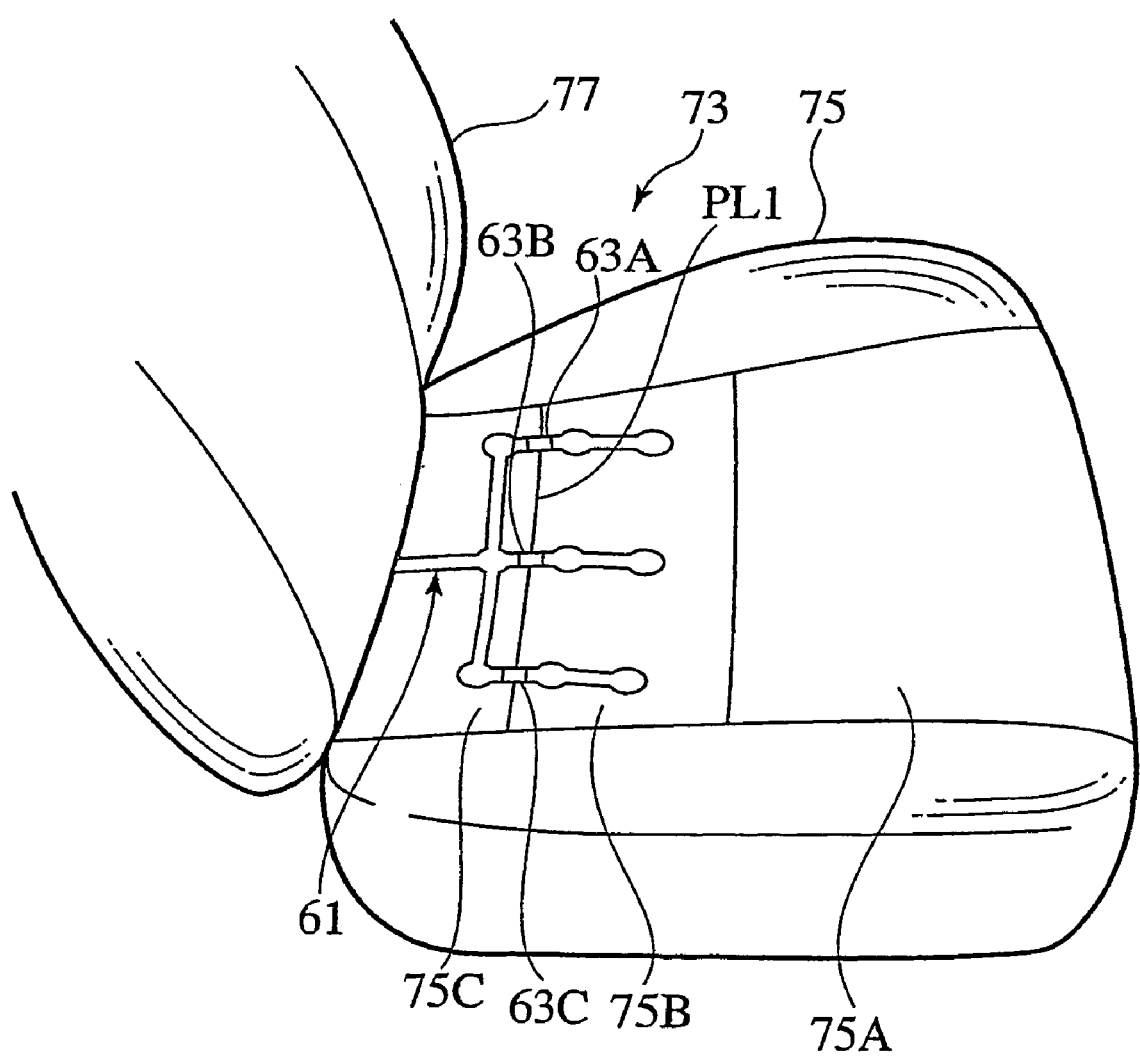
FIG. 17 shows the seating detection switch of the third embodiment installed on a car seat.

FIG. 17 shows the seating detection switch 61 installed on a car seat 73.

The seat 73 comprises a seating part 75 and seat back 77. In the same manner as the seat 53, for comfortable seating of a passenger, in the seat 73 also the center area of the seating part 75 in the widthwise direction is divided into three parts; a front part 75A, a center part 75B and a rear part 75C, however the point of difference between the two seats is that the border PL1 between the center part 75B and the rear part 75C is positioned more to the rear in the case of the seat 73.

The seating detection switch 61 is installed on the seat 73 such that the parts 63A, 63B and 63C of the switch 61 span over the border PL 1.

When a passenger sits in the seat 73 at least one from among the switch portions 49A-49I becomes conductive (turns ON) in response to the weight of the passenger. Further, as the body weight of the passenger exerts more substantially on either the rear part 75C or the center part 75B a difference in weight dispersal arises at the border PL 1, in response to which, the parts 63A, 63B and 63C curve substantially.

In this way, even though the parts 63A, 63B and 63C are bent to curve substantially, because they are of a thin form, in the same manner as the second embodiment, damage to or wire breakage in those parts is substantially prevented. It is also suitable to install a resistance layer or protective tape on the parts 63A, 63B and 63C in the same manner as the second embodiment.

Fourth Embodiment

Figure 18:
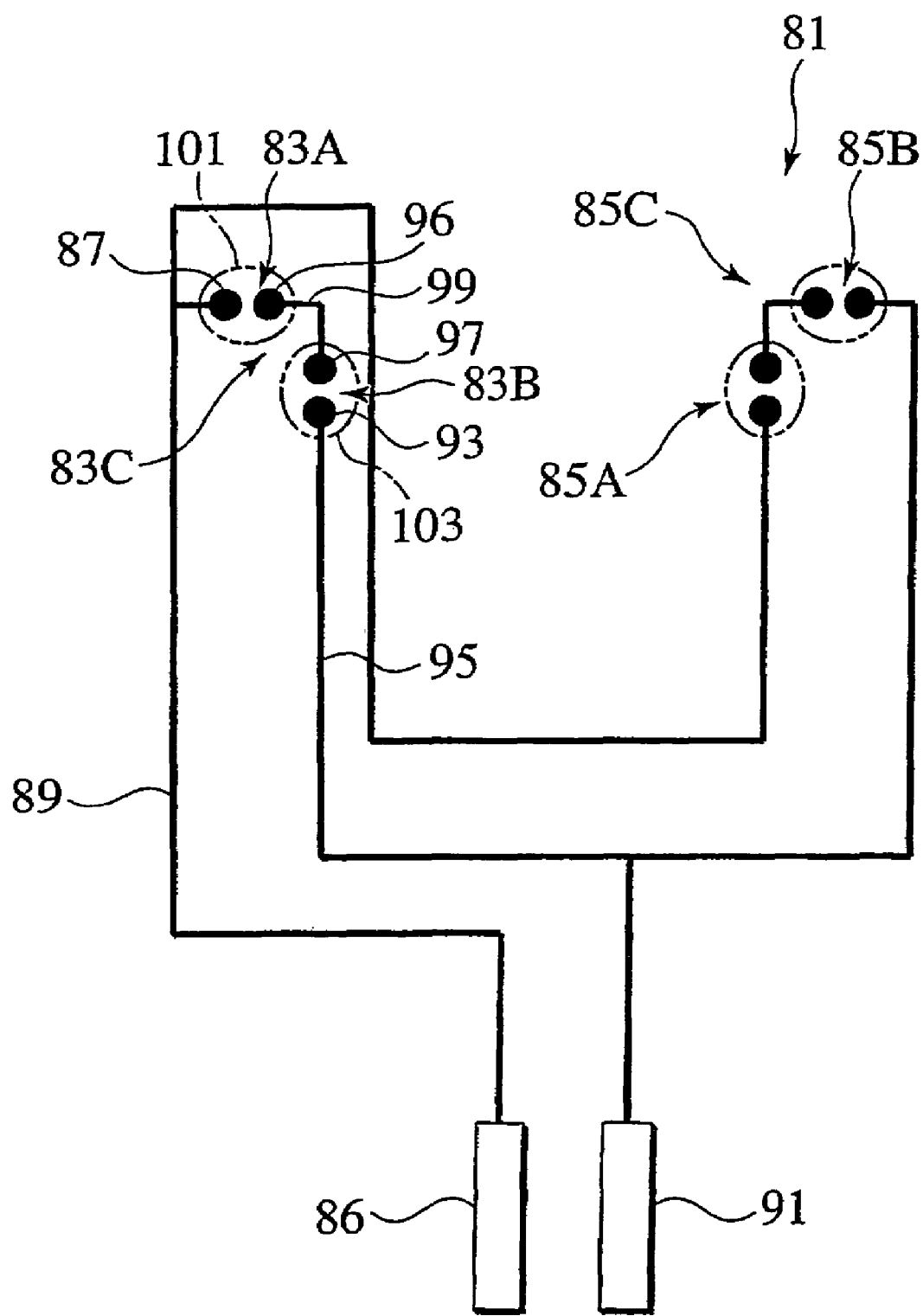
FIG. 18 is a schematic view of a seating detection switch according to a fourth embodiment of the present invention.

FIG. 18 is a schematic view of a seating detection switch 81 according to a fourth embodiment of the present invention.

FIG. 18 shows only conductors, electrodes and terminals to be disposed on a film-form substrate of the switch.

The seating detection switch 81 differs from the seating detection switch 1 according to the first embodiment in that a switch 83A and a switch 83B form an AND circuit 83C and the switch portions 85A and 85B form an AND circuit 85C, while the AND circuit 83C and the AND circuit 85C together form an OR circuit. In all other respects this switch 81 is substantially the same as the switch 1.

That is to say, the seating detection switch 81 comprises: a film-form substrate (not shown) made of insulating material; a thin, long conductor (first conductor) 89 fixed to one of the surfaces of the film-form substrate, which is provided with a terminal (first terminal) 86 at one end, and an electrode (first electrode) 87 at other end; a thin, long conductor (second conductor) 95 fixed to the same surface of the film-form substrate, which is provided with a terminal (second terminal) 91 at one end, and an electrode (second electrode) 93 at other end, and which is insulated from the first conductor 89; and a thin conductor 99 fixed to the same surface of the film-form substrate, which is provided with an electrode 96 corresponding to the first electrode 87 at one end, and an electrode 97 corresponding to the second electrode 93 at the other end, and which is insulated from the first conductor 89 and the second conductor 95.

The seating detection switch 81 further comprises: a film-form member (not shown) disposed substantially parallel but slightly spaced apart from the film-form substrate via a spacer (not shown) on the same surface of the film-form substrate; a thin conductor (third conductor) 101 fixed to the surface of the film-form substrate facing the film-form member; and a thin conductor 103 fixed to the same surface of the film-form substrate and insulated from the conductor 101.

When a passenger sits down in the seat equipped with the seating detection switch 81 at least one from among part of the film-form substrate and the film-form member, bends in response to the body weight of the passenger, then the electrode 87 and the electrode 96, become mutually conductive via the conductor 101 (the switch 83A becomes conductive), and the electrode 93 becomes mutually conductive with the electrode 97 via the conductor 103 (the switch 83B becomes conductive).

The switch portions 85A, 85B are configured substantially the same as the switch portions 83A and 83B.

Apart from the point that part of the switch portions form an AND circuit, the seating detection switch 81 operates substantially the same as the seating detection switch 1 according to the first embodiment and furnishes substantially the same effects.

Fifth Embodiment

Figure 19:
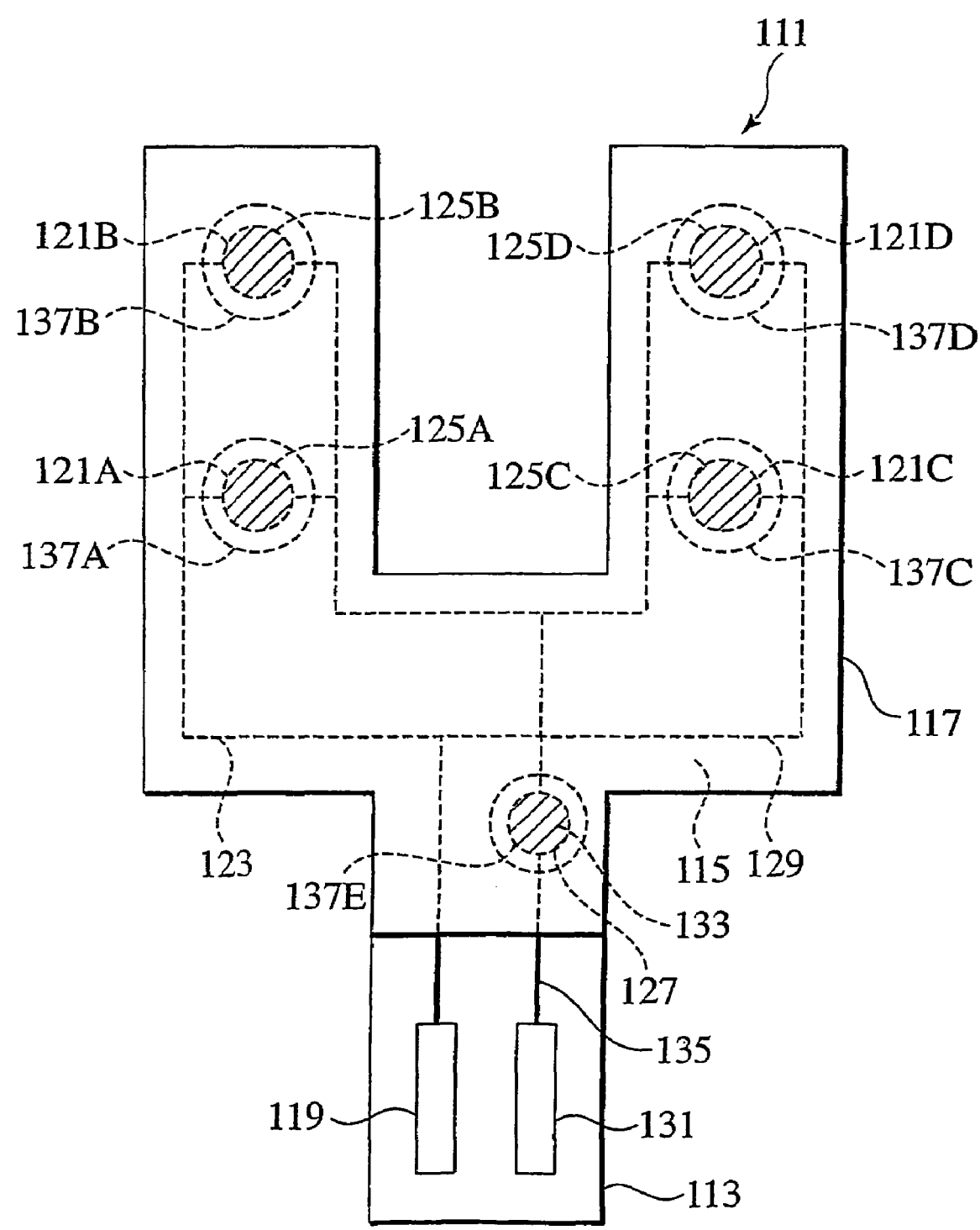
FIG. 19 is a schematic view of a seating detection switch according to a fifth embodiment of the present invention.

FIG. 19 is a schematic view of a seating detection switch according to a fifth embodiment of the present invention.

Figure 20:
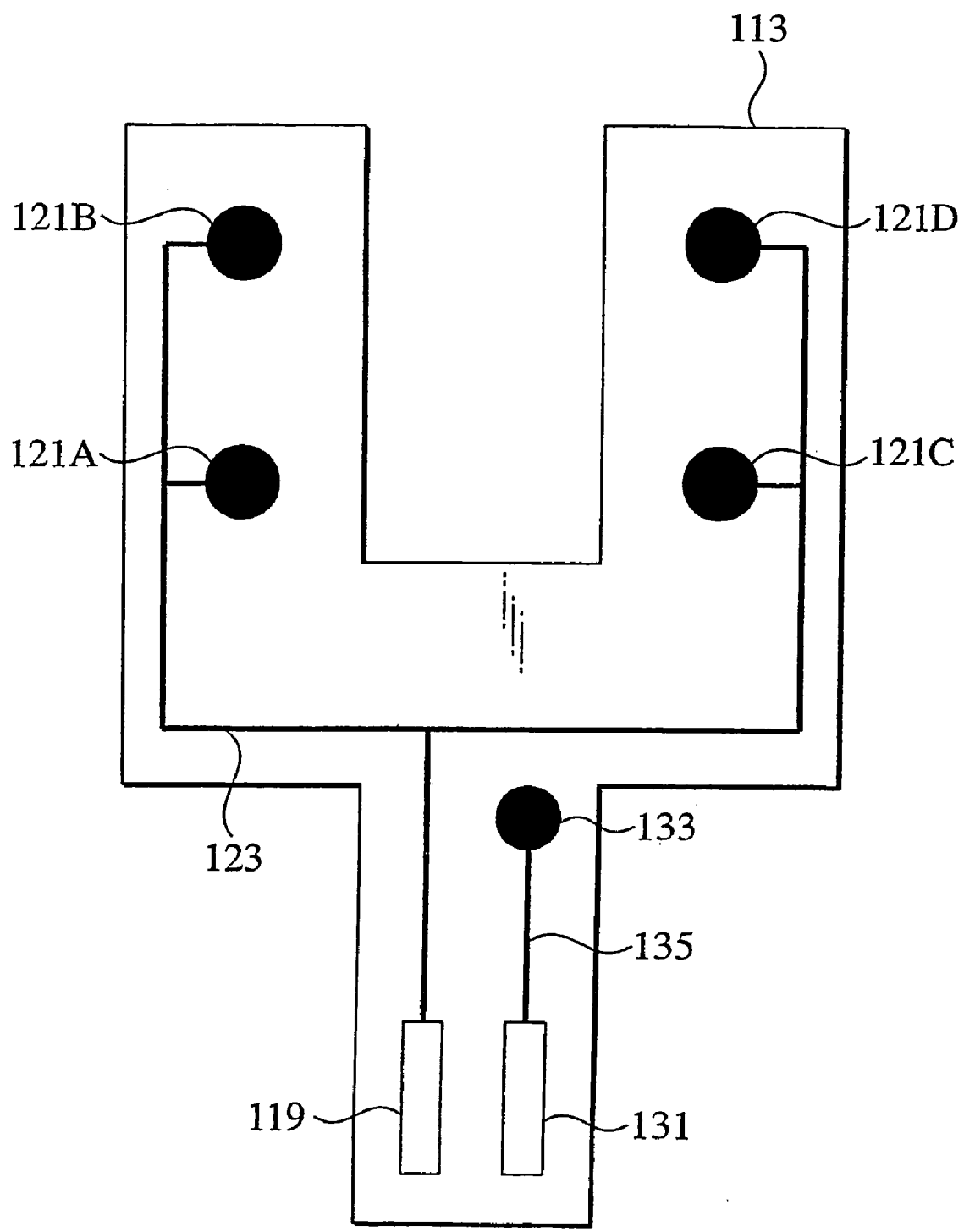
FIG. 20 is a schematic view of the film-form substrate comprising the seating detection switch according to the fifth embodiment.
Figure 21:
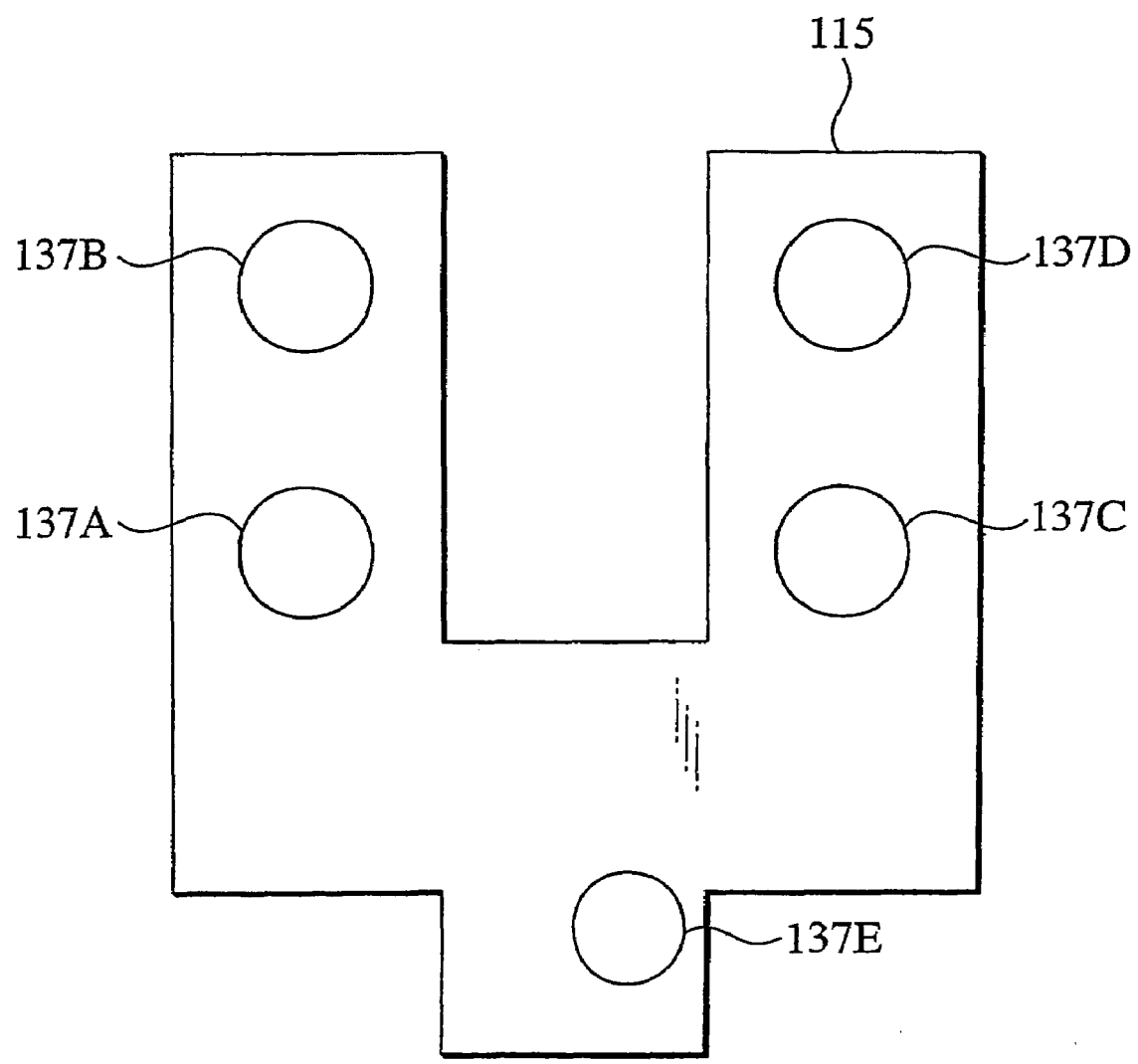
FIG. 21 is a schematic view of the spacer comprising the seating detection switch according to the fifth embodiment.
Figure 22:
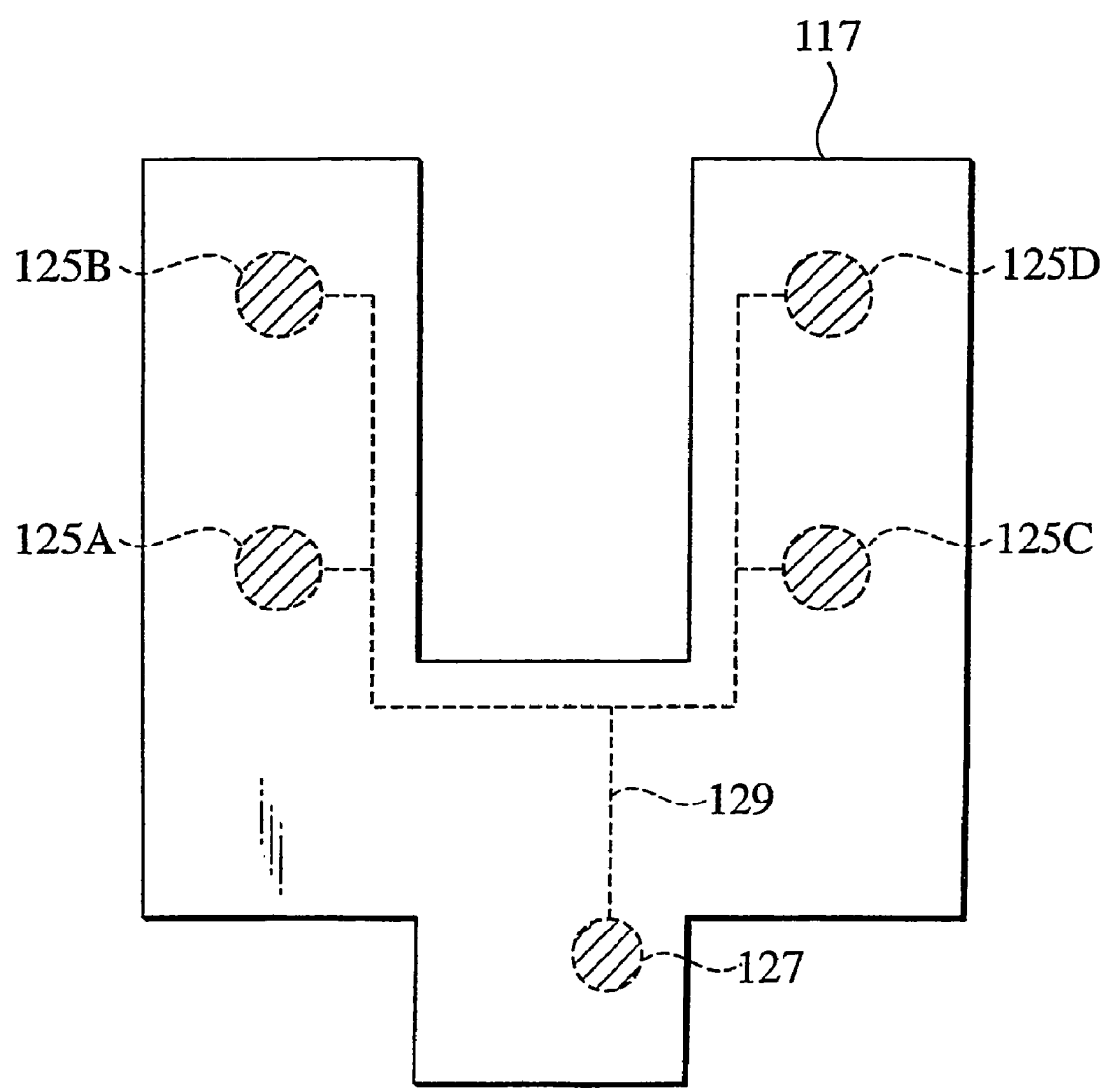
FIG. 22 is a schematic view of the film-form member comprising the seating detection switch according to the fifth embodiment.

The seating detection switch 111 shown in FIG. 19 is configured having the spacer 115 shown in FIG. 21, disposed as it is, without being turned over, on (the front surface of) the film-form substrate 113 shown in FIG. 20, while the film-form member 117 shown in FIG. 22 is disposed as it is without being turned over, on (the front surface of) the spacer 115.

The seating detection switch 111 differs from the seating detection switch 1 according to the first embodiment in that one electrode, one conductor extending from this electrode and two terminals are disposed on the film-form substrate, while the other electrode and another conductor extending from the other electrode are disposed on the film-form member, and these electrodes comprise switch portions. In all other respects the switch 111 is substantially the same as the seating detection switch 1.

That is to say, the seating detection switch 111 comprises a film-form substrate 113 made of insulating material. On one of the surfaces of this film-form substrate 113, a film-form member 117, made of insulating material, is disposed substantially parallel to the substrate 113, but slightly separated therefrom via a spacer 115, made of insulating material.

FIG. 20 is a schematic view of the film-form substrate 113 of the seating detection switch 111. On one of the surfaces thereof (the front surface in FIG. 20), a long, thin conductor (first conductor) 123 is fixed, which is provided with a terminal (first terminal) 119 at one end, and electrodes (first electrode) 121A-121D toward the other end.

Moreover, on that same surface of the film-form substrate 113, a long, thin conductor (second conductor) 135 is fixed, which is provided with a terminal (second terminal) 131 at one end, and an electrode (second electrode) 133 at the other end, and which is insulated from the conductor (first conductor) 123.

FIG. 21 is a schematic view of the spacer 115 of the seating detection switch 111. In the locations of the spacer 115 corresponding to the electrodes 121A-121D, the through holes 137A-137D are formed, larger than those electrodes 121A-121D, respectively. In the location of the spacer 115 corresponding to the electrode 133, a through whole 137E is formed, larger than the electrode 133.

FIG. 22 is a schematic view of the film-form member 117 of the seating detection 111. On the surface of the film-form member 117 that faces the film-form substrate 113 a long conductor 129 (third conductor) is fixed, providing electrodes (fourth electrode) 125A-125D that correspond to the electrodes 121A-121D toward one end thereof, and at the other end, another electrode (third electrode) 127 to be conductive with the second electrode 133 of the conductor 135.

When a passenger sits in a seat equipped with this seating detection switch 111 at least one from among part of the film-form member 113 and part of the film-form substrate 117 bends, in response to the body weight of the passenger, such that each of the electrodes 121A-121D becomes mutually conductive with the respective corresponding electrodes 125A-125D.

This configuration of the seating detection switch 111 means that the switch 111 operates substantially the same as the seating detection switch 1 according to the first embodiment, and furnishes substantially the same effects.

It is not necessary however for the seating detection switch 111 to be of the above described configuration. Provided that the thin, film-form seating detection switch is formed, having contacts (switch portions) that conduct with each of the terminals 119 and 131 within the switch, being capable of detecting whether or not a passenger is seated in a seat on which the seating detection switch is installed by detecting whether or not each of the contacts (between the terminals 119, 131) are conducting, while disposing each of the terminals 119, 131 on one of the surfaces of the seating detection switch, the configuration of the seating detection switch 111 can be appropriately changed.

Further, in the case of the seating detection switches according to the first, fourth and fifth embodiments, those parts that sustain substantial curving may be strengthened in the same way as those parts are strengthened in the seating detection switch according to the second embodiment.

Seating detection switches according to sixth to ninth embodiments of the present invention will now be described.

The seating detection switches according to the sixth to ninth embodiments of the present invention comprise a film-form substrate, a planar spacer, a film-form member, a first terminal and a second terminal. The film-form substrate and the film-form member are disposed mutually parallel and spaced apart from each other with the spacer interposed therebetween (one each in contact with the respective surfaces of the spacer). When a passenger sits down in a seat on which one of these seating detection switches is installed, at least one from among part of the film-form substrate and part of the film-form member bends, and the first terminal and the second terminal become mutually conductive.

Instead of the spacer, those parts of these seating detection switches that curve substantially when a passenger sits have a double-faced adhesive tape that is thinner than the spacer.

Sixth Embodiment

Figure 23:
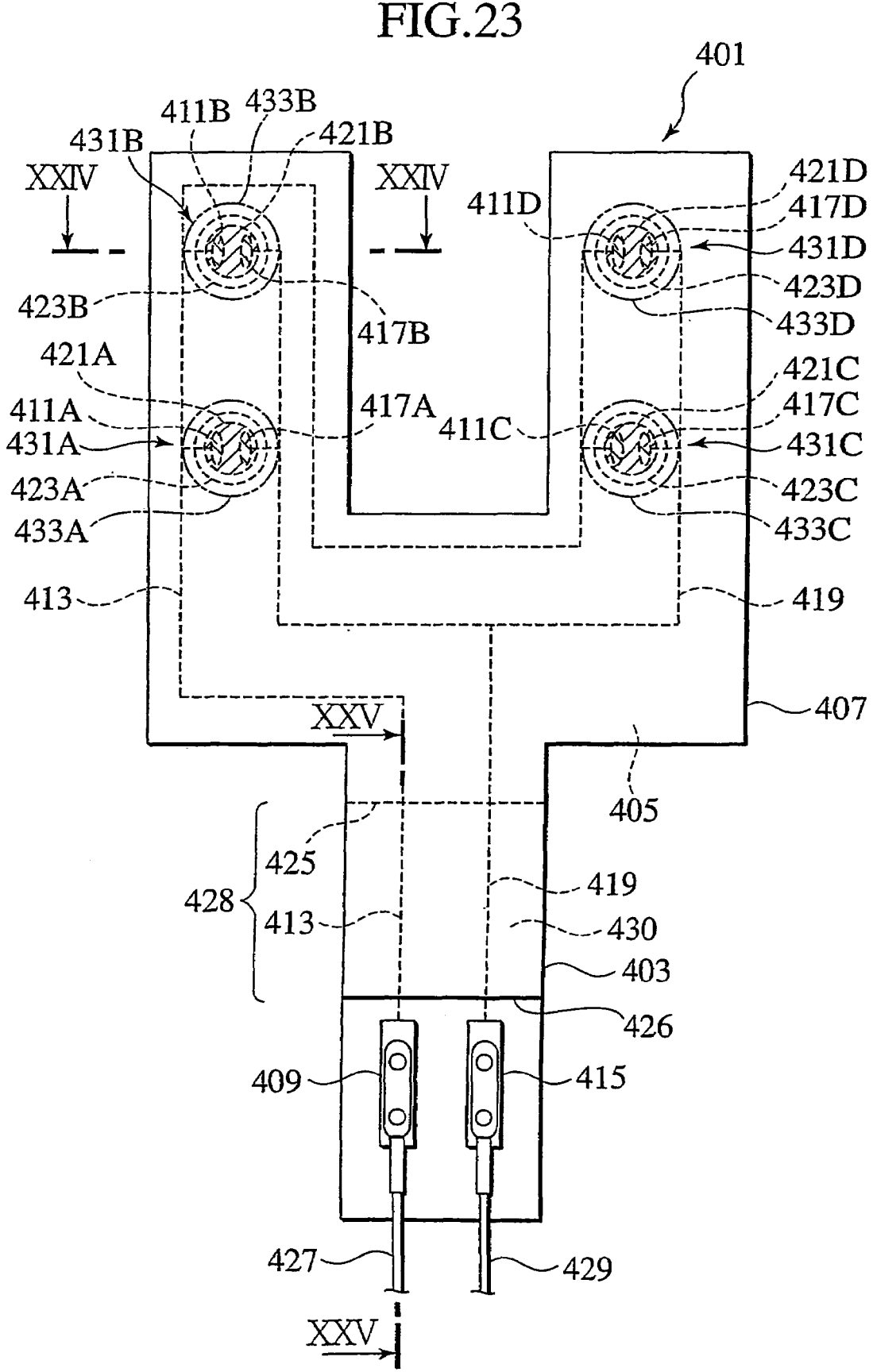
FIG. 23 is a schematic view of a seating detection switch according to a sixth embodiment of the present invention.

FIG. 23 is a schematic view of a seating detection switch 401 according to a sixth embodiment of the present invention.

Figure 24:
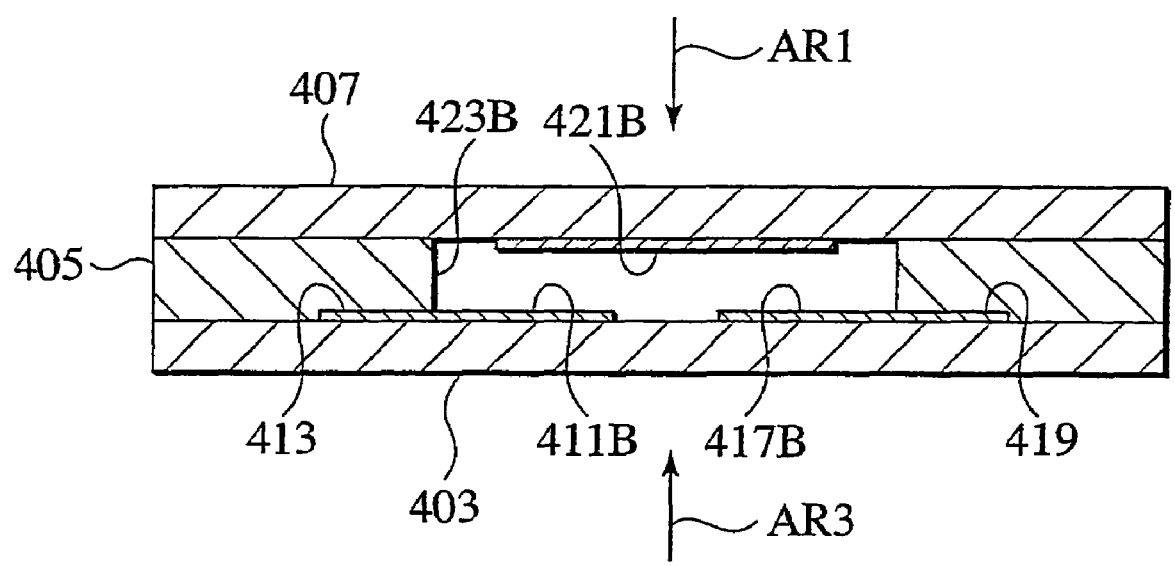
FIG. 24 is a cross-sectional view along the line XXIV-XXIV of FIG. 23.
Figure 25:
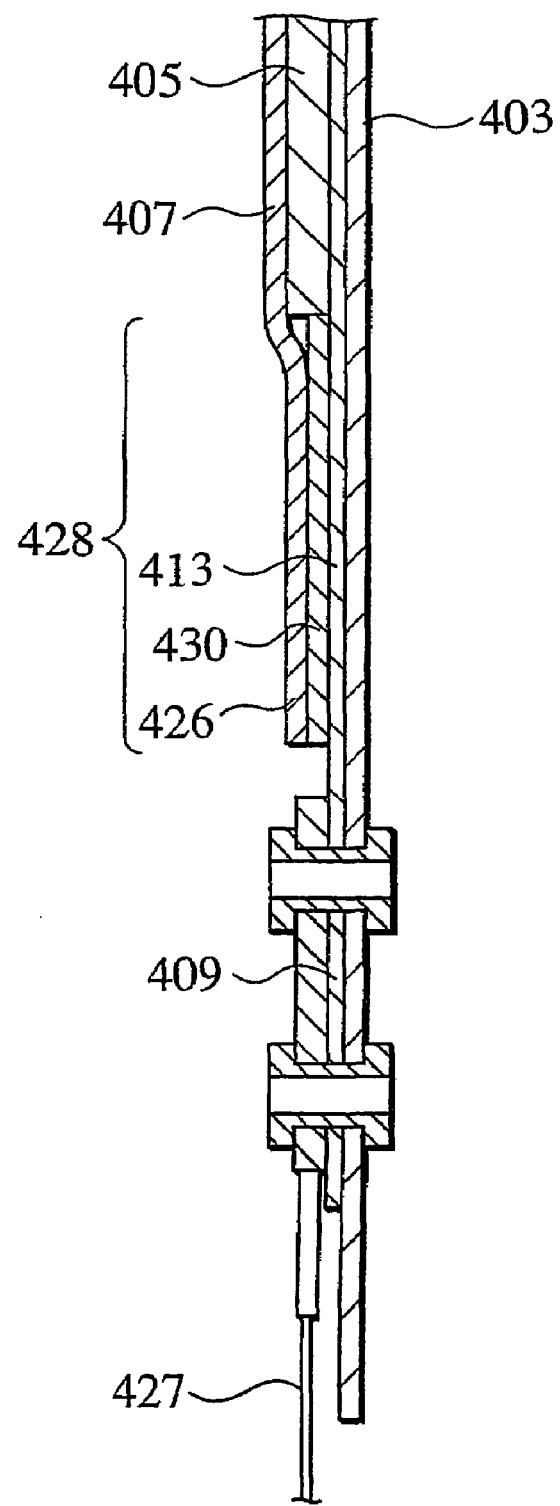
FIG. 25 is a cross-sectional view along the line XXV-XXV of FIG. 23.

FIG. 24 is a cross-sectional view along the line XXIV-XXIV of FIG. 23, while FIG. 25 is a cross-sectional view along the line XXV-XXV of FIG. 23. The illustrations in FIGS. 24 and 25 draw the seating detection switch 401 expanded in the thickness direction, vertically in the case of FIG. 24 and from left to right in the case of FIG. 25.

The seating detection switch 401 is installed at the rear side of a covering of a car seat as described above and is a thin, film-form seating detection switch capable of detecting whether or not a passenger is sitting in the seat, that comprises a film-form substrate 403 made of insulating material. A film-form member 407 made of insulating material is disposed over one of the surfaces of the film-form substrate 403, substantially parallel thereto, but slightly separated from the film-form substrate 403 via a spacer 405 made of insulating material.

Figure 26:
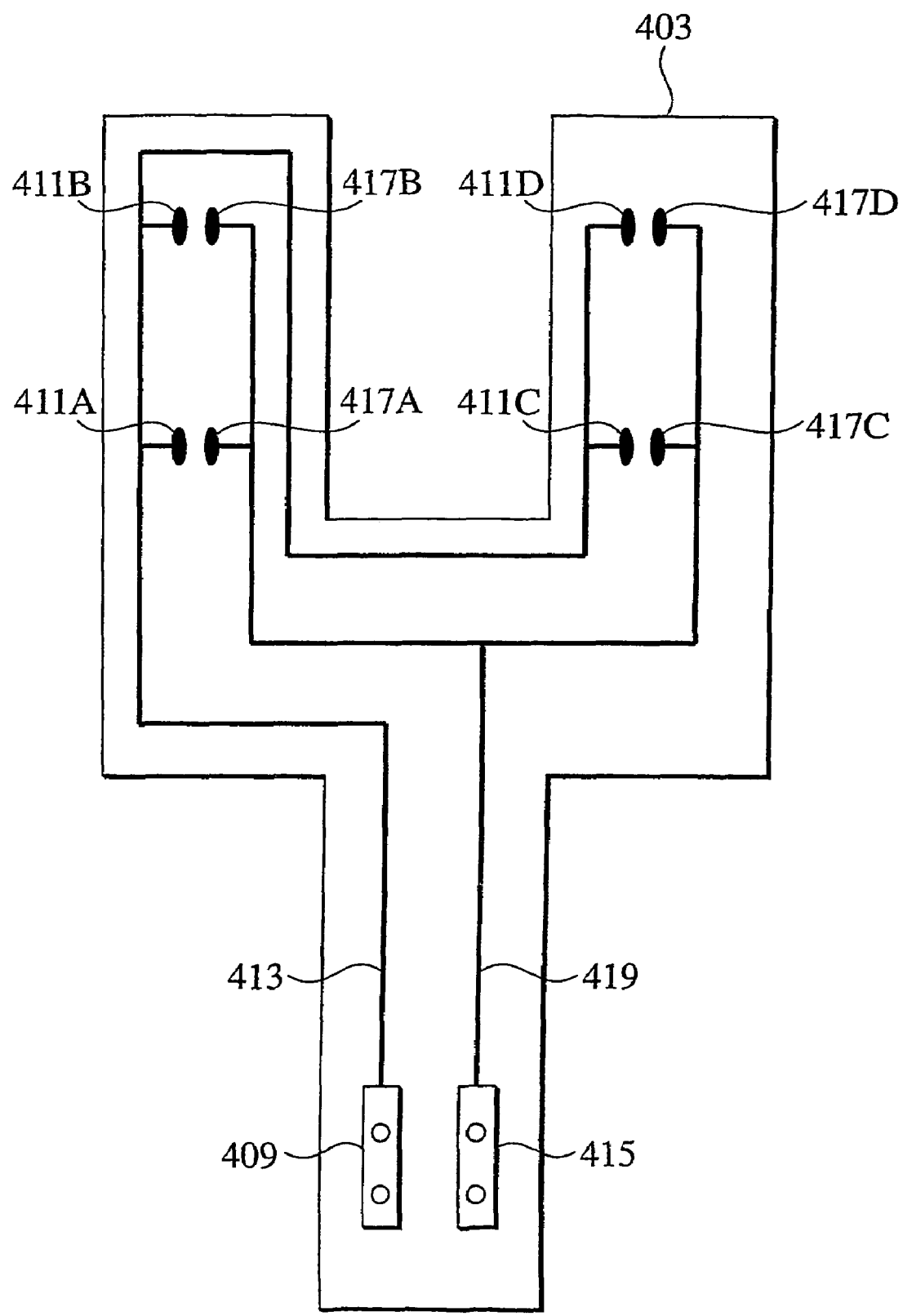
FIG. 26 is a schematic view of the film-form substrate comprising the seating detection switch according to the sixth embodiment.

FIG. 26 is a schematic view of the film-form substrate 403 of the seating detection switch 401. On that same surface of the film-form substrate 403 (the front surface in FIG. 26; and when incorporated in the seating detection switch 401, that surface positioned facing the film-form member 407 that is in contact with the spacer 405), a thin, long, (first) conductor (conduction route) 413 is fixed, providing a terminal (first terminal) 409 at one end, and (first) electrodes (contacts) 411A, 411B, 411C and 411D toward the other end.

On that same surface of the film-form substrate 403, a thin, long conductor (second conductor) 419 is also secured, providing a terminal (second terminal) 415 at one end, and electrodes (second electrodes) 470A, 470B, 417C and 417D toward the other end, which is insulated from the conductor 413.

Figure 27:
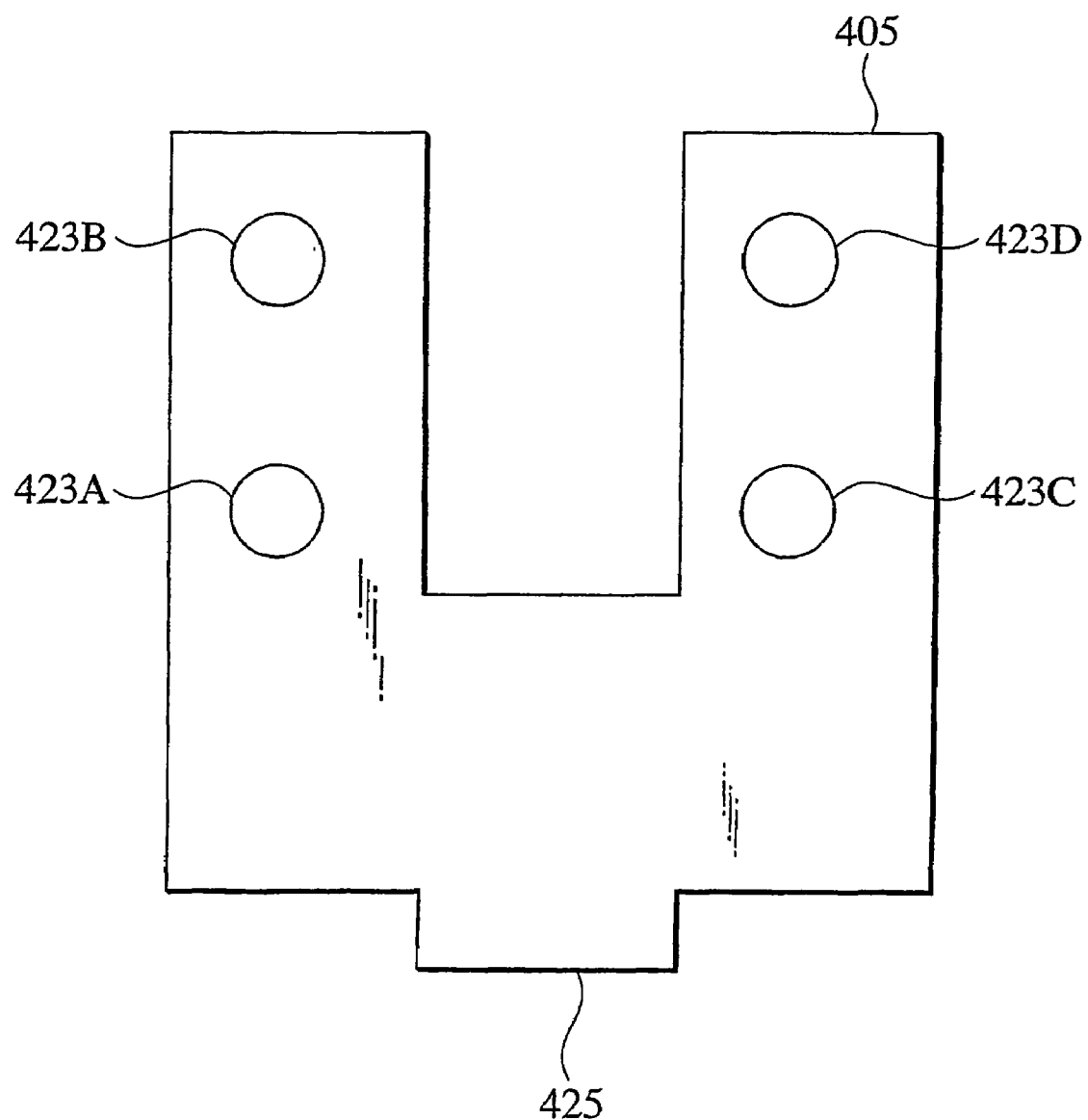
FIG. 27 is a schematic view of the spacer comprising the seating detection switch according to the sixth embodiment.

FIG. 27 is a schematic view of the spacer 405 of the seating detection switch 401. This spacer 405 has adhesive on both surfaces thereof, that secure the film-form substrate 403 and the film-form member 407.

Figure 28:
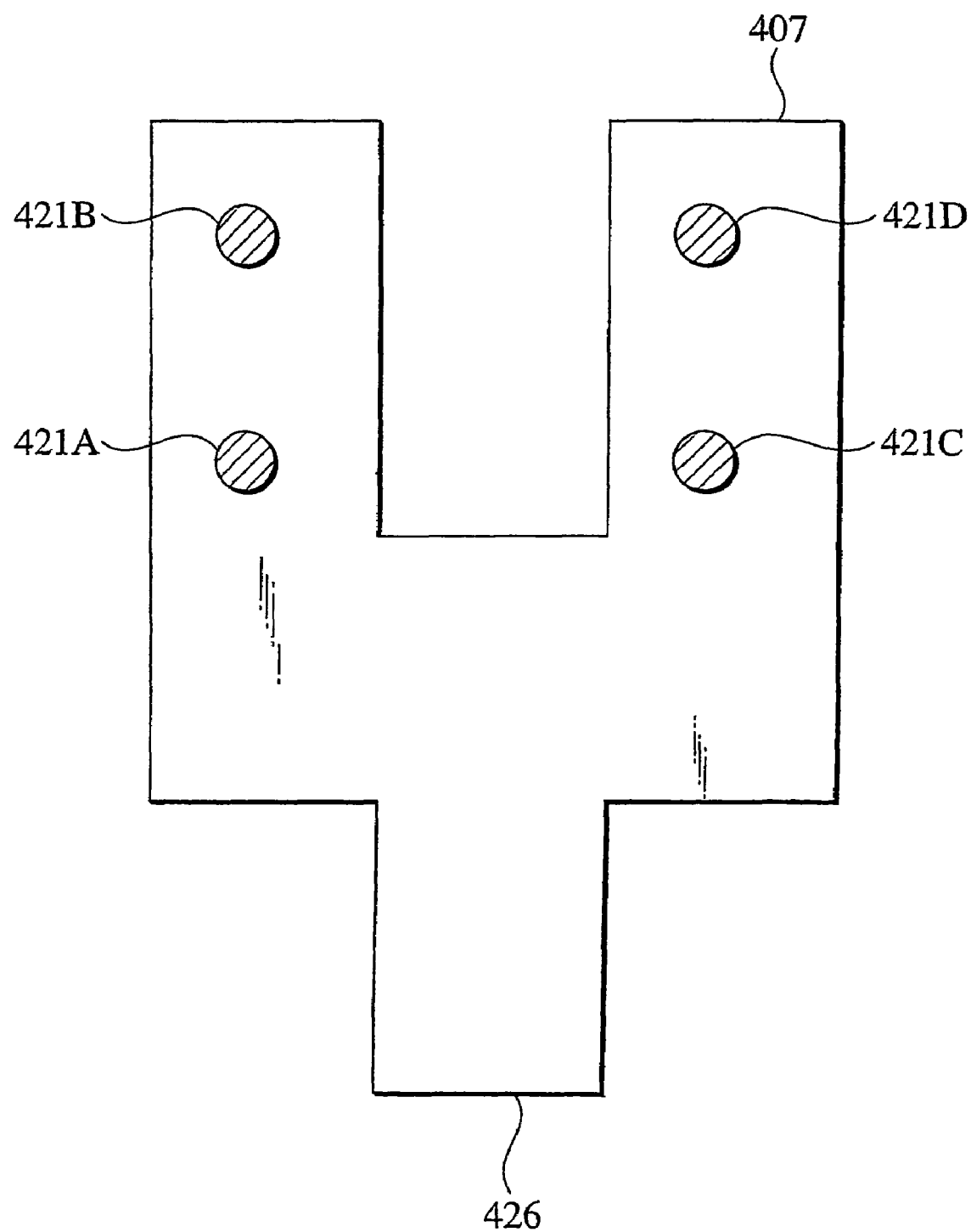
FIG. 28 is a schematic view of the film-form member comprising the seating detection switch according to the sixth embodiment.

FIG. 28 is a schematic view of the film-form member 407 of the seating detection switch 401. A thin conductors (third conductors) 421A, 421B, 421C and 421D are fixed to one surface of the film-form member 407 (the surface on the reverse side in FIG. 28; when incorporated in the seating detection switch 401, the side positioned facing the film-form substrate 403, in contact with the spacer 405).

The seating detection switch 401 shown in FIG. 23 is configured having the spacer 405 shown in FIG. 27, disposed as it is, without being turned over, over (the front surface of) the film-form substrate 403 shown in FIG. 26, while the film-form member 407 shown in FIG. 28 is disposed as it is without being turned over, over (the front surface of) the spacer 405. Thus, the one surface of the film-form substrate 403 and the one surface of the film-form member 407 are opposite to each other.

More specifically, as shown in FIG. 26, over the film-form substrate 403 the electrode 411A and the electrode 417A are positioned in proximity, mutually opposing each other. The electrode pairs consisting of the electrode 411B and the electrode 417B, the electrode 411C and the electrode 417C, as well as the electrode 411D and the electrode 417D are each arranged in the same manner. Each of these electrodes is formed in for example a comb shape (not shown).

As shown in FIG. 27, through holes 423A, 423B, 423C and 423D are formed in the spacer 405. As shown in FIG. 23, when the spacer 405 is secured, by being adhered for example, in the prescribed position over the film-form substrate 403, the through hole 423A is positioned in the location corresponding to the electrode 411A and the electrode 417A. In like manner, the through hole 423B is positioned in the location corresponding to the electrode 411B and the electrode 417B; the through hole 423C is positioned in the location corresponding to the electrode 411C and the electrode 417C; and the through hole 423D is positioned in the location corresponding to the electrode 411D and the electrode 417D.

The through hole 423A is formed larger than the location in which the electrodes 411A and 417A are provided, and surrounds the location of those electrodes. Further, each of the other through holes 423B, 423C and 423D, are formed larger than the locations of the respective electrodes to which they correspond in substantially the same manner as the through hole 423A, so as to surround the respective locations of those corresponding electrodes.

The conductor 421A is located in the position corresponding to the electrode 411A, the electrode 417A and the through hole 423A when the film-member 407 is fixed by being adhered for example in the prescribed position on the spacer 405 adhered to the film-form substrate 403. In the same manner, the conductor 421B is positioned in the location corresponding to the electrode 411B, the electrode 417B and the through hole 423B; the conductor 421C is positioned in the location corresponding to the electrode 411C, the electrode 417C and the through hole 423C; and the conductor 421D is positioned in the location corresponding to the electrode 411D, the electrode 417D and the through hole 423D.

The through hole 423A is formed larger than the conductor 421A and surrounds that conductor. Each of the other through holes, 423B, 423C and 423D also formed larger than the corresponding conductors 421B, 421C and 421D in the same manner as the through hole 423A, so that each of those other through holes surrounds the location of the corresponding conductors.

The conductor 421A is formed to a size that surrounds the external diameters (outlines) of the electrode 411A and the electrode 417A (the envelope of the external diameter of the electrode 411A and the external diameter of the electrode 417A). In the same manner, each of the conductors 421B, 421C and 421D also are formed of a size that surrounds the respective external diameters of each of the electrodes corresponding thereto.

In the seating detection switch 401, a terminal 409, formed for example in a rectangular shape and a terminal 415 of a rectangular shape the same as the terminal 409, are disposed in mutual proximity, parallel with respect to each other, on the same surface of the film-form substrate 403. The film-form substrate 403 is formed joining continuously between these terminals 409 and 415 (see FIGS. 23 and 26).

As shown in FIG. 23, the film form member 407 is not disposed in the locations where the terminals 409 and 415 are located, and in that vicinity. Accordingly, the end face 426 of the film-form member 407 is positioned slightly apart from the terminals 409 and 415, and those terminals and part of the conductors 413 and 419 at the respective sides thereof where those terminals are disposed, are exposed.

As shown in FIG. 25, instead of the spacer 405, double-sided adhesive tape 430 that is thinner than the spacer 405, is disposed over the region 428 extending from the vicinity of the locations where the terminals 409 and 415 are arranged to a position separated from those terminals by a determined distance (in FIG. 23, the region between the end face 426 of the film-form member 407 and the end face 425 of the spacer 405).

The double-sided tape 430 has a film shape and has adhesive on the front face and the rear face. Accordingly, in the same manner as the spacer 405, the film-form member 403 and the film-form substrate 407 are fixed to the respective sides of the double-sided tape 430.

This double-sided tape 430 is formed of a base material, such as nonwoven fabric having flexibility, impregnated with an adhesive agent, or alternatively, is formed without using a base material, simply of an adhesive agent that has strong adhesive and low viscosity.

Each of the terminals 409 and 415 are connected to the respective signal wires 427 and 429 of the wiring harness via a connector or eyelet or the like (see FIGS. 23 and 25).

The operations of this seating detection switch 401 will now be described.

In the seating detection switch 401 the electrode 411A and the electrode 417A are normally insulated from each other as the conductor 421A of the film-form member 407 is insulated from the electrodes 411A and 417A (at least from one of those electrodes) (refer FIG. 24).

In like manner, each of the other conductors 421B, 421C and 421D are isolated from the respective corresponding electrodes 411B, C and D and 417B, C and D. In this condition the seating detection switch 401 is in the OFF condition.

When a passenger sits down in a seat on which the seating detection switch 401 is installed, in response to the body weight of the seated passenger, at least one from among part of the film-form member 403 (the region in which the electrodes 411A and 417A etc. are disposed) and part of the film-form substrate 407 (the region in which each of the conductors 421A, etc. are disposed) bends, in the directions of the arrows AR1 and AR3 in FIG. 24. In response to this at least one of the pairings of electrodes 411A and 417A, 411B and 417B, 411C and 417C, or 411D and 417D, becomes mutually conductive.

Due to this conduction the terminal 409 and the terminal 415 become mutually conductive and the fact that the seating detection switch 401 has entered the ON condition is conveyed to a control device for example (not shown) of the car, via a signal wire of the wiring harness.

When the seating detection switch 401 is installed on a seat, the region 428 (see FIG. 23) corresponds to that part that curves substantially in response to the seating of a passenger.

In the case of the seating detection switch 401, as the double-sided tape that is thinner than the spacer 405 is disposed in the substantially curving region 428 instead of the spacer 405, the thickness of the seating detection switch 401 in that region 428 is smaller.

Here, if a bending force is applied to a planar member like the seating detection switch 401, making one of the surfaces convex and the other surface concave, the degree of shape transformation at the center line in the thickness direction of the planar member is substantially zero while the degree of shape transformation increases, substantially proportionately, toward one of the surfaces away from the centerline and toward the other surface. The planar member extends on one side thereof If the seating detection switch 401 curves at that part where film-form substrate 403, the film-form member 407 and the spacer 405 are provided, in other words, the part where the film-form substrate 403 and the film-form member 407 are mutually affixed together via the spacer 405, the bending between the layers is substantial.

That is to say, at this part, the seating detection switch 401 becomes thicker as the film-form substrate 403, the spacer 405 and the film-form member 407 are layered together, and the distance from the centerline of this thickness to the other surface of the film-form substrate 403 (the surface opposite that which faces the spacer 405) as well as the thickness from the centerline of this thickness to the other surface of the film-form member 407 (the surface opposite to that facing the spacer 405), is substantial.

On the other hand, in the region 428 of the seating detection switch 401, the seating detection switch 401 becomes thin as the double-sided tape 430 that is thinner than spacer 405 is used. The distance from the centerline in the thickness direction of the seating detection switch 401 in the region 428, through to the other surface of the film-form substrate 403 (the surface opposite to the side facing the spacer 405) as well as the distance from the centerline to the other surface of the film-form member 407 (the surface opposite to that facing the spacer 405), becomes small.

Accordingly, if the seating detection switch 401 curves (bends) substantially in the thickness direction, in the region 428 of the switch 401, the distortion and stress arising in the film-form substrate 403 and the film-form member 407 in that region 428 is small. Thus, even if there is substantial curving occurring in this region 428 due to the repetitive actions of passengers sitting down in and standing up from the seat, the region 428 does not sustain damage easily.

In other words, when the thin, film-form seating detection switch 401 capable of detecting whether or not a passenger is sitting in a seat is installed on a seat and a passenger sits down in this seat causing it to curve substantially, the seating detection switch 401 does not sustain damage easily.

Further, even if the seating detection switch 401 curves (bends) substantially in the thickness direction in the region 428, the distortion and stress arising in each of the conducting wires 413 and 419 disposed on the film-form substrate 403 in that region 428, is smaller than the distortion and stress arising where the spacer 405 is provided. Accordingly, there is little concern that each of the conducting wires 413 and 419 will transfer toward the double-sided tape 430 and sustain damage, even if substantial curving occurs in that region 428 due to the repetitive actions of a passenger sitting down and standing up from the seat.

That is to say, as the region 428 is provided with the flexible double-sided tape 430 that is thinner than the spacer 405 instead of the spacer 405 that has adhesive on both surfaces thereof, there is little concern that the conductors (those conducting wires in contact with the double-sided tape 430) 413 and 419 fixed to the film-form substrate 403, will transfer from the film-form substrate 403 toward the double-sided tape 430 and peel off if the region 428 sustains substantial curving. Thus, the occurrence of damage to the seating detection switch 401 due to breakage of the conducting wires (conductors) 413 and 419 is reduced.

The flexibility of the double-sided tape 430 does not normally deteriorate even under low temperatures, therefore if the seating detection switch 401 curves substantially in the region 428 under low temperature conditions, there is little concern that the conducting wires 413 and 419 will transfer toward the double-sided tape 430 and it is difficult for each of these conductive wires to be cut due to such transference.

Here, for easy understanding, the embodiment will be described using concrete values, however this should not be understood as restricting this embodiment within such parameters. Provided that the conductor (conducting wire 413 or conducting wire 419) disposed on one of the surfaces of film-form substrate 403 does not easily sustain wire breakage due to the curvature of the region 428 of the seating detection switch 401, any of the values provided below may be suitably changed.

The film-form substrate 403 is made a thickness of 100 µm, the spacer 405 a thickness of 150 µm, the film-form member 407, a thickness of 100 µm and the double-sided tape 430, a thickness of 15 µm. The thickness of the thin conductors (conductive wires 413 and 419) and the thickness of the adhesive layer disposed on the spacer 405 are not detailed here, as being extremely thin in comparison to the thickness of each of those other members. The thickness of the spacer 405 should be the thickness required to maintain the contacts of the film-form substrate 403 and the contacts of the film-form member 407 in a mutually separated state.

At those parts where the spacer 405 and the film-form member 407 are provided the thickness of the seating detection switch 401 equals 350 µm (100 µm+150 µm+100 µm). Accordingly, the centerline is positioned in the location 175 µm(350 µm/2) from one of the surfaces of the seating detection switch 401 (the surface of the film form substrate 403). Further, the conductor 413 or conducting wire 419 disposed on the film-form substrate 403 are positioned 75 µm (175 µm−100 µm) from one of the surfaces of the seating detection switch 401.

On the other hand, at those parts where the spacer 405 is removed and the double-sided tape 430 is installed, the thickness of the seating detection switch 401 is 215 µm (100 µm+15 µm+100 µm). Thus, the centerline in the thickness direction of these parts is positioned 107.5 µm (215 µm/2) from one of the surfaces of the seating detection switch 401 (the surface of the film form substrate 403). Further, the conductor (conducting wire 413 or conducting wire 419) installed on the film-form substrate 403 is positioned 75 µm (175 µm−100 µm) from one of the surfaces of the seating detection switch 401.

Thus, when the seating detection switch 401 is bent to curve, the degree of shape transformation sustained by the film-form substrate 403, film-form member 407 and conducting wires 413 and 419 is less, and the stress arising in the film-form substrate 403, film-form member 407 and conducting wires 413 and 419 is small, when bending occurs in those parts where the spacer 405 is removed and the double-sided tape 430 is provided than where the spacer 405 is provided.

As the terminals 409 and 415 are disposed on one of the surfaces (of the film-form substrate 403) of the seating detection switch 401, there is no need to turn the seating detection switch 401 over when connecting the connection terminals of electric wires (signal wires) installed in a wiring harness to those terminals. Accordingly, the connection terminals of an electric wire or the like provided by a wiring harness can easily be connected to each of the terminals 409 and 415 of the seating detection switch 401.

Further, the terminals 409 and 415 of the seating detection switch 401 are arranged in mutual proximity, and the film-form substrate 403 is formed connected continuously between those terminals. Thus, if for example a pulling force is exerted on either one of the signal wires 427 or 429, this pulling force can be received by that part having the film-form substrate 403 laid continuously between the terminal 9 and the terminal 15. This provides an improved degree of strength in response to an external force such as pulling force applied to a signal wire extending from the seating detection switch 401.

Here, the part of the seating detection switch 401 comprised of the electrodes 411A and 417A and the conductor 421A is referred to as a switch portion (contact) 431A. In the same manner, the parts comprised of the other electrodes 411B and 417B as well as the conductor 421B is referred to as a switch portion 431B, and the remaining groupings of the electrodes 411C and 417C with the conductor 421C and of the electrodes 411D and 417D with the conductor 421D, are respectively referred to as a switch portion 431C and a switch portion 431D (see FIG. 23). It is evident from the above description that an OR circuit is formed by these switch portions 431A, 431B, 431C and 431D, however it is also suitable for these switch portions 431A, 431B, 431C and 431D to form an AND circuit.

In this seating detection switch 401 there are four switch portions 431A, 431B, 431C and 431D, however it is also suitable for there to be one switch portion or a plurality of switch portions.

In the seating detection switch 401, the film-form substrate 403 (or the seating detection switch 401) extends along as one single body on the side having the terminals 409 and 415 and branches in to two extensions on the side having the switch portions 431A and 431B and 431C and 431D, however the film-form substrate (or the seating detection switch) may be of another suitable form.

Further, the shape and position of installation of the conductor 413 or the conductor 419 may be changed to accommodate change in the shape of the film-form substrate or the number of switch portions.

When forming the switch portions 431A, 431B, 431C and 431D, the spacer 405 or the film-form member 407 may also be formed as, individual round shaped members 433A, 433B, 433C and 433D as shown by the double dash chain line in FIG. 23.

Seventh Embodiment

Figure 29:
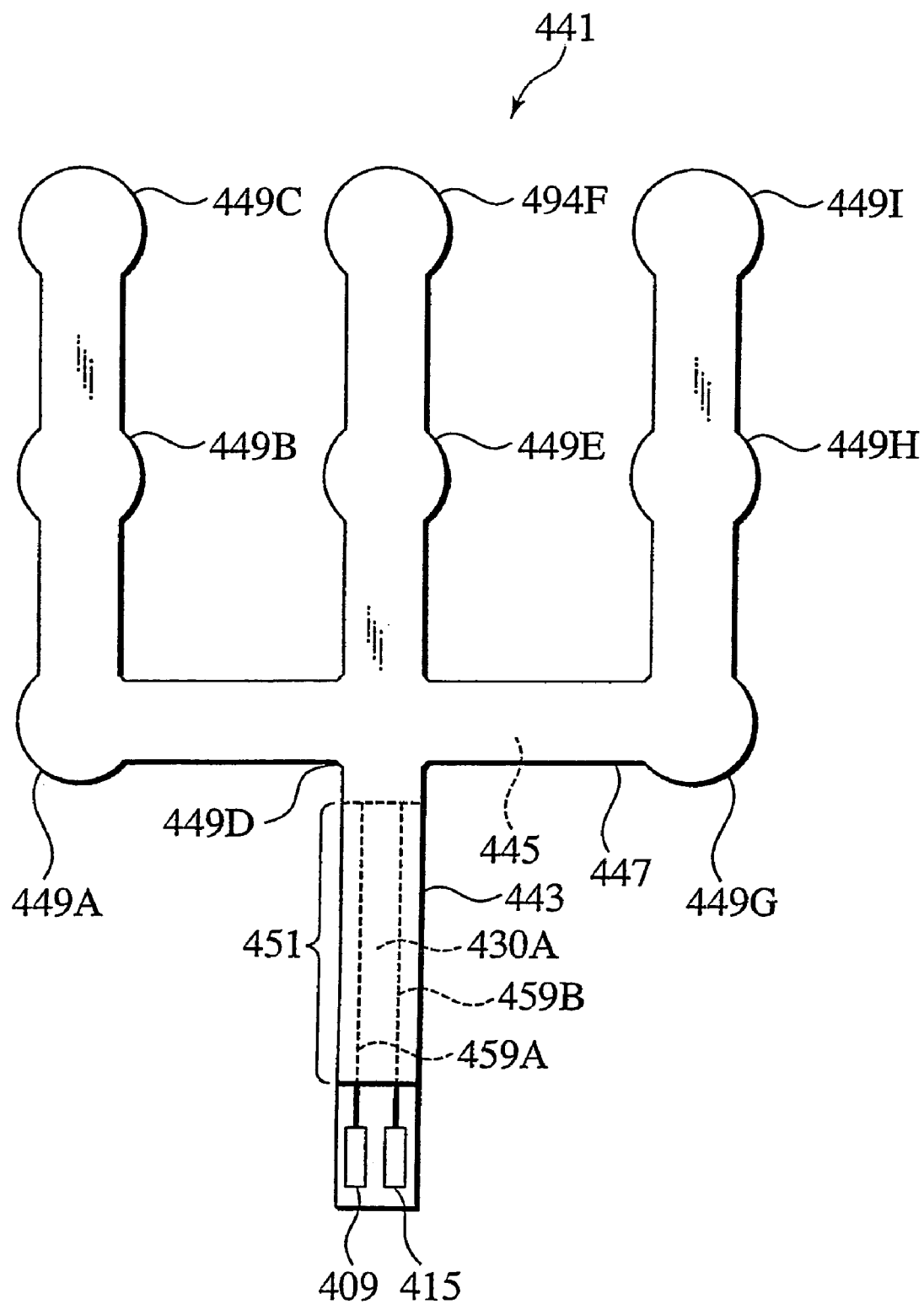
FIG. 29 is a schematic view of a seating detection switch according to a seventh embodiment of the present invention.

FIG. 29 is a schematic view of the seating detection switch 441 according to a seventh embodiment of the present invention.

The seating detection switch 441 differs from the seating detection switch 401 according to the sixth embodiment in the shape of the film-form substrate 443, the spacer 445 and the film-form member 447, as well as in having nine switch portions 449A to 449I. In all other respects, this seating detection switch 441 is substantially the same as the seating detection switch 401.

That is to say, the film-form substrate 443, spacer 445 and film-form member 447 branch into three at that side of the seating detection switch 441 opposite to the side at which the terminal 409 and the terminal 415 are installed, and three switch portions are provided on each of these branches. The switch portions 449A to 449I form an OR circuit.

At the side of the film-form substrate 443 where the terminals 409 and 415 are installed, a long region (part) 451 is formed, providing double-sided tape 430A (formed substantially the same as the double-sided tape 430 according to the sixth embodiment) that is thinner than the spacer 445, instead of the spacer 445.

The seating detection switch 441 installed on a car seat to 453 will now be described.

Figure 30:
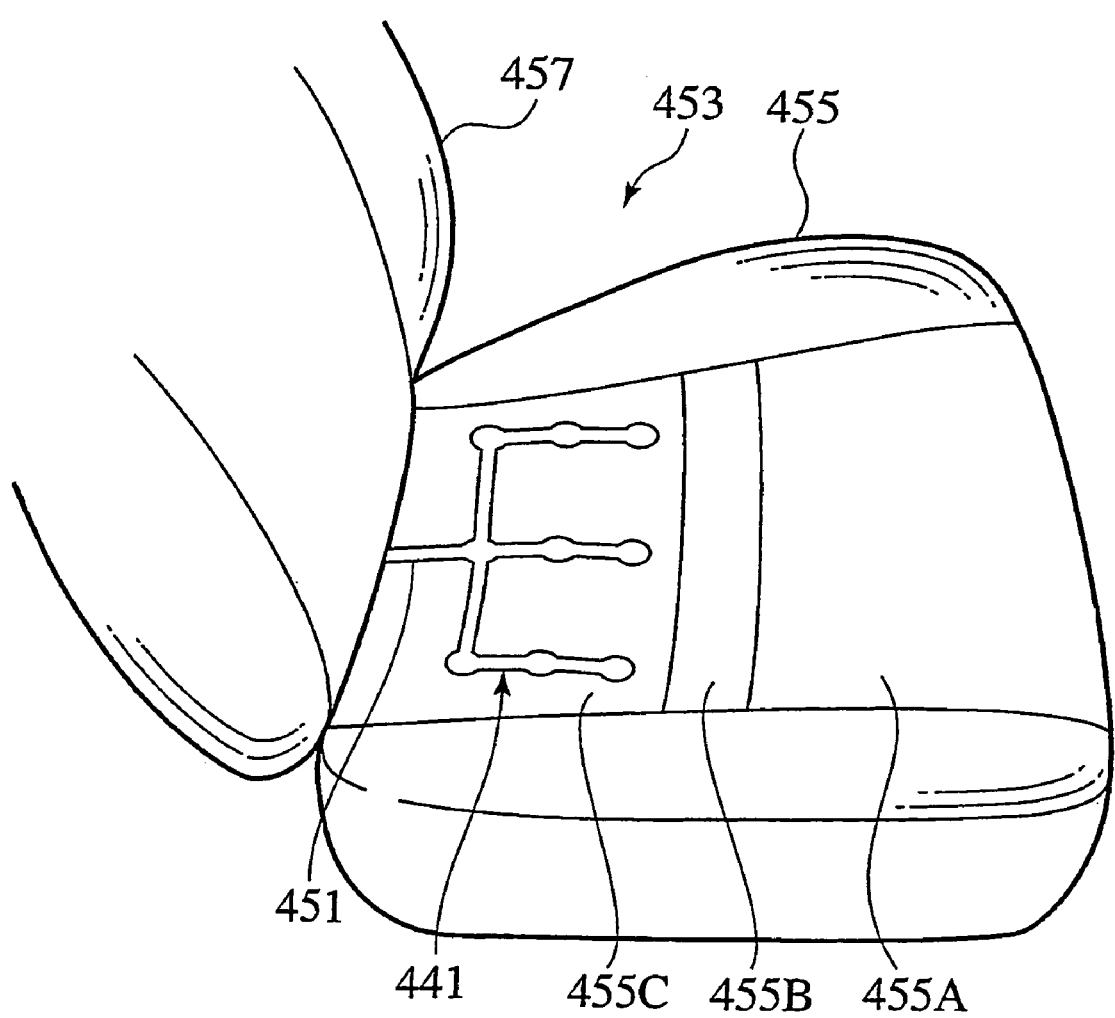
FIG. 30 shows the seating detection switch of the seventh embodiment installed on a car seat.

FIG. 30 shows the seating detection switch 441 installed on the seat 453 of a car with the external covering of the seat 453 removed. Accordingly, when a car in which the seat 453 is installed is sold for use, the seating detection switch 441 would be covered with an external seat covering and therefore could not be seen from the outside.

The seat 453 comprises a seating part 455 and seat back 457. For comfortable seating of a passenger the center area of the seating part 455 in the widthwise direction is divided into three parts; a front part 455A, a center part 455B and a rear part 455C.

The seating detection switch 441 is installed conforming to the surface of the rear part 455C so that the side of the switch 441 having the region 451 where the spacer and the film-form member are removed, faces toward the rear of the seat 453. The end of the region 451 (the end at the rear of the seat 453) enters in between the seating part 455 and the seat back 457, while a wiring harness extends from the terminals 409 and 415 disposed at the end of the region 451. The terminals 409 and 450 and the wiring harness are concealed by the image of the seat 453 and therefore do not appear in FIG. 30.

When a passenger sits in the seat 453 at least one from among the switch portions 449A-449I becomes conductive (turns ON) in response to the weight of the passenger, and the part of the rear part 455C of the seat 453 where the bodyweight of the passenger is exerted substantially, that is to say, the region from just in front of the border of the rear part 455C and the seat back 457 to the border of the rear part 455C in the center part 455B, is substantially depressed down. The seating detection switch 441 curves (bends) substantially at the region 451 in response to this downward depression.

The seating detection switch 441 is constructed substantially the same as the seating detection switch 401 and therefore operates in substantially the same manner as the switch 401 and furnishes substantially the same effects.

As described above, the region 451 has the double-sided tape 430 instead of the spacer 445 and the thickness of the region is thereby reduced. Accordingly, in the same manner as the seating detection switch 401, even if the seating detection switch 441 curves (bends) substantially in the thickness direction at the region 451, the stress arising in film-form substrate 443 at the region 451 is small. Thus, even though the region 451 is subjected to being substantially curved repeatedly due to the action of passengers sitting down in and standing up from the seat 453, the region 451 is resilient and does not sustain damage easily.

Further, the spacer 445 having adhesive on both sides thereof is not provided in the region 451. Thus, there is no concern that the conducting wires 459A and 459B fixed to the film-form substrate 443 will transfer from the film-form substrate 443 toward the spacer 445 and peel off when substantial bending action occurs repeatedly. Accordingly, the occurrence of damage to the seating detection switch 441 due to wire breakage of the conducting wires 459A and 459B is substantially prevented.

Eighth Embodiment

Figure 31:
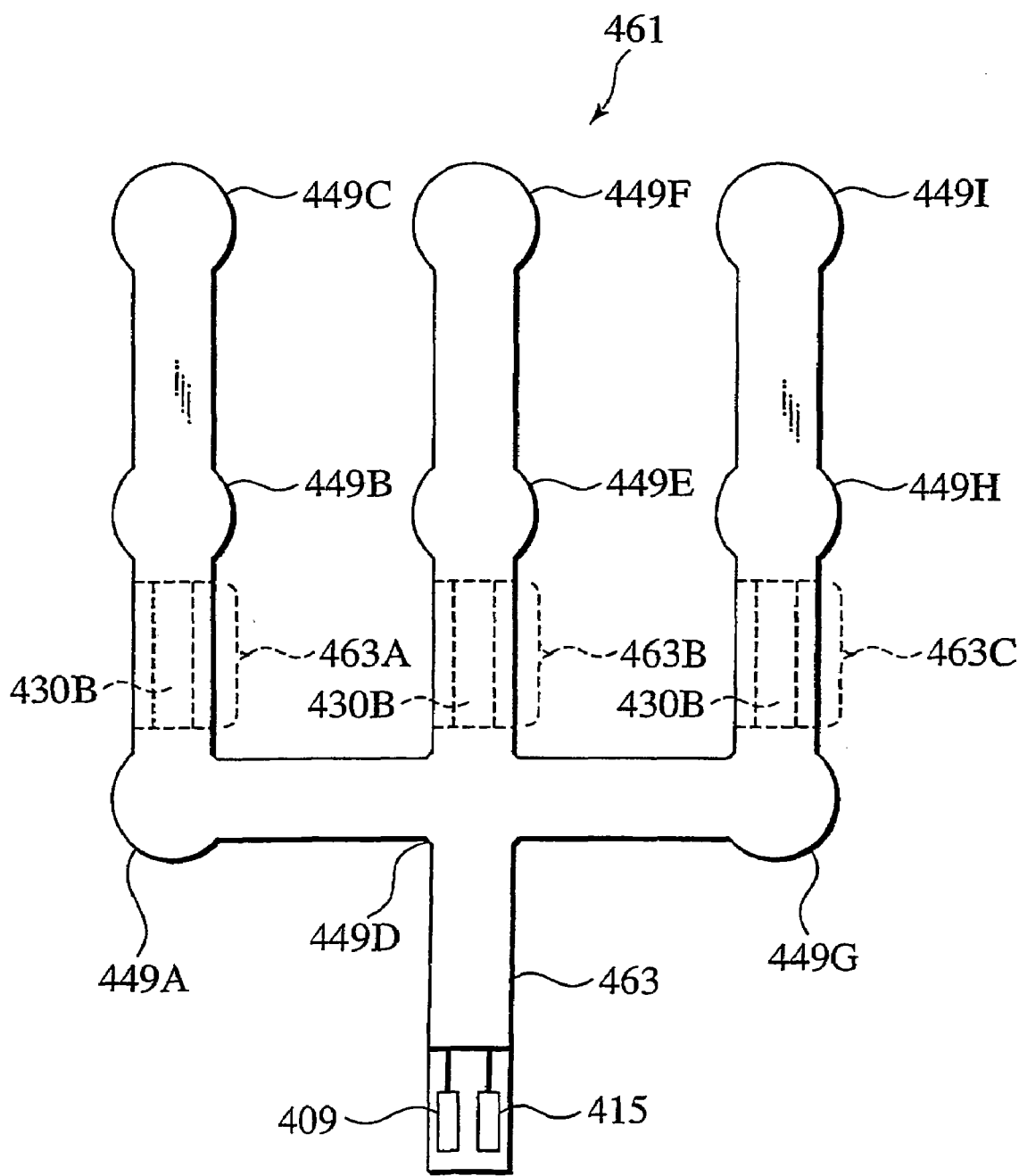
FIG. 31 is a schematic view of a seating detection switch according to an eighth embodiment of the present invention.

FIG. 31 is a schematic view of the seating detection switch 461 according to an eighth embodiment of the present invention.

The seating detection switch 461 differs from the seating detection switch 441 according to the seventh embodiment in that the regions 463A, 463B and 463C in which double-sided tape 430B is provided instead of the spacer, which is removed, are further separated from the terminals 409 and 415, and are each formed long in the center part of a film-form substrate 463 which branches into three. In all other respects, this seating detection switch 441 is substantially the same as the seating detection switch 401.

The seating detection switch 461 is constructed substantially the same as the seating detection switches 401 and 441 and therefore operates in substantially the same manner and furnishes substantially the same effects as the switches 401 and 441.

The seating detection switch 461 installed on a car seat to 473 will now be described.

Figure 32:
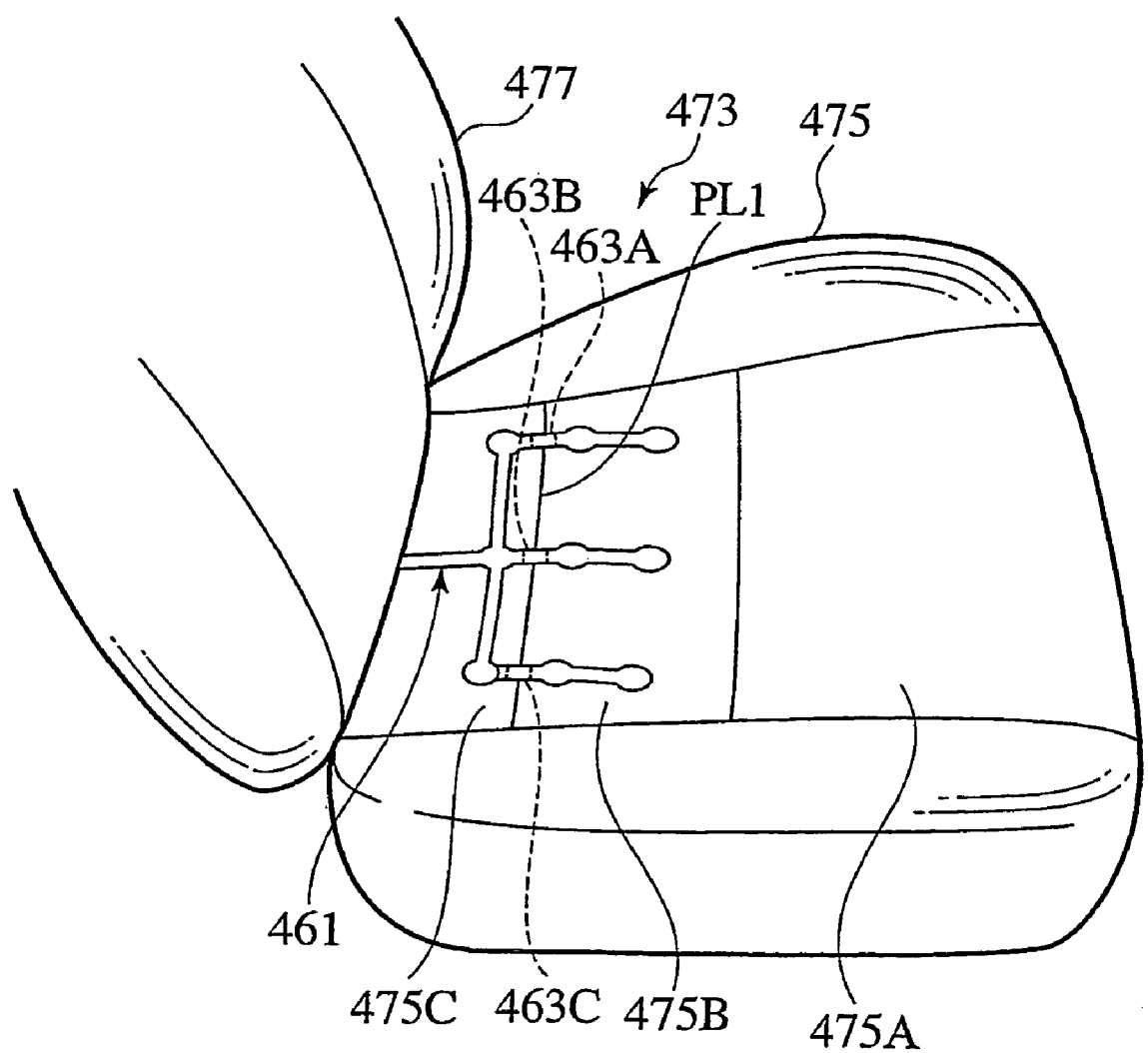
FIG. 32 shows the seating detection switch of the eighth embodiment installed on a car seat.

FIG. 32 shows the seating detection switch 461 installed on the seat 473 of a car.

The seat 473 comprises a seating part 475 and seat back 477. For comfortable seating of a passenger the center area of the seating part 475 in the widthwise direction is divided into three parts; a front part 475A, a center part 475B and a rear part 475C. In this respect the seat 473 is the same as the seat 453, however, the border PL1 between the center part 475B and the rear part 475C is positioned more to the rear in the case of the seat 473 than in the case of the seat 453.

The seating detection switch 461 is installed on the seat 473 such that the regions 463A, 463B and 463C of the switch 461 span over the border PL 1.

When a passenger sits in the seat 473 at least one from among the switch portions 449A-449I becomes conductive (turns ON) in response to the weight of the passenger. Further, as the body weight of the passenger exerts more substantially on either the rear part 475C or the center part 475B, a difference in weight dispersal arises at the border PL1, in response to which, each of the regions 463A, 463B and 463C curve substantially.

In this way, even though the regions 463A, 463B and 463C are bent to curve substantially, because they are of a thin form, in the same manner as the seventh embodiment, damage to or wire breakage in those parts is substantially prevented.

Ninth Embodiment

In a seating detection switch according to the ninth embodiment of the present invention the configuration of the conductors and terminals disposed on the film-form substrate and film-form member differs from that found in the sixth to eighth embodiments, but in all other respects, the configuration is substantially the same as the sixth to eighth embodiments.

In the seating detection switches according to the sixth to eighth embodiments, two terminals and conductors are disposed on the film-form substrate, conductors are disposed on the film-form member and terminals become conductive via the conductors. On the other hand, in the case of the ninth embodiment, a terminal and a conductor are disposed on a film-form substrate and film-form member respectively, and the terminal disposed on the film-form substrate becomes conductive with the terminal disposed on the film-form member as the conductor disposed on the film-form substrate becomes conductive with the conductor disposed on the film-form member.

In other words, the seating detection switch according to this ninth embodiment comprises: a first conductor fixed to one of the surfaces of a film-form substrate (the surface facing a film-form member; the surface facing a spacer) made of insulating material, providing a first terminal at one end and a first electrode at other end; and a second conductor fixed to one of the surfaces of the film-form member (the surface facing the film-form substrate; the surface facing the spacer) made of insulating material, providing a second terminal at one end and a second electrode at the other end. The surface of the film-form substrate on which that first conductor is disposed and the surface of the film-form member on which the second conductor is disposed mutually oppose each other, and when a passenger sits down in a seat on which this seating detection switch is installed the first electrode and the second electrode come into contact and the first terminal and the second terminal become conductive.

Accordingly, in the same manner as the seating detection switch according to each of the above described embodiments, in the seating detection switch according to the ninth embodiment, the area that curves substantially does not easily sustain damage or wire breakage.

Tenth Embodiment

Figure 33:
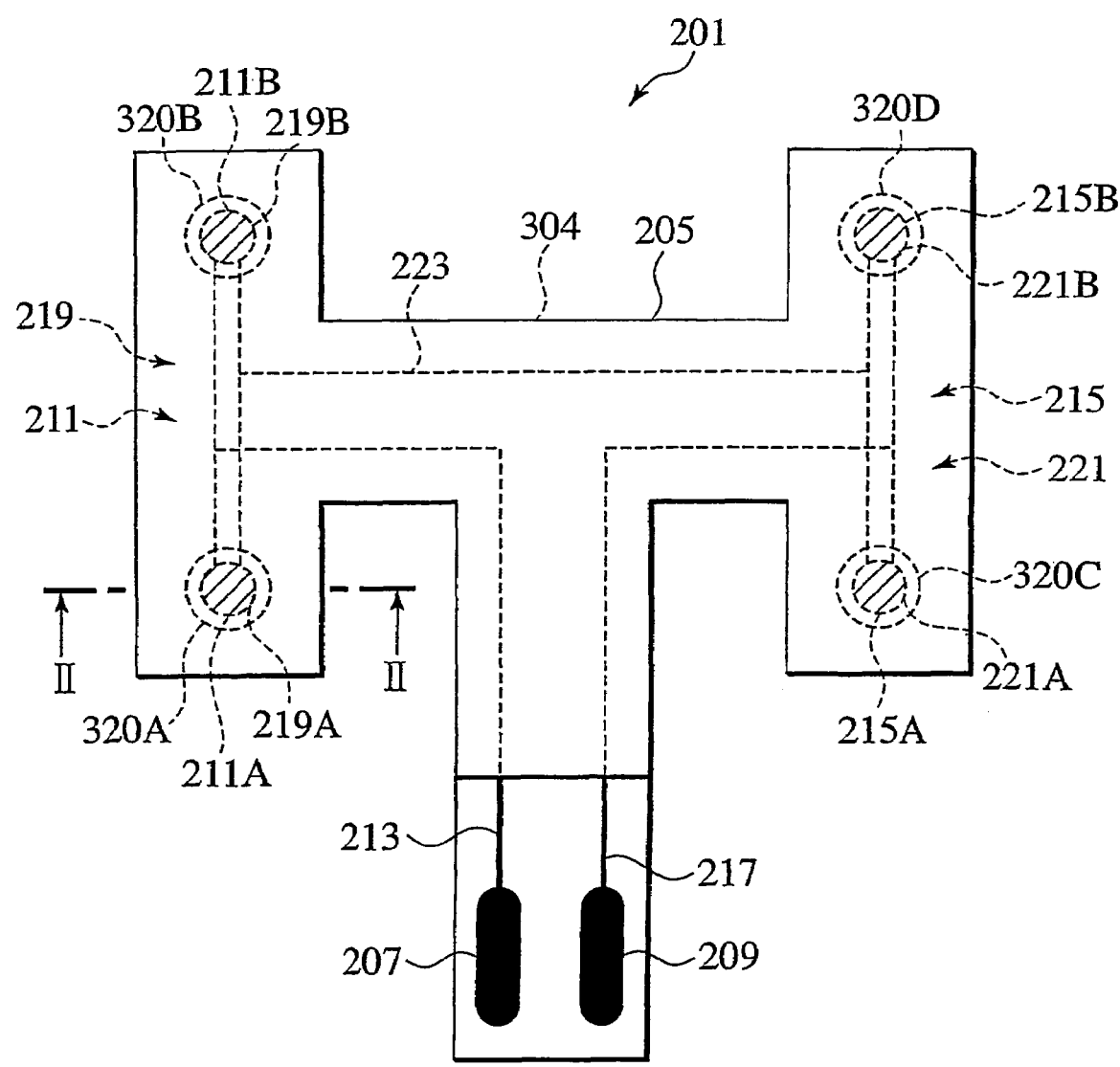
FIG. 33 is a schematic view of a seating detection switch according to a tenth embodiment of the present invention.

FIG. 33 is a schematic view of the seating detection switch 201 according to a tenth embodiment of the present invention In the same manner as the conventional seating detection switch 300 or the seating detection switch 111 according to the fifth embodiment of the present invention, the detection switch 201 is for example arranged at the rear side of the covering of a seat that a person can sit in, operates in response to the body weight of a passenger who sits down in the seat and is used as a seating detection device for detecting whether or not a passenger is sitting in the seat.

Figure 4:
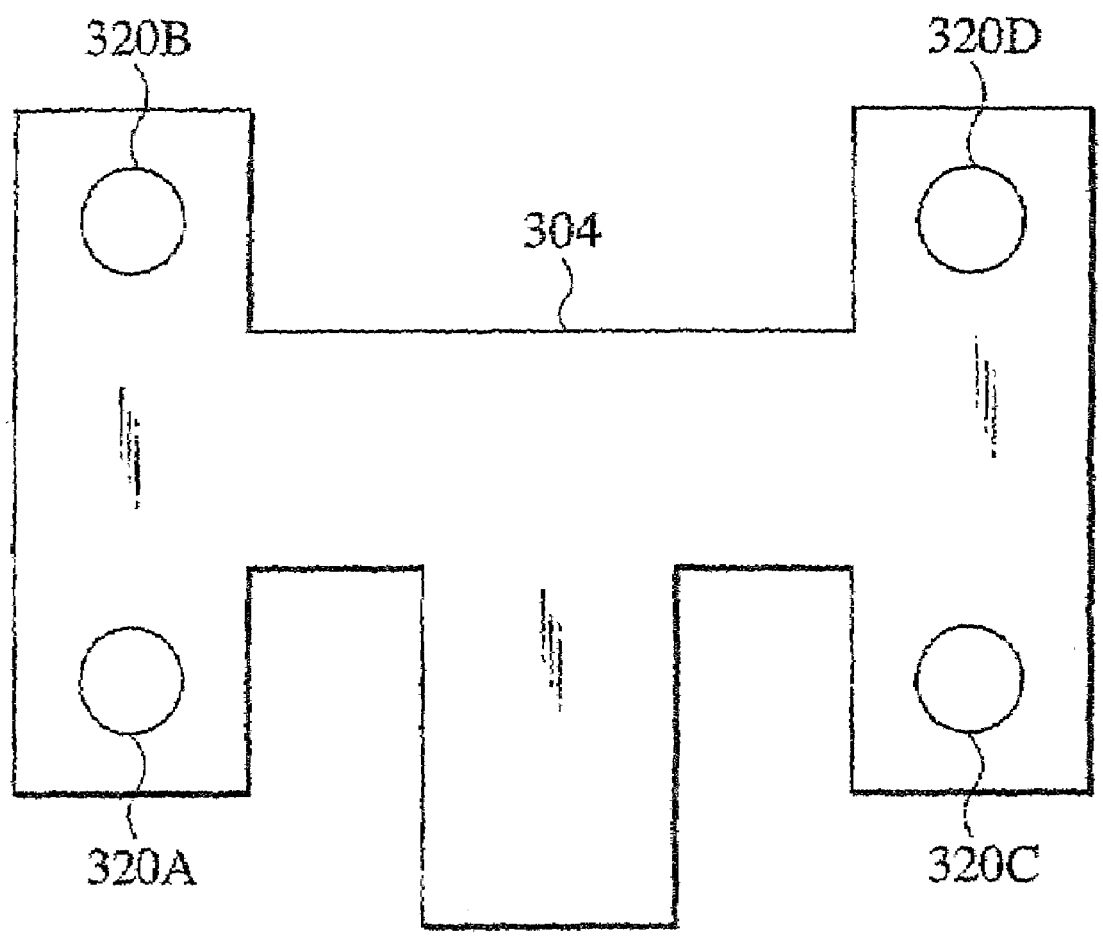
FIG. 4 is a schematic view of the spacer comprising the conventional seating detection switch.
Figure 5:
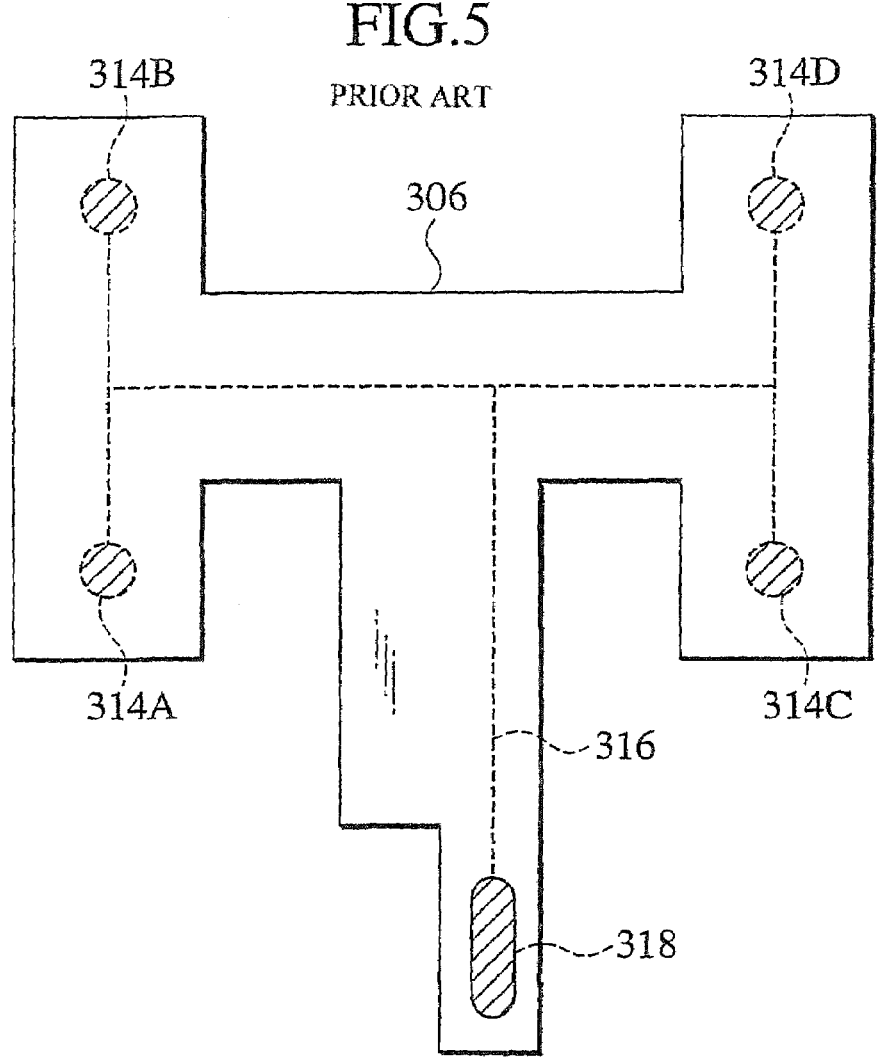
FIG. 5 is a schematic view of the film-form member comprising the conventional seating detection switch.
Figure 6:
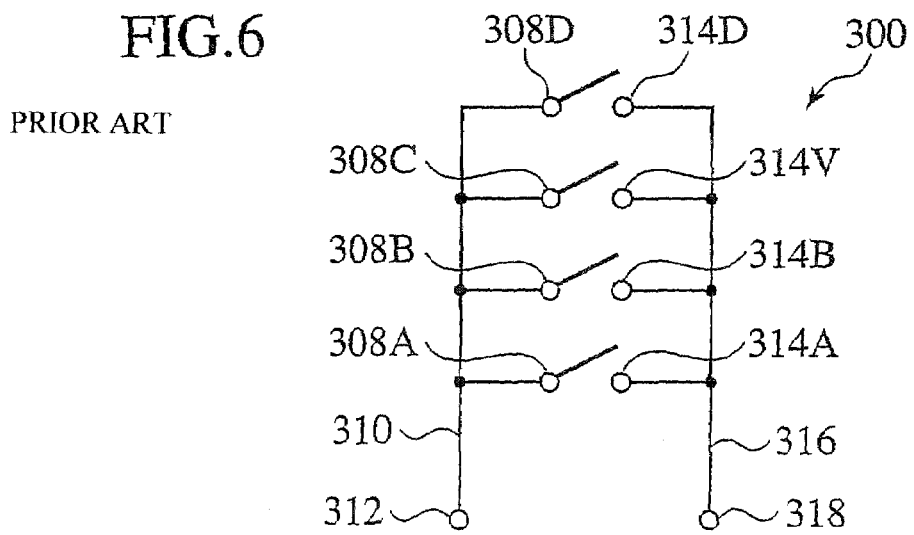
FIG. 6 is a circuit diagram of the conventional seating detection switch.

The seating detection switch 201 comprises a spacer that is the same as the spacer 304 of the conventional seating detection switch 300 (see FIG. 4). A film-form substrate 203 is arranged on one surface of the spacer 304 while a film-form member 205 is arranged on the other surface of that spacer 304. The film-form substrate 203 and the spacer 304, and the film-form member 205 and the spacer 304 are adhered together by for example, an adhesive agent.

Figure 2:
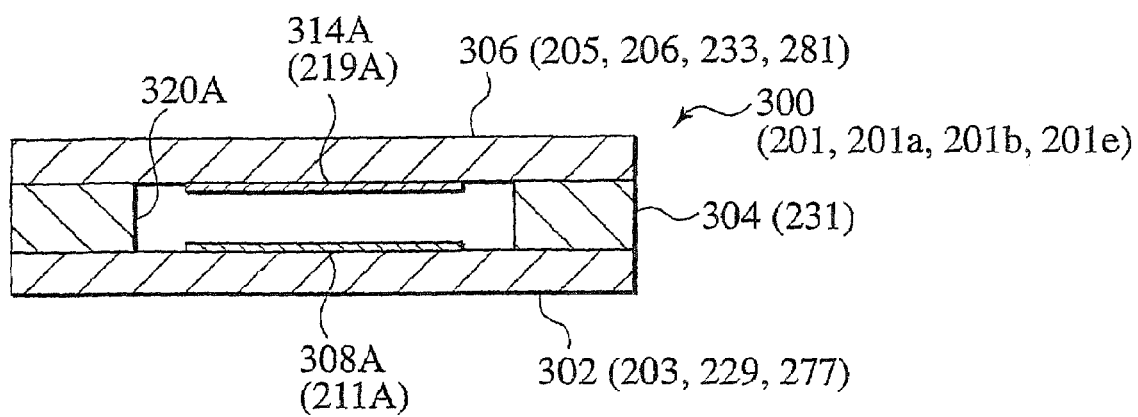
FIG. 2 is a cross-sectional view along the line II-II of FIG. 1.
Figure 3:
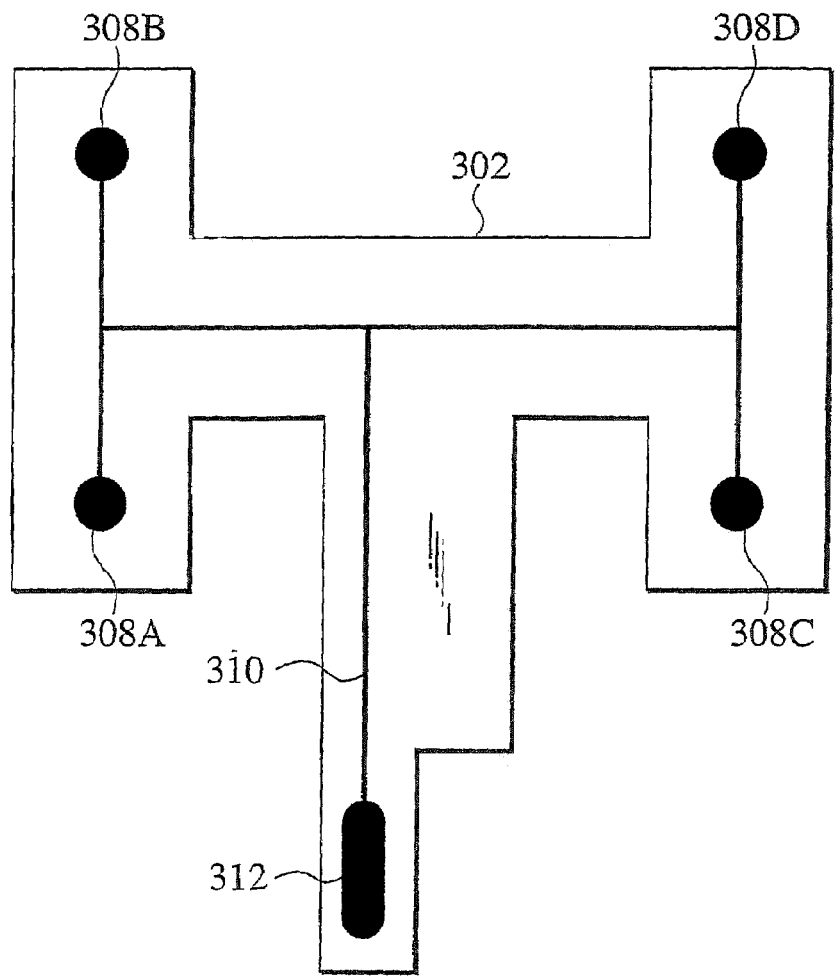
FIG. 3 is a schematic view of the film-form substrate comprising the conventional seating detection switch.

The cross-section at the contact part of the seating detection switch 201 (the cross-section in the thickness direction of the seating detection switch 201; the cross-section II-II in FIG. 33) is formed the same as in the conventional seating detection switch 300 (see FIG. 2).

Figure 34:
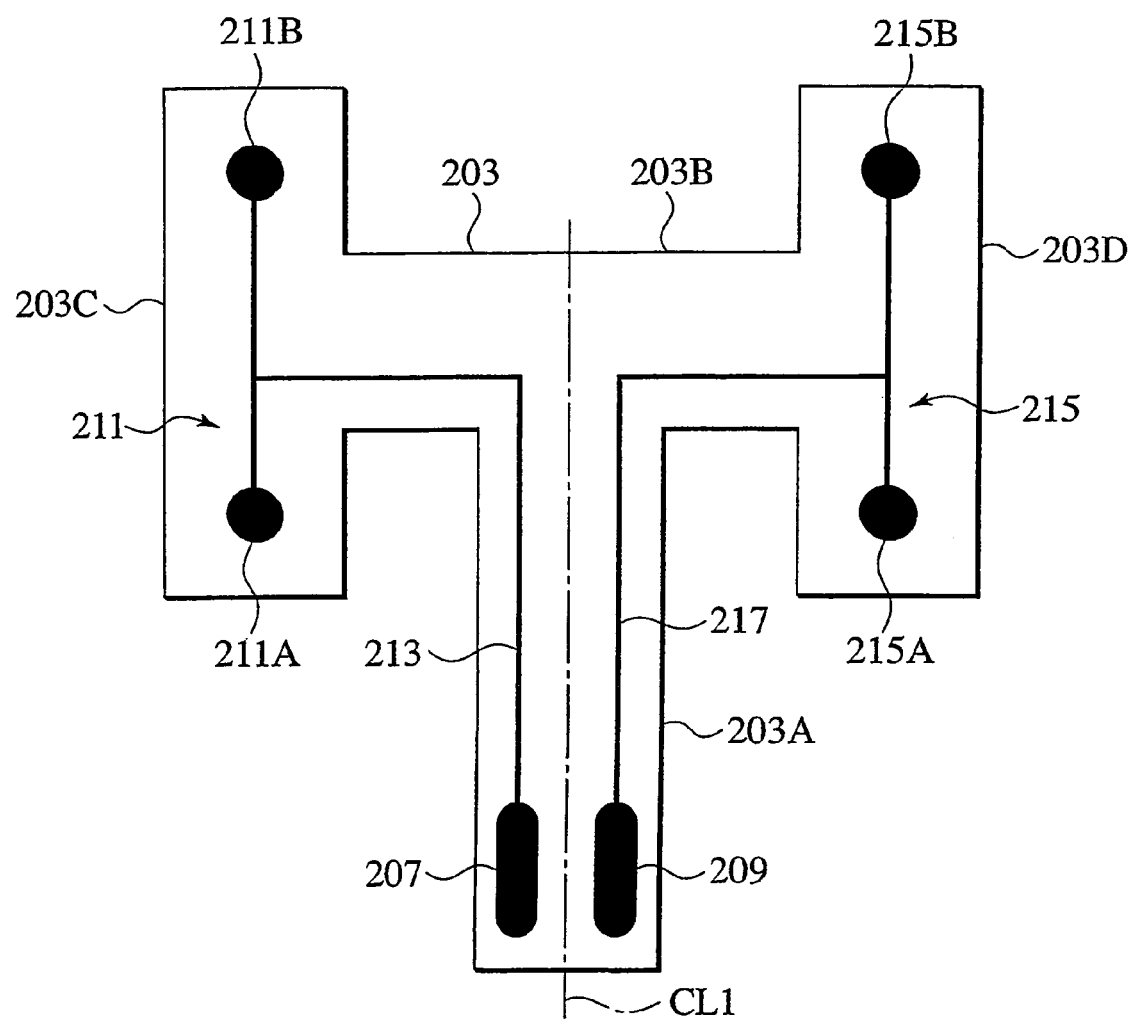
FIG. 34 is a schematic view of the film-form substrate comprising the seating detection switch according to the tenth embodiment.

FIG. 34 is a schematic view of the film-form substrate 203 of the seating detection switch 201.

The film-form substrate 203 is flexible and comprises an insulating body of PEN resin or PET resin or the like in a thin, film form.

The film-form substrate 203 is formed thinly and comprises a proximal (side) region 203A formed as a long, thin belt like shape at a determined width. At the end part of the proximal region 203A a intermediate region 203B is integrally provided, formed as a long, thin belt like shape at a determined width.

The longitudinal direction of the proximal region 203A and the longitudinal direction of the intermediate region 203B are substantially orthogonal, the central part in the longitudinal direction of the intermediate region 203B connects to the end part of the proximal region 203A so that a letter T shape region is formed by the proximal region 203A and the intermediate region 203B.

At one end in the longitudinal direction of the intermediate region 203B a first distal (side) region 203C is integrally provided, formed as a long, thin, belt like shape at a determined width. The longitudinal direction of the intermediate region 203B and the longitudinal direction of the first distal region 203C are substantially orthogonal, the central part in the longitudinal direction of the first distal region 203C connects to the end part in the longitudinal direction of the intermediate region 203B.

At the other end in the longitudinal direction of the intermediate region 203B a second distal (side) region 203D formed in the same manner as the first distal region 203C is integrally provided in the same manner as the first distal region 203C. A letter H shape is formed by the intermediate region 203B, the first distal region 203C and the second distal region 203D.

Formed according to the above described configuration, the film-form substrate 203 branches into a plurality in the direction from the proximal part to the distal parts. Further, in relation to the centerline CL1 that passes through the center part in the widthwise direction of the proximal region 203A as it extends in the longitudinal direction of that proximal region 203A, the film-form substrate 203 is formed linearly symmetrically, while each of the terminals of the first and second distal regions 203C and 203D are arranged mutually substantially spaced apart.

A first terminal 207 and a second terminal 209 are disposed spaced apart on the base part side (the opposite side to the intermediate region 203B) of the proximal region 203A on one of the surfaces of the film-form member 203. The first terminal 207 is positioned at the side where the first distal region 203C is disposed, while the second terminal 209 is positioned at the side where the second distal region at 203D is disposed. Further, the first and second terminals 207 and 209 are disposed positioned linearly symmetrically in relation to the centerline CL1.

The first terminal 207 and the second terminal 209 are used to electrically connect the seating detection switch 201 to connectors extending from another electrical device, such as for example a control device of a car. The first and second terminals 207 and 209 are connected to another electrical device via a connection means, such as a connector or eyelet.

An appropriate number of contacts 211A and 211B comprising a first contact arrangement 211 that become electrically conductive with the first terminal 207, are disposed on the surface of the film-form substrate 203 facing the film-form member 205 (the surface on the inner side; one of the surfaces of the film-form substrate 203).

More specifically, the contacts 211A and 211B are disposed respectively in the center part in the widthwise direction of the first distal region 203C, at both end parts (both ends) in the longitudinal direction of the first distal region 203C. Further, a first conduction route 213 is formed on the surface of the film-form substrate 203 facing the film-form member 205, while the first terminal 207 and first contacts 211A and 211B are electrically connected, conducting via this first conduction route 213.

This first conduction route 213 extends at the first distal region 203C side in the widthwise direction of the proximal region 203A, straight in the longitudinal direction of the proximal region 203A from the first terminal 207 to the center part in the widthwise direction of the intermediate region 203B, and then straight in the longitudinal direction of the intermediate region 203B from the center part in the widthwise direction of the intermediate region 203B to the center part in the widthwise direction of the distal region 203C.

Moreover, the first conducting route 213 branches into two parts at the place where it extends to the center part in the widthwise direction of the first distal region 203C: one branch extends straight in the longitudinal direction of the first distal region 203C to one of the first contacts 211A, and is connected to the contact 211A.

Further, the other branch of the first conducting route 213 extends straight in the longitudinal direction of the first distal region 203C to the other of the first contact 211B, and is connected to the contact 211B.

In other words, in coordination to the branching of the film-form substrate 203 into a plurality as it extends from the intermediate region 203B to the first distal region 203C, the first conduction route 213 also branches, and the contacts 211A and 211B are disposed at each of the ends of the branched conduction route 213.

Further, on the surface of the film-form substrate 203 facing the film-form member 205 (the surface of the inner side; one of the surfaces of the film-form substrate 203), the appropriate number of contacts 215A and 215B comprising a second contact arrangement 215, are disposed symmetrical with the contacts 211A and 211B of the first contact arrangement 211, in relation to the centerline CLI.

As the contacts 215A and 215B are disposed on the second distal region 203D that is substantially spaced apart from the first distal region 203C, those contacts are substantially spaced apart from the first contact arrangement 201 (contacts 211A, 211B).

In the seating detection switch 201, the distance between the contact arrangement 211 and the contact arrangement 215 is longer than the distance between the contacts comprising each of those contact arrangements. For example, the distance between the contact 211A that is one of the contacts comprising the first contact arrangement 211 and the contact 215A that is one of the contacts comprising the second contact arrangement 215, is greater than the distance between the contact 211A and the contact 211B that is the other of the contacts comprising the first contact arrangement 211.

A second conduction route 217 is also formed on the surface of the film-form substrate 203 facing the film-form member 205, and the second terminal 209 and contacts 215A and 215B become electrically conductive via this second conduction route 217. In relation to the centerline CL1, the second conduction route 217 is disposed symmetrical with the first conduction route 213.

The contacts 211A, 211B, 215A and 215B as well as the conduction routes 213 and 217 are formed for example from a thin silver fixed by being printed on to the surface of the film-form substrate 203 and a thin carbon disposed on the silver.

The spacer 304 (see FIG. 4) is flexible and of a film-form insulating body of PEN resin or PET resin or the like, like the film-form substrate 203.

The external shape of the spacer 304 is formed of substantially the same shape as the film-form substrate 203. That is to say, where the film-form substrate 203 is adhered to one of the surfaces of the spacer 304 for forming the seating detection switch 201, the external shape of the spacer 304 and that of the film-form substrate 203 are substantially, mutually in conformance.

However, the position on the spacer 304 corresponding to the base part side of the proximal side region 203A of the film-form substrate 203 (the position corresponding to the location where the terminals 207 and 209 are disposed on the film-form substrate 203) is removed, so that when the film-form substrate 203 is adhered to one of the surfaces of the spacer 304, the terminals 207 and 209 disposed on the film-form substrate 203 are not hidden, but are exposed.

Through holes 320A-320D penetrating through the spacer 304 in the thickness direction are disposed respectively in positions in the spacer 304 corresponding to the positions at which the contacts 211A, 211B, 215A and 215B are disposed.

Figure 35:
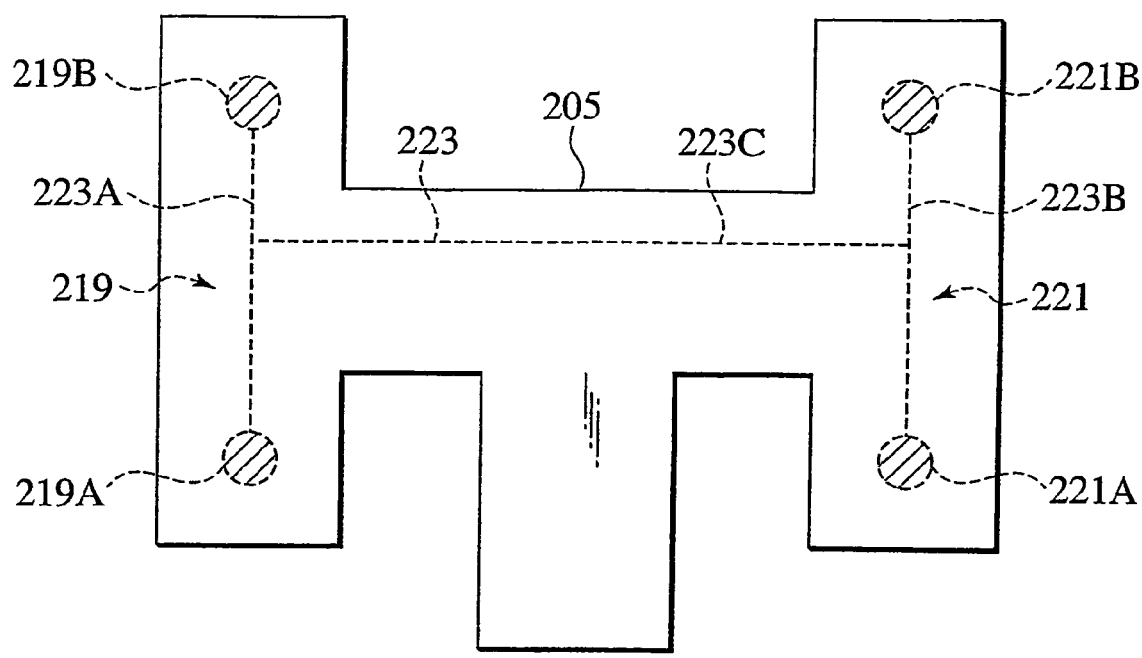
FIG. 35 is a schematic view of the film-form member comprising the seating detection switch according to the tenth embodiment.

FIG. 35 is a schematic view of the film-form member 205 of the seating detection switch 201.

This film-form member 205 is flexible, and of a film-form insulating body of PEN resin or PET resin or the like, like the film-form substrate 203 or the spacer 304.

The external shape of the film-form member 205 is formed of substantially the same shape as the spacer 304.

Further, on the surface of the film-form member 205 facing the film-form substrate 203 (the surface of the inner side; one of the surfaces of the film-form member 205), are disposed a third contact arrangement 219 comprising the appropriate number of contacts 219A and 219B, opposing the respective contacts 211A and 211B of the first contact arrangement, so as to be able to contact those contacts, and a fourth contact arrangement 221 comprising the appropriate number of contacts 221A and 221B, opposing the respective contacts 215A and 215B of the second contact arrangement, so as to be able to contact those contacts.

In other words, when the film-form substrate 203, the spacer 304 and the film-form member 205 are layered successively for forming the seating detection switch 201, one contact 211A of the first contact arrangement 211 and one contact 219A of the third contact arrangement 219 are positioned mutually separated and facing each other, the spacer 304 interposed therebetween (the through hole 320A of the spacer 304 therebetween) (see FIG. 2). In the same manner, the other contact 211B of the first contact arrangement 211 and the other contact 219B of the third contact arrangement 219 are positioned mutually separated and facing each other; one contact 215A of the second contact arrangement 215 and one contact 221A of the fourth contact arrangement 221 are positioned mutually separated and facing each other; and the other contact 215B of the second contact arrangement 215 and the other contact 221B of the fourth contact arrangement 221 are positioned mutually separated and facing each other.

The appropriate contacts of the third contact arrangement 219 are directly, electrically conductive with the appropriate contacts of the fourth contact arrangement 221. For example, as shown in FIG. 35, all of the contacts 219A, 219B, 221A and 221B comprising the third contact arrangement 219 and the fourth contact arrangement 221 are electrically conductive via a third conduction route 223 disposed on the surface of the film-form substrate 205 facing the film-form member 203.

The third conduction route 223 forms overall a letter H shape disposed on the surface of the film-form substrate 205 facing the film-form member 203, comprising a first linear region 223A mutually joining one contact 219A and the other contact 219B of the third contact arrangement 219; a second linear region 223B mutually joining one contact 221A and the other contact 221B of the fourth contact arrangement 221; and a third linear region 223C mutually joining the center part of the first linear region 223A with the center part of the second linear region 223B.

In the same manner as each of the contacts 211A, 211B, 215A, and 215B and the conduction routes 213 and 217 on the film-form substrate 203, the contacts 219A, 219B, 221A and 221B, and the conduction route 223 are formed for example from a thin silver fixed by being printed on to the surface of the film-form member 205 and a thin carbon disposed on the silver.

The contacts and conduction routes of each of the embodiments of this invention are constructed in the same manner as the above described contacts and conduction routes.

Figure 36:
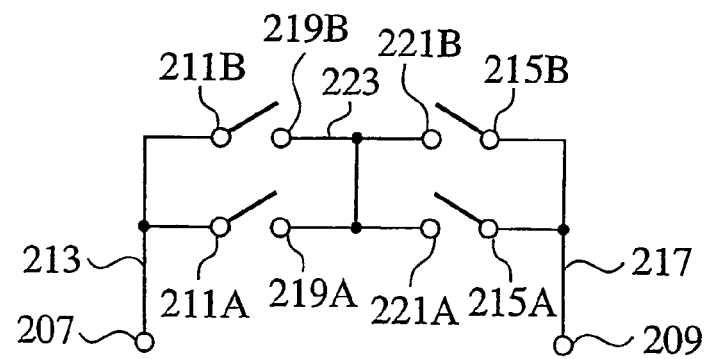
FIG. 36 is a circuit diagram of the seating detection switch according to the tenth embodiment.

FIG. 36 is a circuit diagram of the seating detection switch 201.

When the seating detection switch 201 is installed on a seat and a person sits down in that seat, the seating detection switch 201 (the film-form substrate 203 and the film-form member 205) bends, then, when one contact 211A of the first contact arrangement 211 and one contact 219A of the third contact arrangement 219 or the other contact 211B of the first contact arrangement 211 and the other contact 219B of the third contact arrangement 219 come into contact, moreover, when one contact 215A of the second contact arrangement 215 and one of contact 221A of the fourth contact arrangement 221 or the other contact 215B of the second contact arrangement 215 and the other contact 221B of the fourth contact arrangement 221 come into contact, the first terminal 207 becomes electrically conductive with the second terminal 209 enabling the seating of that person to be detected.

That is to say, in this embodiment if contacts of two locations positioned substantially spaced apart with respect to each other do not come into mutual contact, the first terminal 207 does not become electrically conductive with the second terminal 209.

Accordingly, in this seating detection switch 201 these terminals do not become mutually electrically conductive simply as the contacts of a contact pairing in one location come into mutual contact with each other, thereby preventing erroneous detection of the seating of a person in a seat in which the seating detection switch 201 is installed.

In other words, detection of the seating of a person requires the mutual contact of contacts of a plurality of contact pair locations, and the seating detection switch 201 comprises AND circuits as a condition for the detection of the seating of a person.

In the case of the conventional seating detection switch 300, there is concern that repeated contact and separation between the contacts of a single contact pairing occurring due to vibrations while a car having the seating detection switch 300 installed on a seat] is running, may cause a warning light to flash (such as flashing of a warning light when a seat belt is not fastened despite the fact that a person is sitting in the seat), causing annoyance to the driver.

However, in the case of this seating detection switch 201 related to this tenth embodiment, if there is not mutual contact between two contact pairings that are mutually spaced apart, the first terminal 207 does not become electrically conductive with the second terminal 209, thereby preventing erroneous flashing of a warning light, and avoiding the discomfort potentially experienced by a driver.

Further, in the case of the conventional seating detection switch 300, discrepancies may arise in the spacing between contacts of each contact pairing due to the precision achieved in the processing of the various components such as the film-form substrate 302, the spacer 304 and the film-form member 306 or in the precision achieved when assembling these components together. For example, under normal condition in which a person is not sitting in a seat in which the switch 300 is installed, the distance between the contact 308A and the contact 314A is small in comparison to the distance between the contact 308B and the contact 314B or between the contact 308C and the contact 314C.

Further, in the case of the conventional seating detection switch, as the distance between contacts is small, there may be contact between contacts of a contact pairing due to vibrations occurring as a car in which the switch is installed runs, causing erroneous detection of the seating of a person when in fact a person is not seated.

However, in the case of the seating detection switch 201 according to this embodiment, if there is not contact between the contacts of two contact pairings mutually spaced apart, the first terminal 207 does not become electrically conductive with the second terminal 209, thereby substantially preventing erroneous detection resulting from the degree of accuracy achieved in the processing and assembly of the components of the switch.

Further, in the case of the conventional seating detection switch 300, due to the condition of the switch 301 when installed, discrepancies may arise in the distance existing between contacts of each contact pairing in the same manner as this occurs due to the degree of processing or assembling accuracy achieved. For example, if one of the contact pairings is positioned in a part the radius of curvature on the seat face of which is smaller than that of another contact pairing, the seating detection switch may bend slightly at that part having the small radius of curvature, such that the distance between the contacts of that one contact pairing becomes smaller than the distance between contacts of the other contact pairing.

Moreover, in a contact pairing for which the distance between contacts is small, there may be contact between contacts caused due to vibrations occurring as the car runs, causing erroneous detection of the seating of a person even when a person is not seated.

Again, in the case of the seating detection switch 201 according to this embodiment, if there is not mutual contact between the contacts of two contact pairings mutually spaced apart, the terminal 207 does not become electrically conductive with the terminal 209, thereby substantially preventing erroneous detection due to the condition of installation as above.

Eleventh Embodiment

Figure 37:
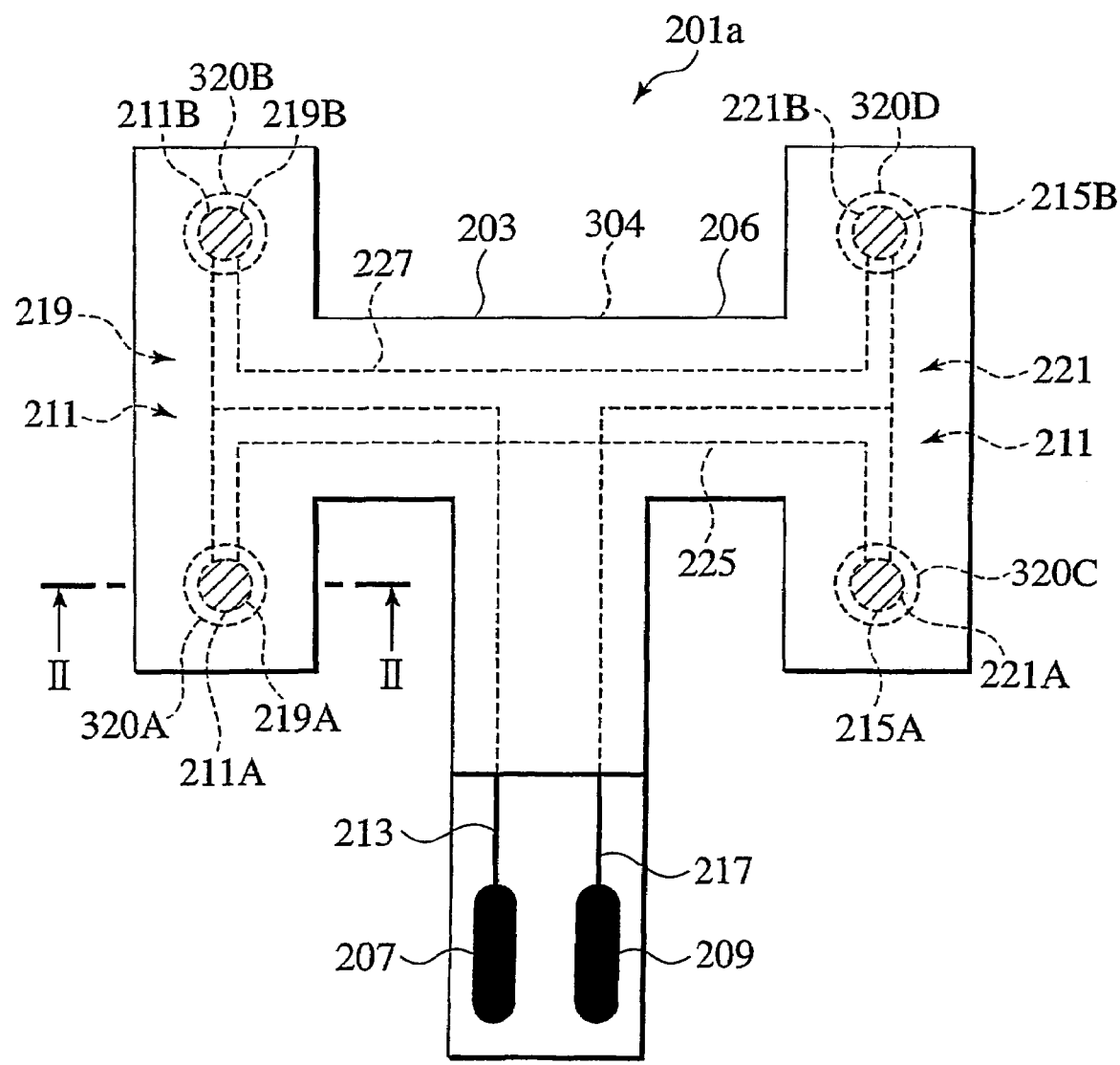
FIG. 37 is a schematic view of a seating detection switch according to an eleventh embodiment of the present invention.

FIG. 37 is a schematic view of the seating detection switch 201a according to an eleventh embodiment of the present invention.

The seating detection switch 201a differs from that of the tenth embodiment in the configuration of the conduction route by which the contacts 219A, 219B, 221A and 221B disposed on the film-form member 206 become conductive. In all other respects, the seating detection switch 201a is the same as that according to the tenth embodiment and furnishes the same effects.

Figure 38:
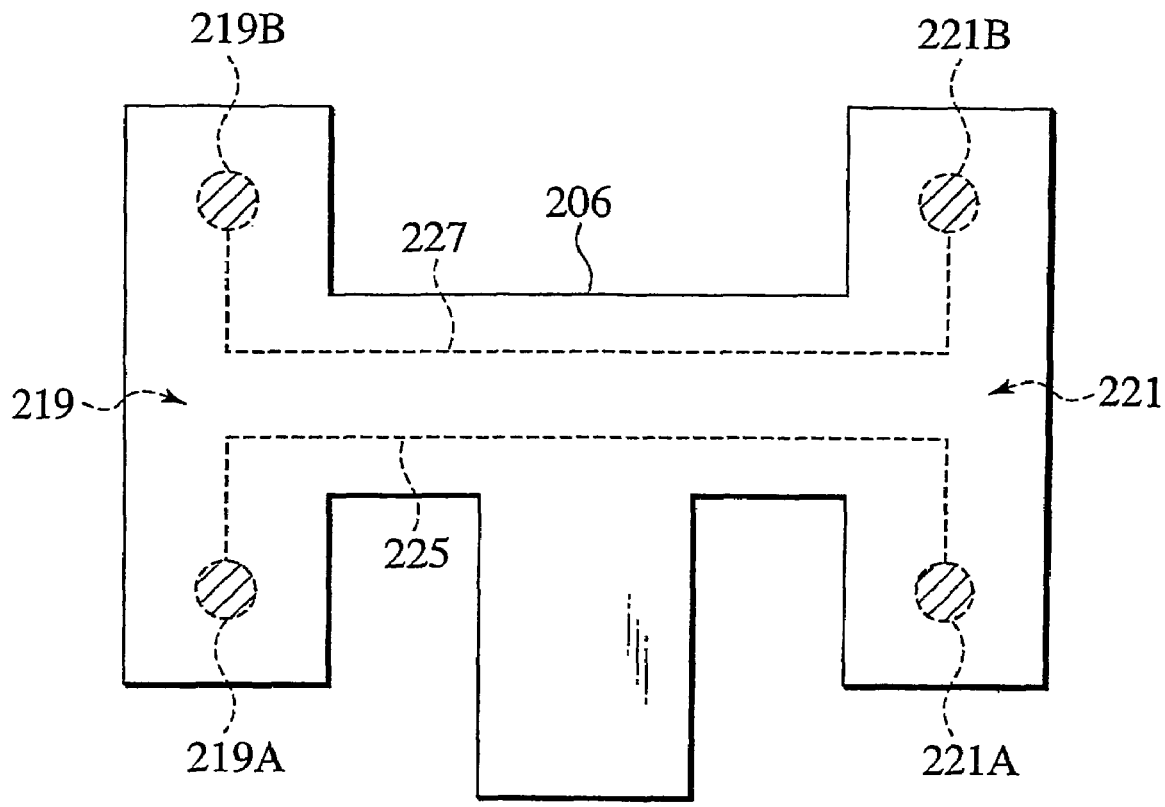
FIG. 38 is a schematic view of the film-form member comprising the seating detection switch according to the eleventh embodiment.

FIG. 38 is a schematic view of the film-form member 206 of the seating detection switch 201a.

Instead of the third conduction route 223 of the tenth embodiment, the film-form member 206 has: a fourth conduction route 225 disposed thereon, having an upside down U shape in relation to the shape of the film-form member 206; and a fifth conduction route 227 disposed thereon spaced apart from the fourth conduction route 225, having a U shape in relation to the shape of the film-form member 206. The external shape of the film-form member 206 is the same as that of the film-form member 205 according to the tenth embodiment.

The contact 219A comprising the third contact arrangement 219 becomes electrically conductive with the contact 221A comprising the fourth contact arrangement 221 via the fourth conduction route 225. The other contact 219B comprising the third contact arrangement 219 becomes electrically conductive with the other contact 221B of the fourth contact arrangement 221 via the fifth conduction route 227.

That is to say, the contacts of the third contact arrangement 219 become electrically connected via the conduction routes with the corresponding contacts of their respective pairs, comprising the fourth contact arrangement 221.

Figure 39:
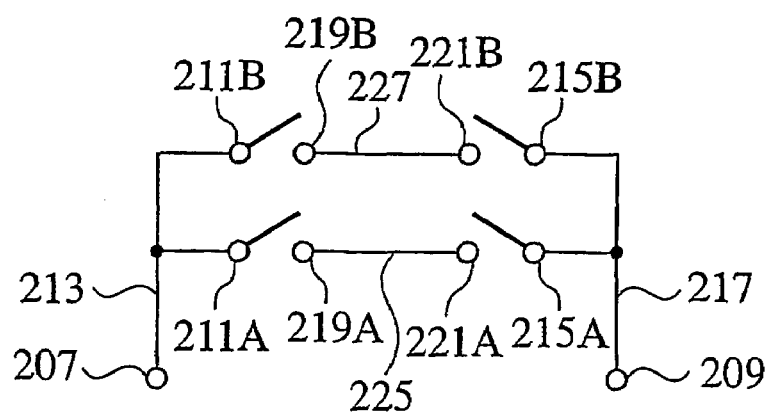
FIG. 39 is a circuit diagram of the seating detection switch according to the eleventh embodiment.

FIG. 39 is a circuit diagram of the seating detection switch 201a. As shown, the seating detection switch 201a comprises a combination of a plurality of AND circuits and a plurality of OR circuits.

When a person sits down in a seat on which the seating detection switch 201a is installed, the seating detection switch 201a bends. Then, the first terminal 207 becomes electrically conductive with the second terminal 209 enabling the seating of the person to be detected when one contact 211A of the first contact arrangement 211 comes into contact with one contact 219A of the third contact arrangement 219 and one contact 215A of the second contact arrangement 215 comes into contact with one contact 221A of the fourth contact arrangement 221, or, the other contact 211B of the first contact arrangement 211 comes into contact with the other contact 219B of the third contact arrangement 219 and the other contact 215B of the second contact arrangement 215 comes into contact with the other contact 221B of the fourth contact arrangement 221.

Twelfth Embodiment

Figure 40:
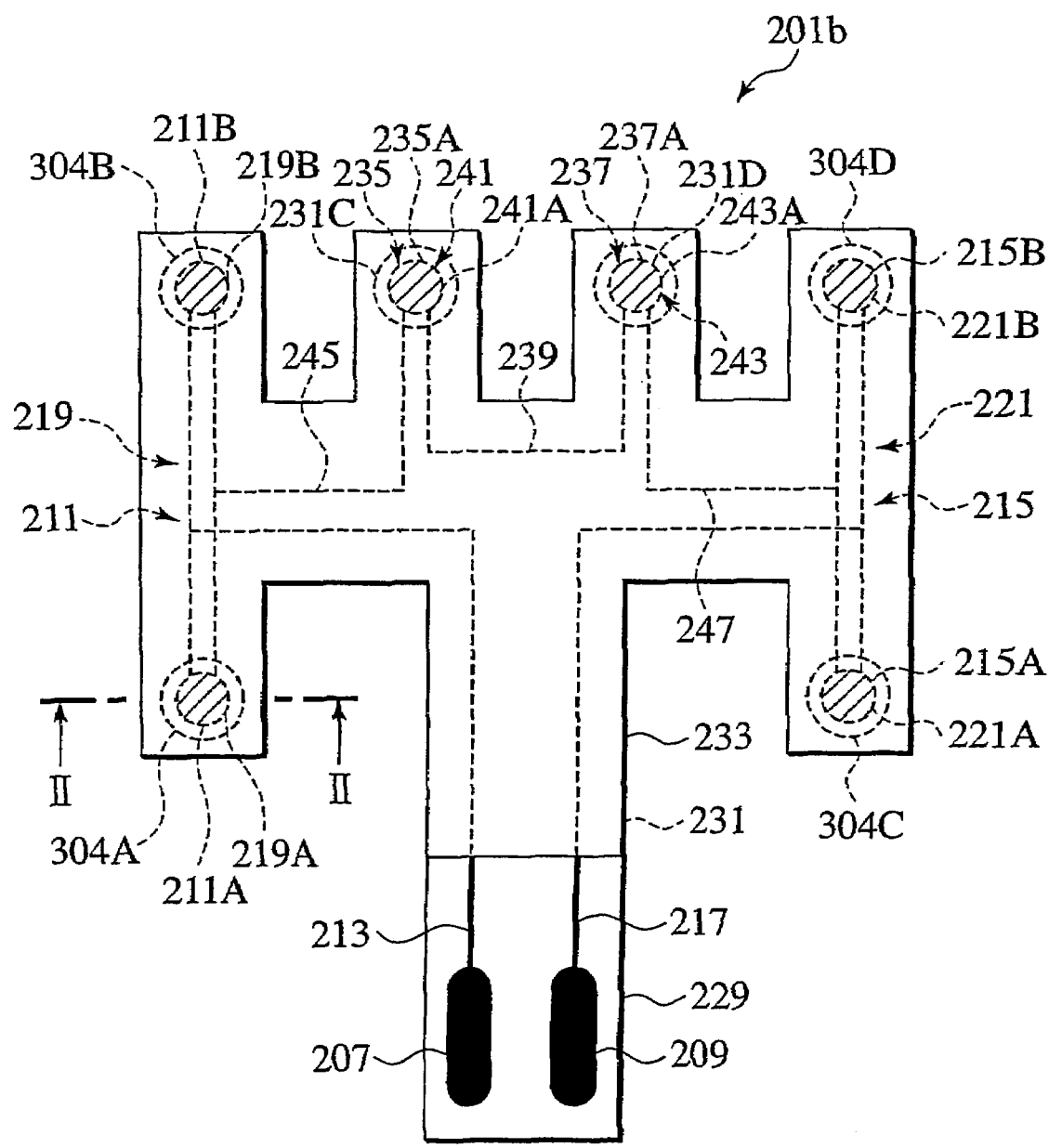
FIG. 40 is a schematic view of a seating detection switch according to a twelfth embodiment of the present invention.

FIG. 40 is a schematic view of the seating detection switch 201b according to a twelfth embodiment of the present invention.

The seating detection switch 201b differs from that of the tenth embodiment in that the appropriate number of contacts of the third contact arrangement 219 and the appropriate number of contacts of the fourth contact arrangement 221 disposed on the film-form member 233 become mutually, electrically conductive via another contact arrangement. In all other respects, the seating detection switch 201b is the same as the switch according to the tenth embodiment and furnishes the same effects.

The cross-section of the contacts of the seating detection switch 201b (the cross-section in the thickness direction of the seating detection switch 201b; shown in FIG. 40 by the line II-II), is the same as that in the conventional seating detection switch 300 and the seating detection switch 201 according to the tenth embodiment (see FIG. 2).

Figure 41:
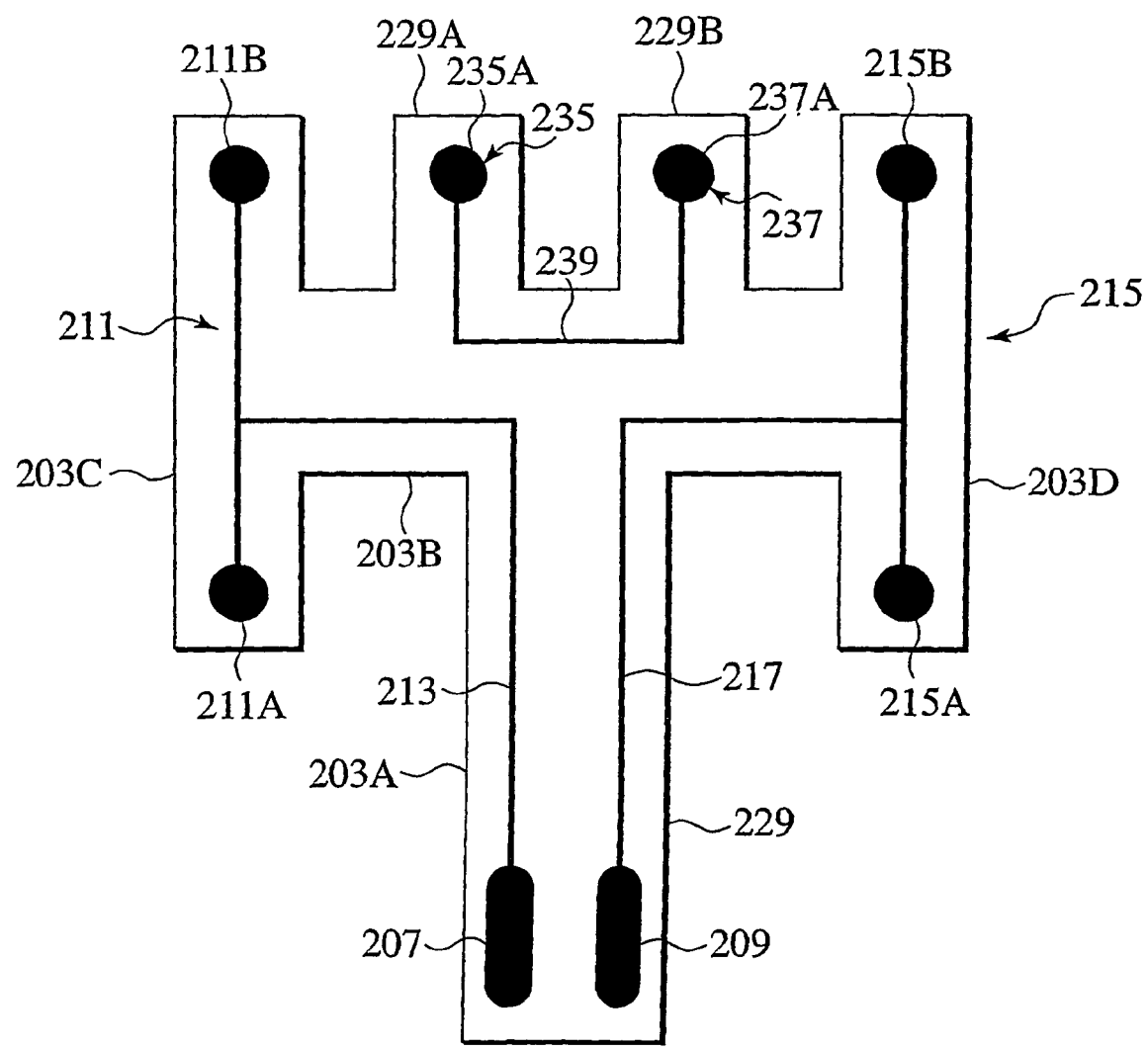
FIG. 41 is a schematic view of the film-form substrate comprising the seating detection switch according to the twelfth embodiment.

FIG. 41 is a schematic view of the film-form member 229 of the seating detection switch 201b.

The difference between this film-form member 229 and the film-form number 223 of the tenth embodiment is that a belt shaped first protruding part 229A is disposed on the first distal region 203C side of the center part in the longitudinal direction of the intermediate region 203B, and a belt shaped second protruding part 229B like the first protruding part 229A, is disposed on the second distal region 203D side of the center part in the longitudinal direction of the intermediate region 203B.

At the end part of the first protruding part 229A, on the surface of the film-form substrate 229 facing the film-form member 233, a fifth contact arrangement 235 is disposed, comprising a suitable number of fifth contacts 235A. The contacts 235A are disposed substantially spaced apart from the first contact arrangement 211 and the second contact arrangement 215.

Further, at the end part of the second protruding part 229B, on the surface of the film-form substrate 229 facing the film-form member 233, a sixth contact arrangement 237 is disposed, comprising a suitable number of sixth contacts 237A. The contacts 237A are disposed substantially spaced apart from the first contact arrangement 211, the second contact arrangement 215 and the fifth contact arrangement 235.

The contacts 235A of the fifth contact arrangement 235 and the contacts 237A of the sixth contact arrangement 237 become mutually, electrically conductive via a third conduction route 239 formed in a U shape in relation to the first protruding part 229A, the second protruding part 229B and intermediate region 203B.

Figure 42:
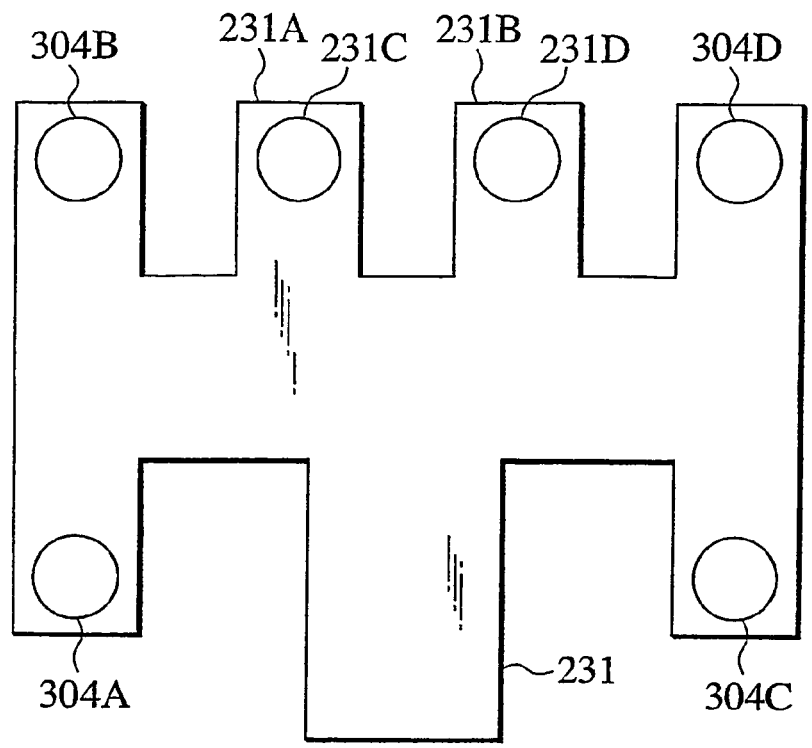
FIG. 42 is a schematic view of the spacer comprising the seating detection switch according to the twelfth embodiment.

FIG. 42 is a schematic view of the spacer 231.

The external shape of the spacer 231 is substantially the same as that of the film-form substrate 229, in the same manner as the tenth embodiment. Accordingly, a first protruding part 231A corresponding to the first protruding part 229A and a second protruding part 231B corresponding to the second protruding part 229B are disposed on the spacer 231. Through holes 231C and 231D are formed in the first protruding part 231A and the second protruding part 231B respectively, positioned corresponding to contacts 235A and 237A comprising the fifth and sixth contact arrangements disposed on the film-form substrate 229.

Figure 43:
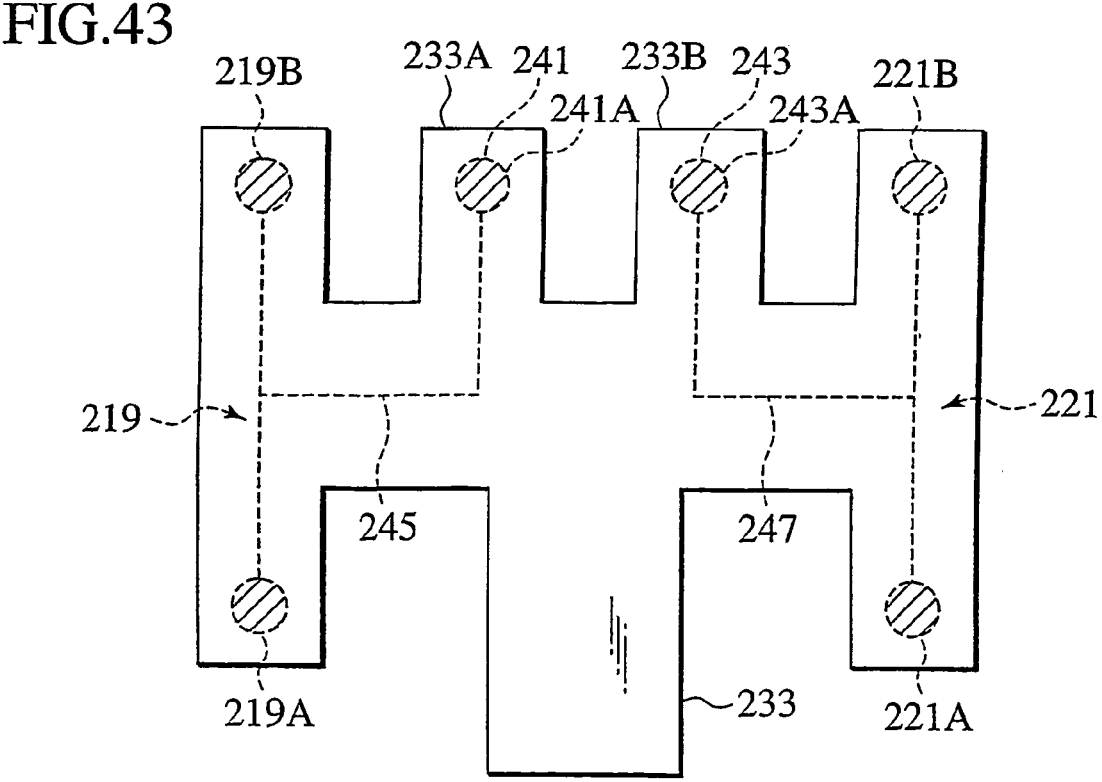
FIG. 43 is a schematic view of the film-form member comprising the seating detection switch according to the twelfth embodiment.

FIG. 43 is a schematic view of the film-form member 233.

The external shape of the film-form member 233 is substantially the same as that of the film-form substrate 229, in the same manner as the tenth embodiment.

Accordingly, the first protruding part 233A corresponding to the first protruding part 229A and the second protruding apart 233B corresponding to the second protruding part 229B are disposed on the film-form member 233.

In the same manner as the tenth embodiment, a third contact arrangement 219 comprising the third contacts 219A and 219B, and a fourth contact arrangement comprising the fourth contacts 221A and 221B are disposed on the film-form member 233.

An appropriate number of contacts 241A comprising a seventh contact arrangement 241 are disposed at the end part of the first protruding part 233A, opposing the contacts 235A comprising the fifth contact arrangement 235, so as to be capable of coming into contact with the fifth contact arrangement 235.

In the same manner, an appropriate number of contacts 243A comprising an eighth contact arrangement 243 are disposed at the end part of the second protruding part 233B, opposing the contacts 237A comprising the sixth contact arrangement 237, so as to be capable of coming into contact with the sixth contact arrangement.

The contacts 219A and 219B comprising the third contact arrangement 219 become electrically conductive via a fourth conduction route 245 with the contact 241A comprising the seventh contact arrangement 241.

In the same manner, the contacts 221A and 221B comprising the fourth contact arrangement 221 become electrically conductive via a fifth conduction route 247 with the contact 243A comprising the eighth contact arrangement 243.

In other words, all of the contacts 235A and 237A comprising the fifth contact arrangement 235 and the sixth contact arrangement 237 disposed on the film-form substrate 229 become mutually electrically conductive via the third conduction route 239; all of the contacts 219A, 219B and 241A comprising the third contact arrangement 219 and the seventh contact arrangement 241 disposed on the film-form member 233, become mutually electrically conductive via the fourth conduction route 245; and all of the contacts 221A, 221B and 243A comprising the fourth contact arrangement 221 and the eighth contact arrangement 243 become mutually conductive via the fifth conduction route 247.

As described above, the appropriate number of contacts of the third contact arrangement 219 become electrically conductive via another contact arrangement with the appropriate number of contacts of the fourth contact arrangement 221.

That is to say, one contact 219A of the third contact arrangement 219 and one contact 221A of the fourth contact arrangement 221 become mutually electrically conductive via the fourth conduction route 245, the contact 241A of the seventh contact arrangement 241 and the contact 235A of the fifth contact arrangement 235 opposing this contact 241A, as well as the third conduction route 239, the contact 237A of the sixth contact arrangement 237, the contact 243A of the eighth contact arrangement 243 opposing this contact 237A, as well as the fifth conduction route 247.

Figure 44:
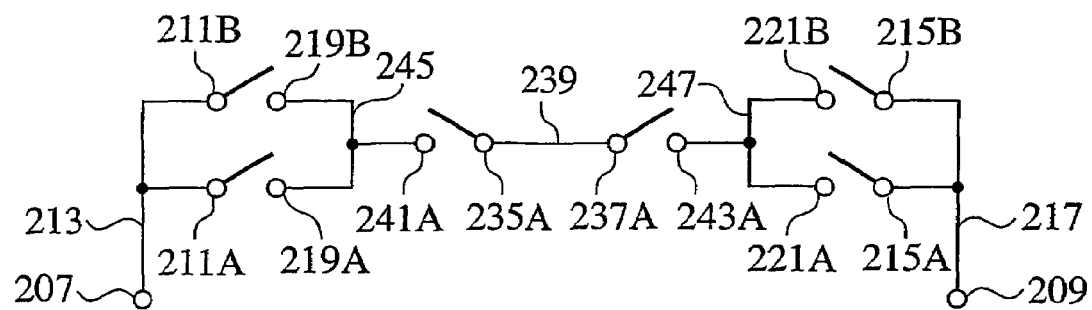
FIG. 44 is a circuit diagram of the seating detection switch according to the twelfth embodiment.

FIG. 44 is a circuit diagram of the seating detection switch 201b constructed as above described.

When the seating detection switch 201b is installed on a seat and a person sits down in that seat, the seating detection switch 201b bends. Then, the first terminal 207 becomes electrically conductive with the second terminal 209 enabling the seating of the person to be detected when one contact 211A of the first contact arrangement 211 comes into contact with one contact 219A of the third contact arrangement 219, or the other contact 211B of the first contact arrangement 211 comes into contact with the other contact 219B of the third contact arrangement 219, moreover, one contact 215A of the second contact arrangement 215 comes into contact with one contact 221A of the fourth contact arrangement 221 or, the other contact 215B of the second contact arrangement 215 comes into contact with the other contact 221B of the fourth contact arrangement 221, moreover the contact 235A of the fifth contact arrangement 235 comes into contact with the contact 241A of the seventh contact arrangement 241, and the contact 237A of the sixth contact arrangement 237 comes into contact with the contact 243A of the eighth contact arrangement 243.

In other words, if there is not contact between contact pairs at four locations substantially spaced apart from each other, the first terminal 207 does not become electrically conductive with the second terminal 209.

Accordingly, in the same manner as the tenth embodiment, this seating detection switch 201b according to the twelfth embodiment very effectively enables prevention of erroneous detections of the seating of a person in a seat on which the switch 201b is installed and prevents the occurrence of such erroneous detections to a higher degree.

Thirteenth Embodiment

Figure 45:
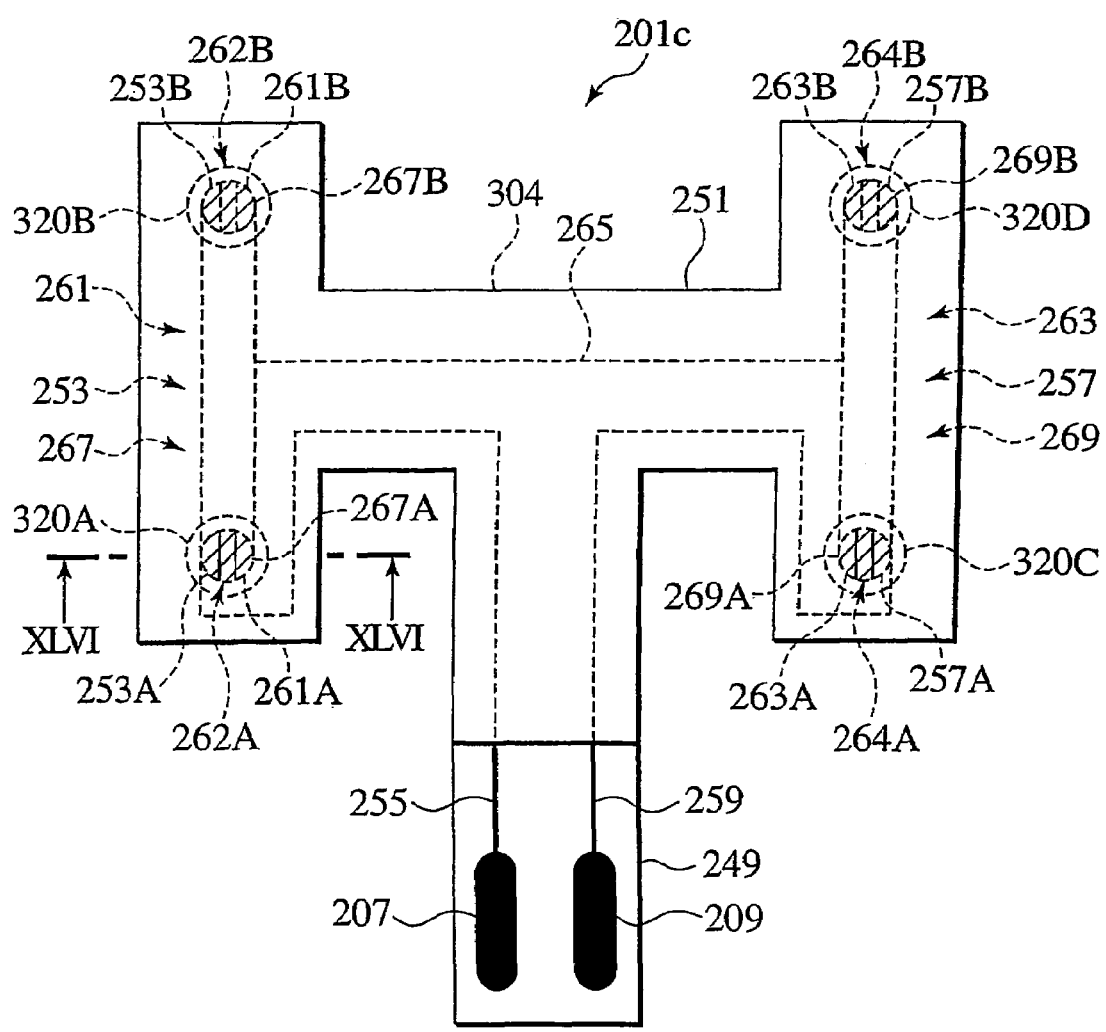
FIG. 45 is a schematic view of a seating detection switch according to a thirteenth embodiment of the present invention.
Figure 46:
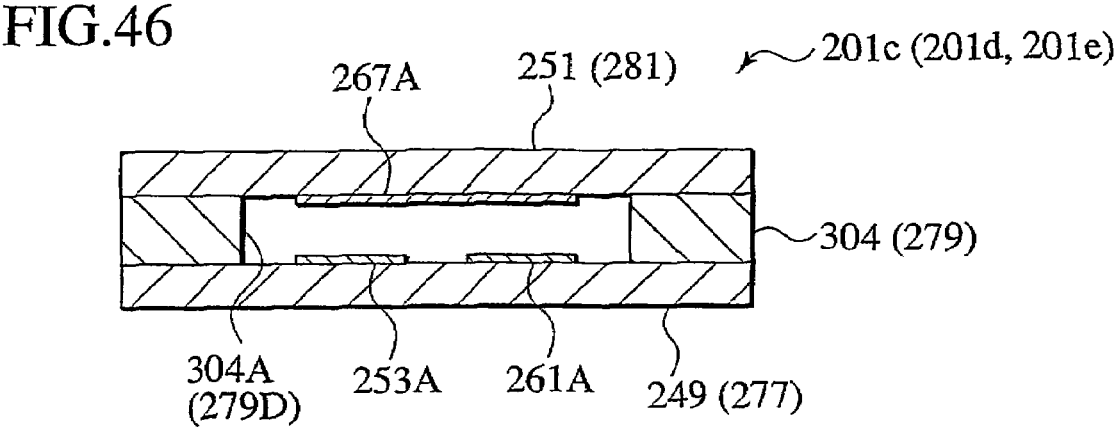
FIG. 46 is a cross-sectional view along the line XLVI-XLVI of FIG. 45.

FIG. 45 is a schematic view of the seating detection switch 201c according to a thirteenth embodiment of the present invention. FIG. 46 is a cross-sectional view along the line XLVI-XLVI of FIG. 45.

The seating detection switch 201c differs from that of the tenth embodiment in the configuration of the contacts formed on the film-form substrate 249, the conduction routes that make those contacts electrically conductive, connecting them to the first terminal 207 and the second terminal 209, and the contacts formed on the film-form member 251. In all other respects, the seating detection switch 201c is substantially the same as that of the tenth embodiment, and furnishes substantially the same effects.

In the same manner as the switch according to the tenth embodiment, the seating detection switch 201c has a film-form spacer 304 (see FIG. 4) interposed between a film-form substrate 249 arranged on one of the surfaces of the spacer 304 and a film-form member 251 arranged on the other surface of the spacer 304.

Figure 47:
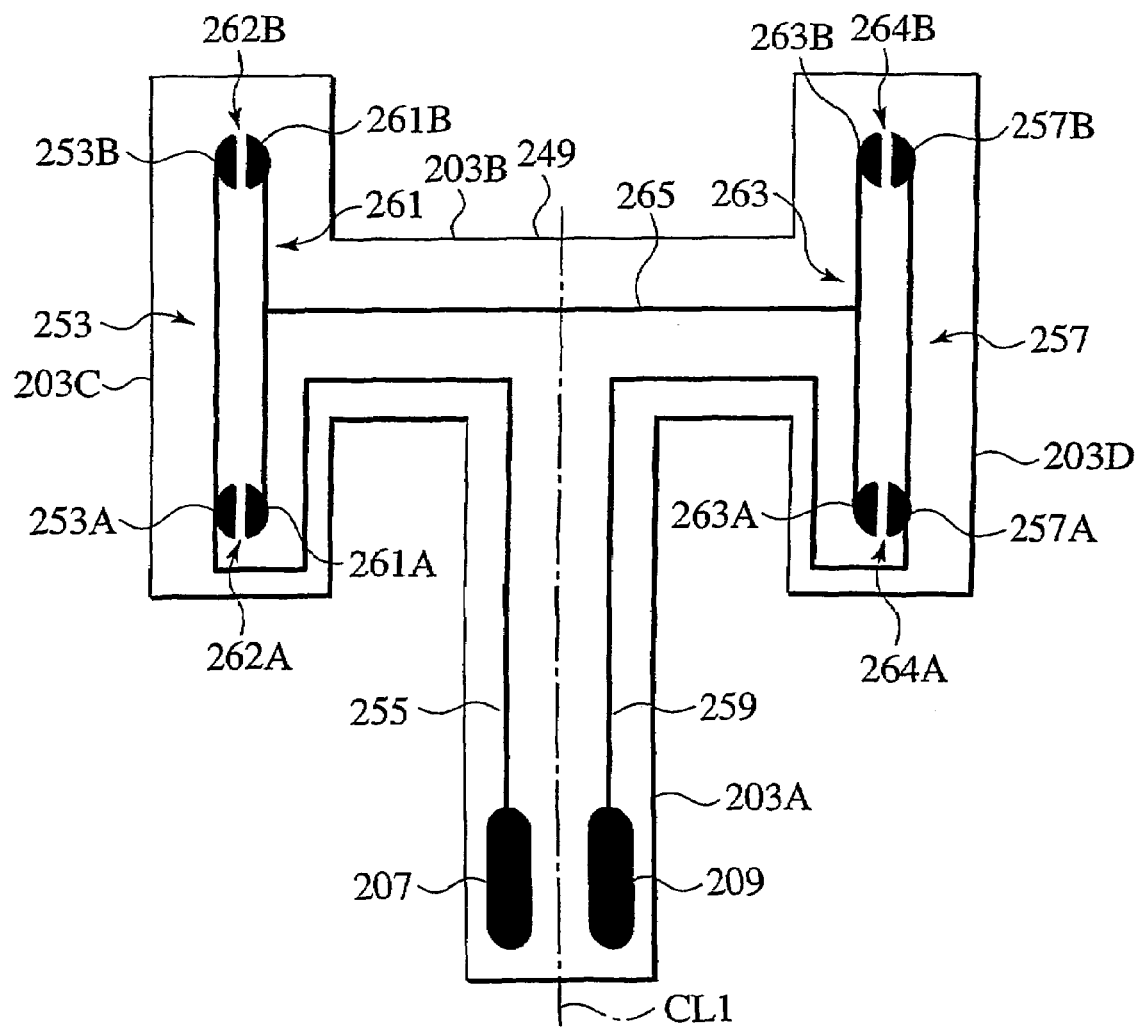
FIG. 47 is a schematic view of the film-form substrate comprising the seating detection switch according to the thirteenth embodiment.

FIG. 47 is a schematic view of the film-form substrate 249 of the seating detection switch 201c.

This film-form substrate 249 has disposed thereon contacts and a conduction route that differ in shape to those disposed on the film-form substrate 203 according to the tenth embodiment, but in all other respects is substantially the same as that film-form substrate 203.

That is to say, in the same manner as the film-form substrate 203, the film-form substrate 249 comprises a first terminal 207 and a second terminal 209. Further, a first contact arrangement 253 including the appropriate number of contacts 253A and 253B that become electrically conductive with the first terminal 207 via a first conduction route 255, is disposed on the surface of the film-form substrate 203 facing the film-form member 251.

One contact 253A of the first contact arrangement 253 is disposed at one end in the longitudinal direction of the first distal region 203C, while the other contact 253B of that first contact arrangement 253 is disposed at the other end in the longitudinal direction of that first distal region 203C.

Further, a second contact arrangement 257 comprising the appropriate number of contacts 257A and 257B that are electrically conductive with the second terminal 209 via a second conduction route 259, is disposed on the surface of the film-form substrate 259 that faces the film-form member 251.

In the same manner as the contact 253A and 253B of the first contact arrangement 253, the contacts 257A and 257B of the second contact arrangement 257 also are disposed respectively at one end and the other end in the longitudinal direction of the second distal region 203D. As the second distal region 203D is substantially spaced apart from the first distal region 203C, the second contacts 257A and 257B are substantially separated from the first contact arrangement 253.

Further, a third contact arrangement 261 comprising the appropriate number of contacts 261A and 261B is disposed in conformance with the circuit configuration of the film-form member 205, on the surface of the film-form substrate 249 that faces the film-form member 251. The contacts 261A and 261B are positioned correlated to the contacts 253A and 253B of the first contact arrangement 253 but slightly distanced from those contacts.

More specifically, one contact 261A comprising the third contact arrangement 261 is disposed slightly removed from one contact 253A comprising the first contact arrangement 253 toward the intermediate region 203B side (the inner side). The other contact 261B is disposed slightly removed from the other contact 253B comprising the first contact arrangement 253 toward the intermediate region 203B side.

A fourth contact arrangement 263 comprising the appropriate number of contacts 263A and 263B is disposed on the surface of the film-form substrate 249 that faces the film-form member 251, corresponding to the contacts 257A and 257B of the second contact arrangement 257 and slightly removed from the contacts 257A and 257B. In the same manner as the contacts 261A and 261B of the third contact arrangement 261, the contacts 263A and 263B of the fourth contact arrangement 263 also are disposed to the inner side of the contacts 257A and 257B of the second contact arrangement 257.

The appropriate contacts of the third contact arrangement 261 become electrically conductive with the appropriate contacts of the fourth contact arrangement 263. More specifically, all of the contacts, 261A, 261B, 263A and 263D of the third contact arrangement 261 and the fourth contact arrangement 263 become mutually electrically conductive via a third conduction route 265 disposed on the surface of the film-form substrate 249 that faces the film-form member 251.

Formed according to the above described configuration, in relation to the centerline CL1 that passes through the center part in the widthwise direction of the proximal region 203A of the film-form substrate 249 and extends in the longitudinal direction of that proximal region, the conduction routes 255, 259 and 265 form a linearly symmetrical form, while the contacts comprising the contact arrangements 253, 257, 261 and 263 are arranged positioned linearly symmetrically in relation to that centerline CLI.

The contact pairing 262A comprising one contact 253A of the first contact arrangement 253 and one contact 261A of the third contact arrangement 261 is installed in the position corresponding to one contact 211A of the first contact arrangement 211 of the seating detection switch 201 according to the tenth embodiment (see FIG. 34). In the same manner, the other contact pairings (e.g. contact pairing 262B) comprising the other contacts (e.g. contacts 253B or 261B) also are installed in the position corresponding to the other contacts (e.g. contact 211B) of the seating detection switch 201 according to the tenth embodiment.

Figure 48:
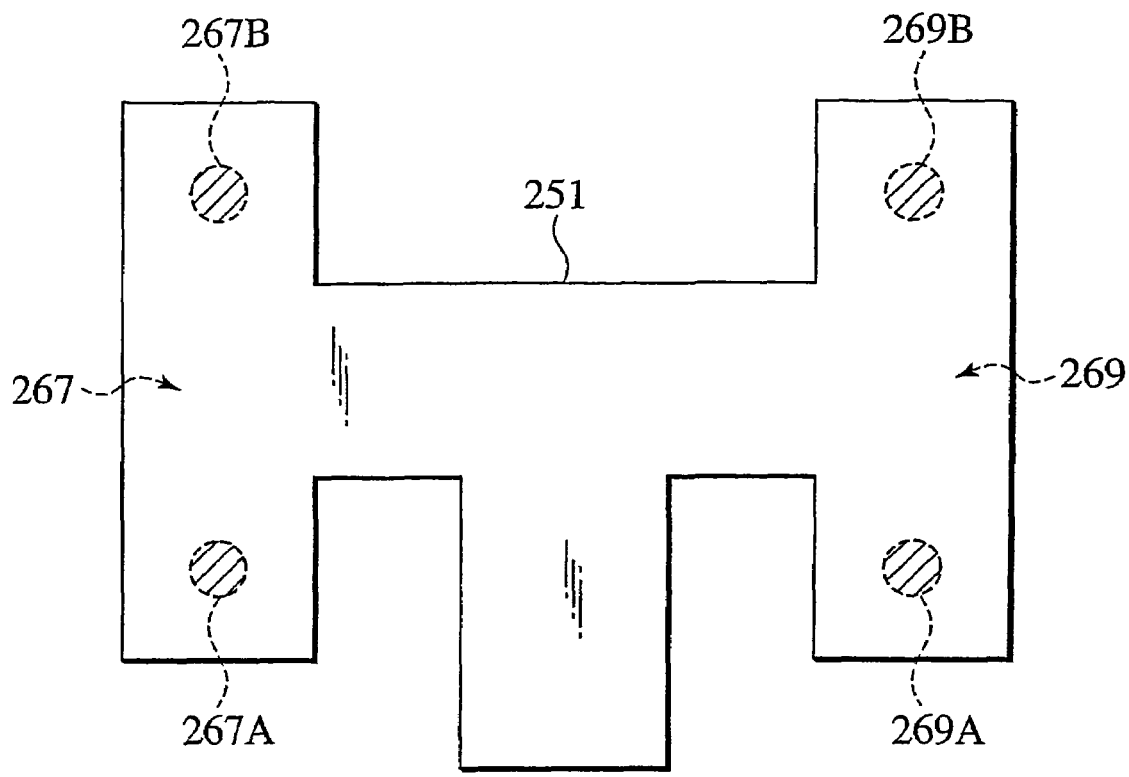
FIG. 48 is a schematic view of the film-form member comprising the seating detection switch according to the thirteenth embodiment.

FIG. 48 is a schematic view of the film-form member 251 of the seating detection switch 201c.

Contacts 267A, 267B, 269A and 269B for enabling electrical conductivity between the pair forming contacts 253A and 261A, 253B and 261B, 253C and 261C, and 253D and 261D are disposed on the film-form member 251.

That is to say, a fifth contact arrangement 267 comprising the appropriate number of contacts 267A and 267B is disposed on the surface of the film-form member 251 facing the film-form substrate 249.

The contacts 267A and 267B of the fifth contact arrangement 267 are disposed opposing respectively, the appropriate first contact pairings 262A and 262B comprising the contacts 253A and 253B of the first contact arrangement 253 and the contacts 261A and 261B of the third contact arrangement 261, so as to be able to come into contact with those contact pairings.

For example, one contact 267A of the fifth contact arrangement 267 is disposed opposing the first contact pairing 262A comprising one contact 253A of the first contact arrangement 253 and one contact 261A of the third contact arrangement 261.

In the same manner, on the surface of the film-form member 251 facing the film-form substrate 249, a sixth contact arrangement 269 comprising the contacts 269A and 269B disposed opposing respectively the second contact pairing 264A and 264B comprising the contacts 257A and 257B of the second contact arrangement 257 and the contacts 263A and 263B of the fourth contact arrangement 263, so as to be able to come into contact with those contact pairings.

Figure 49:
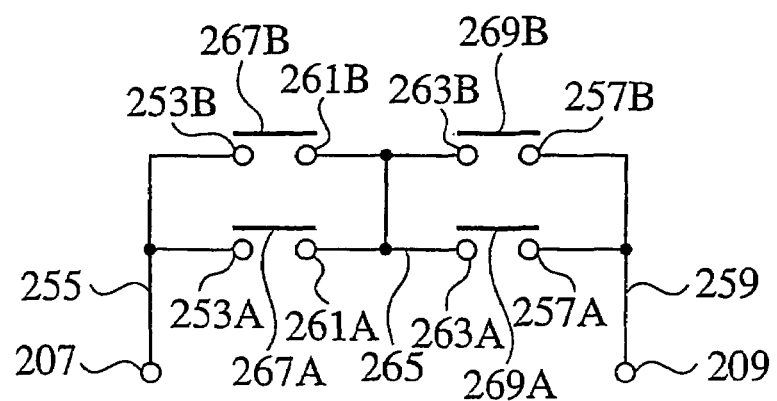
FIG. 49 is a circuit diagram of the seating detection switch according to the thirteenth embodiment.

FIG. 49 is a circuit diagram of the seating detection switch 201c configured as described. This circuit diagram is similar to the circuit diagram of the tenth embodiment (see FIG. 36).

In this way, as a configuration is provided in which contacts comprising pairings are disposed together in proximity on the film-form substrate 249, it is not necessary to provide a conduction route for mutually, electrically connecting the contacts of the film-form member 251, thereby enabling the film-form member 251 to be of a simple structure. Further, the contacts forming pairs on the film-form substrate 249 can be electrically connected without using the film-form member 251, enabling tests to be performed easily to determine the existence of a wire breakage affecting the conduction routes 255 or 259 on the film-form substrate 249.

When this seating detection switch 201c is installed on a seat and a person sits down in that seat the seating detection switch 201c bends. Then, the first terminal 207 becomes electrically conductive with the second terminal 209 enabling the seating of the person to be detected when one contact 253A of the first contact arrangement 253 and one contact 261A of the third contact arrangement 261 come into contact with one contact 267A of the fifth contact arrangement 267, or, the other contact 253B of the first contact arrangement 253 and the other contact 261B of the third contact arrangement 261 come into contact with the other contact 267B of the fifth contact arrangement 267, moreover, one contact 257A of the second contact arrangement 257 and one contact 263A of the fourth contact arrangement 263 come into contact with one contact 269A of the sixth contact arrangement 269, or, the other contact 257B of the second contact arrangement 257 and the other contact 263B of the fourth contact arrangement 263 come into contact with the other contact 269B of the sixth contact arrangement 269.

Fourteenth Embodiment

Figure 50:
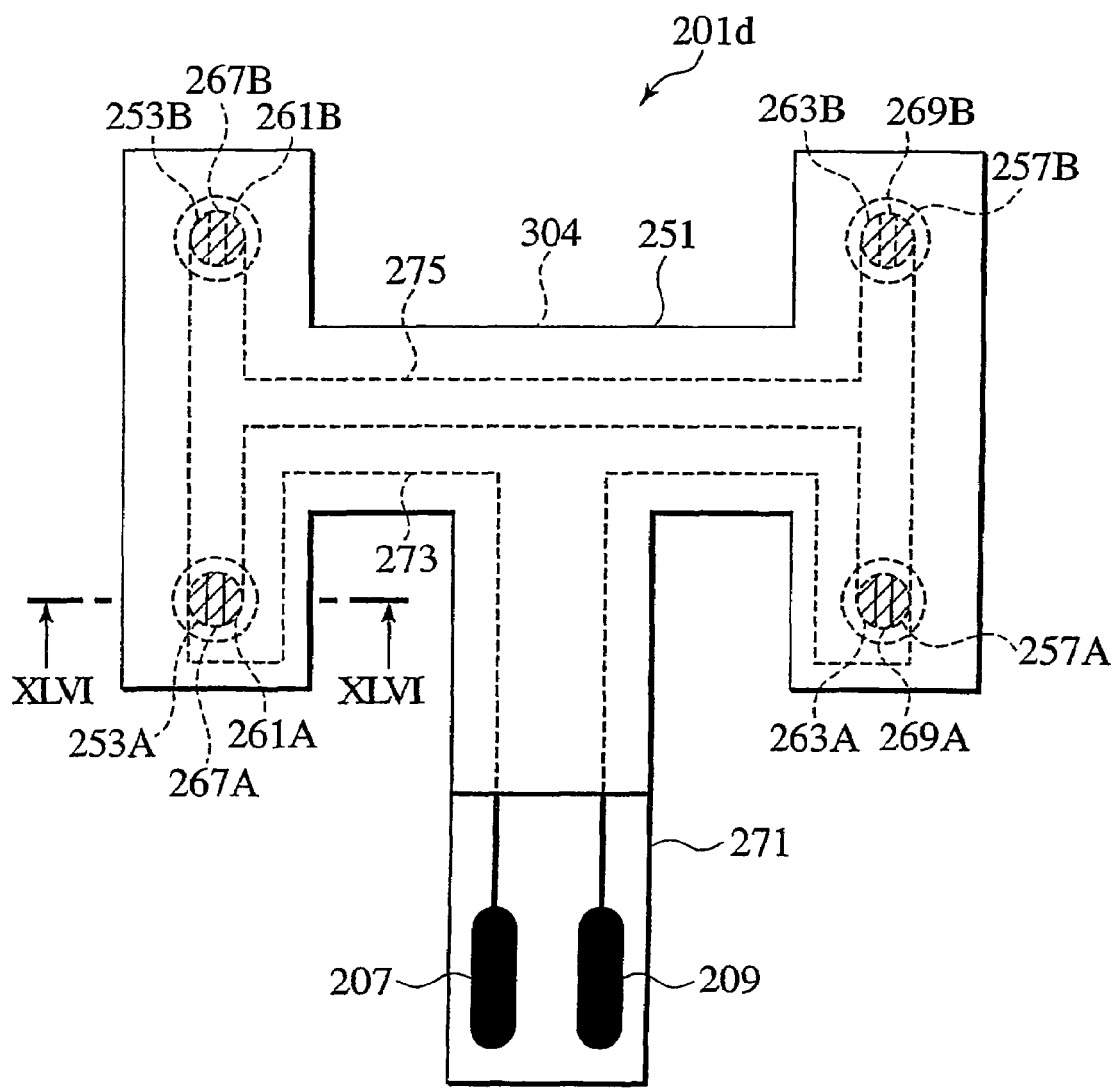
FIG. 50 is a schematic view of a seating detection switch according to a fourteenth embodiment of the present invention.

FIG. 50 is a schematic view of the seating detection switch 201d according to the fourteenth embodiment of the present invention.

This seating detection switch 201d differs from the seating detection switch according to the thirteenth embodiment in the configuration of the conduction routes on a film-form substrate 271 enabling conduction between the contacts 261A and 261B of the third contact arrangement 261 and the contacts 263A and 263B of the fourth contact arrangement 263. In all other respects, this switch 201d is configured substantially the same as the switch according to the thirteenth embodiment and furnishes substantially the same effects.

Figure 51:
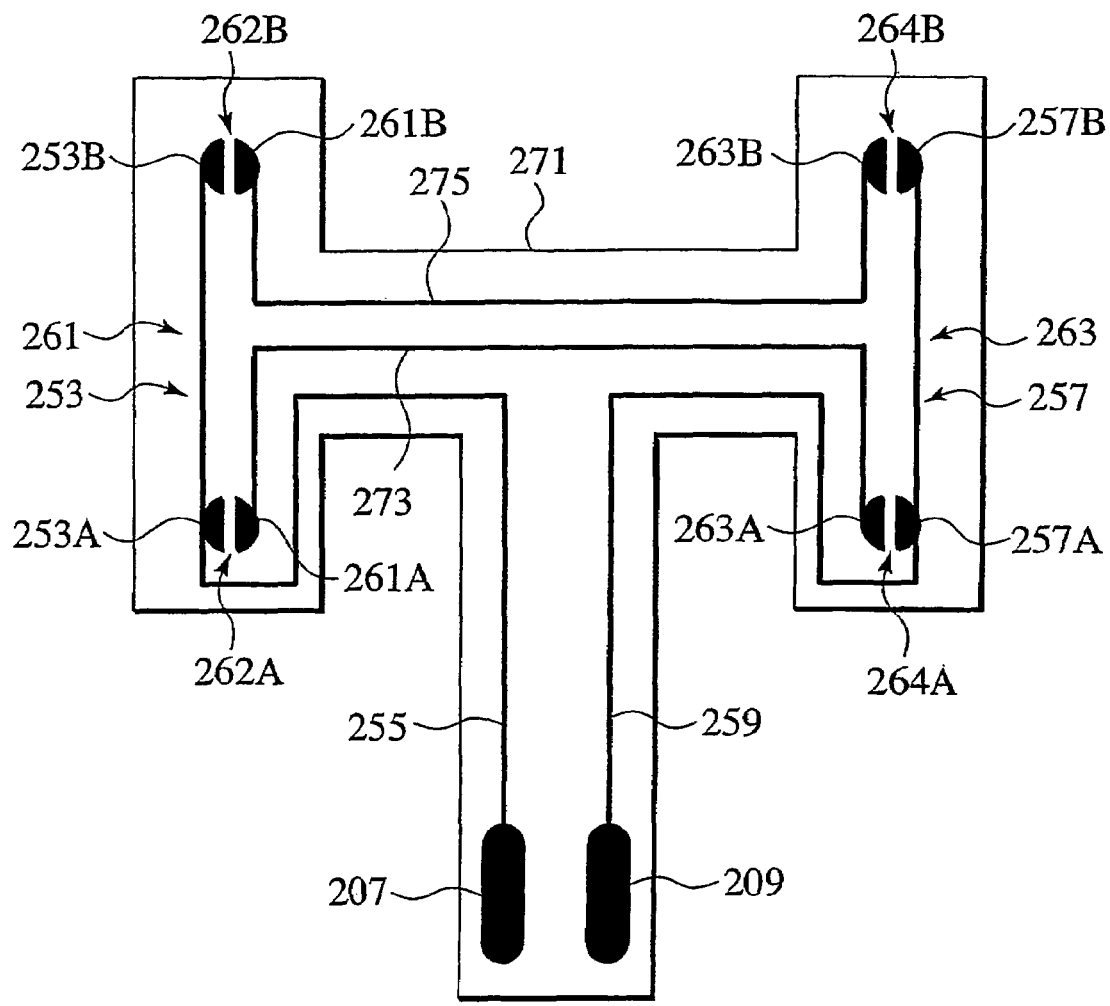
FIG. 51 is a schematic view of the film-form substrate comprising the seating detection switch according to the fourteenth embodiment.

FIG. 51 is a schematic view of the film-form substrate 271 of the seating detection switch 201d. This film-form substrate 271 has the same external form as the film-form substrate 249 of the seating detection switch 201c according to the thirteenth embodiment.

Instead of the third conduction route 265 of the thirteenth embodiment, the film-form substrate 271 has a fourth conduction route 273 disposed thereon and formed in an upside down U shape in relation to the shape of the film-form substrate 271, and a fifth conduction route 275 disposed spaced apart from the fourth conduction route 273 and formed in a U shape in relation to the shape of the film-form substrate 271.

One contact 261A comprising the third contact arrangement 261 becomes electrically conductive with one contact 263A comprising the fourth contact arrangement 263, via the fourth conduction route 273. The other contact 261B comprising the third contact arrangement 261 becomes electrically conductive with the other contact 263B comprising the fourth contact arrangement 263 via the fifth conduction route 275.

Figure 52:
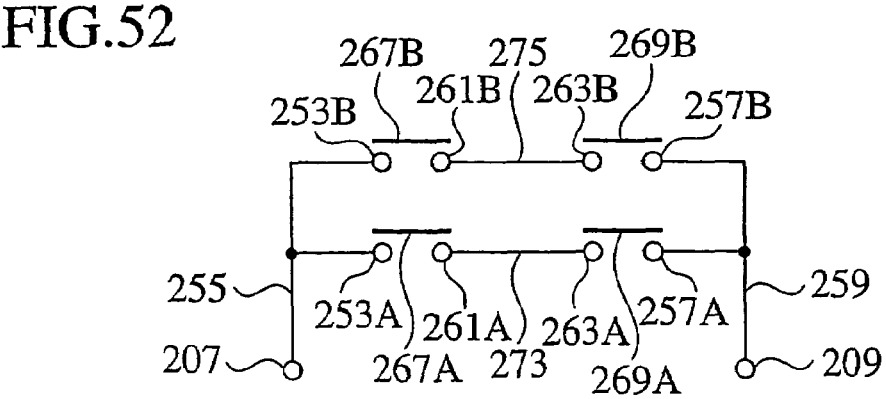
FIG. 52 is a circuit diagram of the seating detection switch according to the fourteenth embodiment.

FIG. 52 is a circuit diagram of the seating detection switch 201d configured as described above.

When a person sits down in a seat on which this seating detection switch 201d is installed the seating detection switch 201d (the film-form substrate 271 and film-form member 251) bends. Then, the first terminal 207 becomes electrically conductive with the second terminal 209 enabling the seating of the person to be detected when one contact 253A of the first contact arrangement 253 and one contact 261A of the third contact arrangement 261 come into contact with one contact 267A of the fifth contact arrangement 267, moreover, one contact 257A of the second contact arrangement 257 and one contact 263A of the fourth contact arrangement 263 come into contact with one contact 269A of the sixth contact arrangement 269, or, the other contact 253B of the first contact arrangement 253 and the other contact 261B of the third contact arrangement 261 come into contact with the other contact 267B of the fifth contact arrangement 267, moreover, the other contact 257B of the second contact arrangement 257 and the other contact 263B of the fourth contact arrangement 263 come into contact with the other contact 269B of the sixth contact arrangement 269.

In the case of the seating detection switch 201c according to the thirteenth embodiment and the seating detection switch 201d according to the fourteenth embodiment, the contacts of the third contact arrangement and the contacts of the fourth contact arrangement are directly electrically connected via conduction routes, however, these seating detection switches can also be configured such that the contacts become mutually electrically conductive via another contact arrangement as in the case of the seating detection switch 201b according to the twelfth embodiment.

Fifteenth Embodiment

Figure 53:
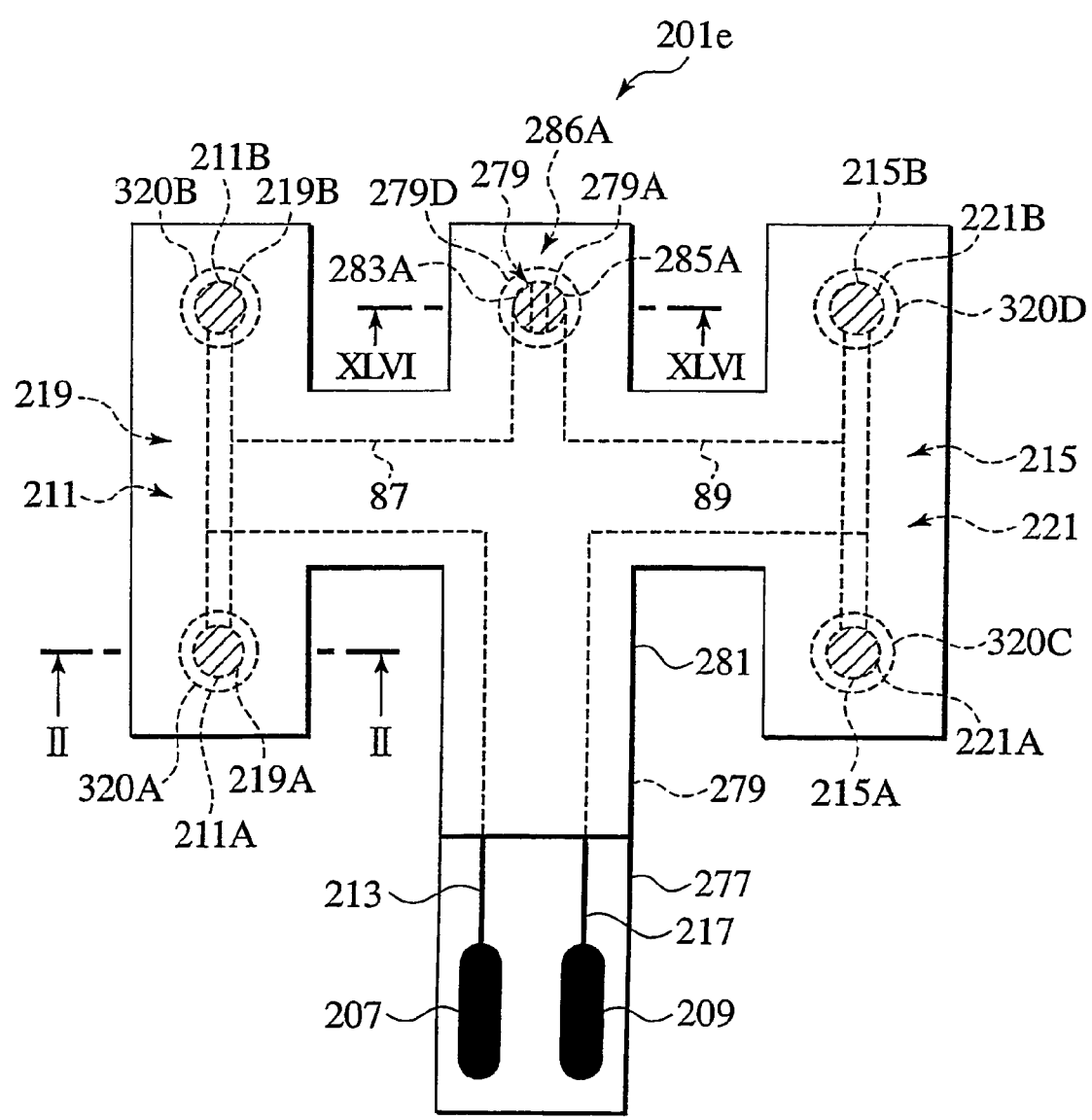
FIG. 53 is a schematic view of a seating detection switch according to a fifteenth embodiment of the present invention.

FIG. 53 is a schematic view of the seating detection switch 201e according to a fifteenth embodiment of the present invention.

The seating detection switch 201e differs from that of the tenth embodiment in that the appropriate contacts of the third contact arrangement 219 and the appropriate contacts of the fourth contact arrangement 221 installed on a film-form substrate 281, become mutually, electrically conductive via another contact arrangement. In all other respects, this switch 201e is configured substantially the same as the switch according to the tenth embodiment and furnishes substantially the same effects.

One cross-section of the contacts of the seating detection switch 201e (cross-section XLVI-XLVI; refer FIG. 46) is configured the same as in the case of the thirteenth embodiment, while another cross-section (cross-section II-II; refer FIG. 2) is configured the same as in the case of the tenth embodiment.

Figure 54:
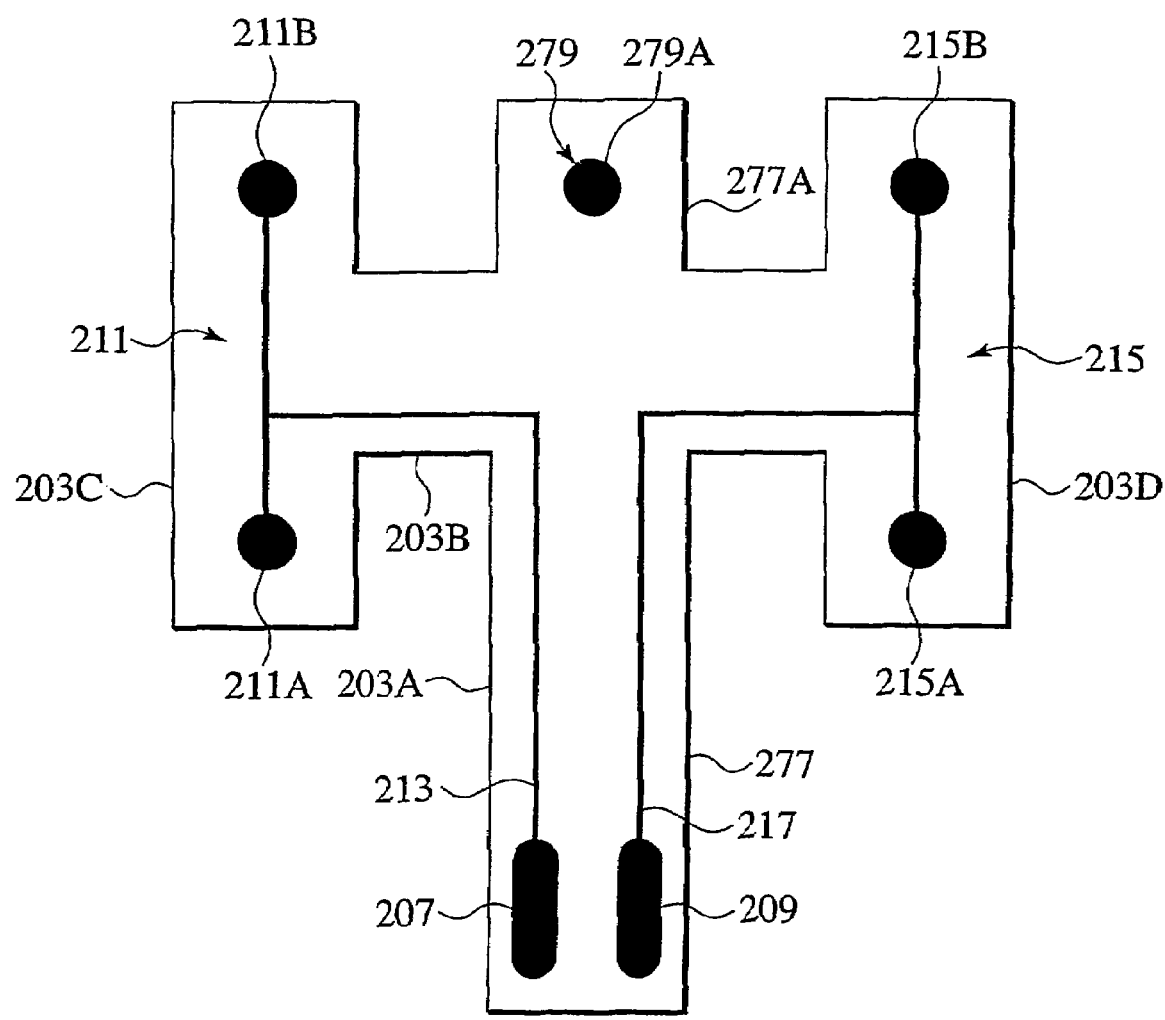
FIG. 54 is a schematic view of the film-form substrate comprising the seating detection switch according to the fifteenth embodiment.

FIG. 54 is a schematic view of a film-form substrate 277 of the seating detection switch 201e.

A point of difference between the film-form substrate 277 and the film-form substrate 203 according to the tenth embodiment is that the film-form substrate 277 includes a belt shaped protruding part 277A in the center part in the longitudinal direction of the intermediate region 203B, while on the end part of the belt shaped protruding part 277A a seventh contact arrangement 279 comprising an appropriate number of contacts 279A is disposed. The contacts 279A is disposed substantially apart from the first contact arrangement 211 and the second contact arrangement 215.

Figure 55:
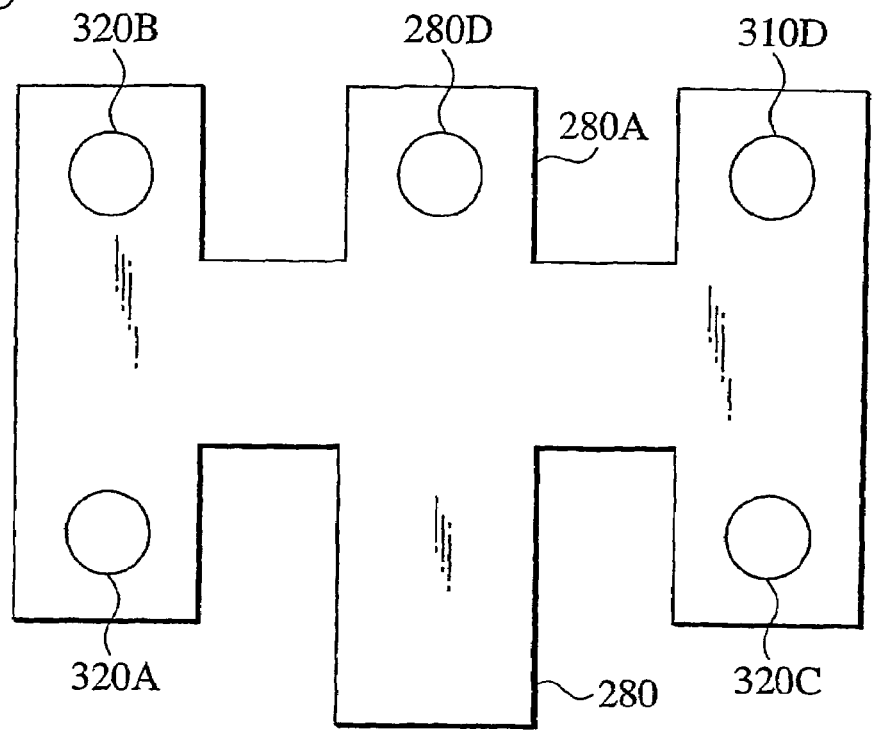
FIG. 55 is a schematic view of the spacer comprising the seating detection switch according to the fifteenth embodiment.

FIG. 55 is a schematic view of a spacer 280.

In the same manner as the tenth embodiment, the external form of the spacer 280 is substantially the same as the external form of the film-form substrate 277.

Accordingly, a protruding part 280A corresponding to the protruding part 277A is formed on the spacer 280 and a through whole 280D corresponding to the contact 279A of the seventh contact arrangement 279 disposed on the film-form substrate 277, is formed in the protruding part 280A.

Figure 56:
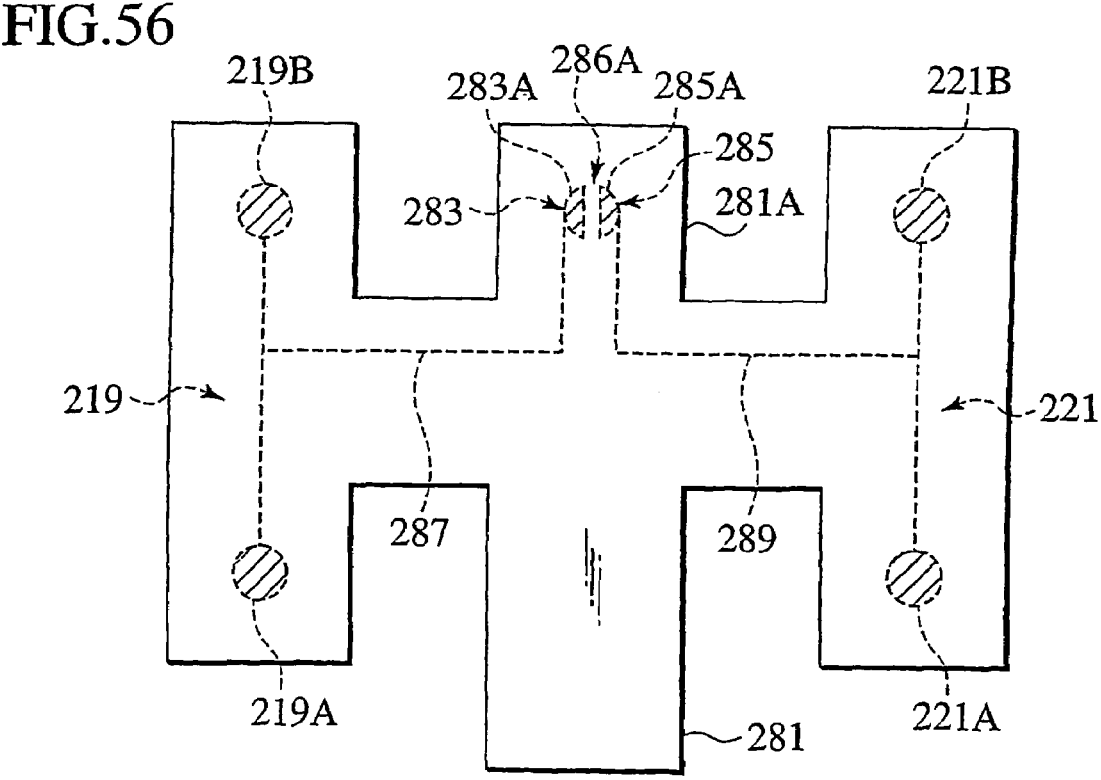
FIG. 56 is a schematic view of the film-form member comprising the seating detection switch according to the fifteenth embodiment.

FIG. 56 is a schematic view of the film-form member 281.

In the same manner as the tenth embodiment, the external form of the film-form member 281 is substantially the same as that of the film-form substrate 277. Accordingly, a protruding part 281A corresponding to the protruding part 277A is formed on the film-form member 281.

In the same manner as applies with respect to the tenth embodiment, the third contact arrangement 219 comprising the contacts 219A and 219B and the fourth contact arrangement 221 comprising the contacts 221A and 221B are disposed on the film-form member 281.

Toward the end part of the protruding part 281A, on the surface of the film-form member 281 facing the film-form substrate 277, are disposed a fifth contact arrangement 283 comprising the appropriate number of contacts 283A disposed substantially apart from the third contact arrangement 219 and the fourth contact arrangement 221, as well as a sixth contact arrangement 285 comprising the appropriate number of contacts 285A disposed corresponding to the fifth contact 283A and slightly apart from those fifth contacts 283A.

The contact 279A comprising the seventh contact arrangement 279 disposed on the film-form substrate 277 is arranged opposing the contact pair 286A comprising the contact 283A of the fifth contact arrangement 283 and the contact 235A of the sixth contact arrangement 285, so as to be able to come into contact with that contact pair.

The contacts 219A and 219B of the third contact arrangement 219 become electrically conductive with the contact 283A of the fifth contact arrangement 283 via a third conductive route 287.

In the same manner, the contacts 221A and 221B of the fourth contact arrangement 221 become electrically conductive with the contact 285A of the sixth contact arrangement 285 via a fourth conduction route 289.

According to the above described configuration, the appropriate contacts of the third contact arrangement 219 become electrically conductive via another contact arrangement (the fifth to seventh contact arrangements 279, 283, 285) with the appropriate contacts of the fourth contact arrangement 221.

Figure 57:
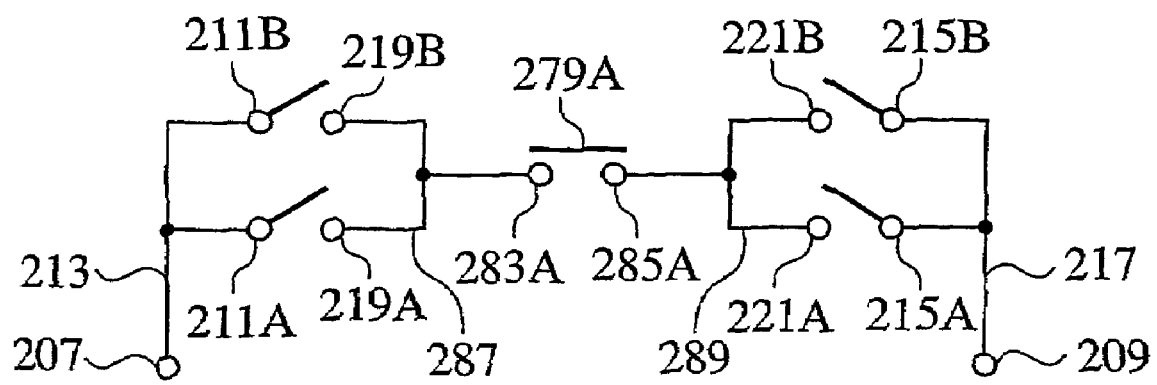
FIG. 57 is a circuit diagram of the seating detection switch according to the fifteenth embodiment.

FIG. 57 is a circuit diagram of the above described seating detection switch 201e.

When the seating detection switch 201e is installed in a seat and a person sits down in that seat the seating detection switch 201e bends. Then, the first terminal 207 becomes electrically conductive with the second terminal 209 enabling the seating of the person to be detected when one contact 211A of the first contact arrangement 211 and one contact 219A of the third contact arrangement 219 come into contact, or the other contact 211B of the first contact arrangement 211 and the other contact 219B of the third contact arrangement 219 come into contact; the contact 283A of the fifth contact arrangement 283 and the contact 285A of the sixth contact arrangement 285 come into contact with the contact 279A of the seventh contact arrangement 279; and one contact 215A of the second contact arrangement 215 and one contact 221A of the fourth contact arrangement 221 come into contact, or the other contact 215B of the second contact arrangement 215 comes into contact with the other contact 221B of the fourth contact arrangement 221.

That is to say, in the case of the seating detection switch 201e, if there is not contact between contact pairs at three locations substantially mutually separated from each other the first terminal 207 does not become electrically conductive with the second terminal 209.

Accordingly, in the same manner as the seating detection switch according to the tenth embodiment, this seating detection switch 201e very effectively enables prevention of erroneous detections of the seating of a person in a seat on which the switch is installed and prevents the occurrence of such erroneous detections to a higher degree.

In respect of the seating detection switches according to the tenth to fifteenth embodiments, those parts of the switch which curve substantially when a passenger sits down in a seat on which the switch is installed may be strengthened in the same manner as the seating detection switch according to the second embodiment.

For example, those parts of the switch devices according to the tenth to fifteenth embodiments that curve substantially may have the spacer and film-form member removed and a thin, insulating resistance layer may be disposed on one of the surfaces of the film-form substrate so as to cover a conduction route disposed thereon, thereby strengthening those parts that curve substantially.

The resistance layer can be formed so as to enter slightly between the spacer and the film-form substrate.

Further, a thin, flexible film-form protective tape may be disposed covering the surface of the resistance layer.

Moreover, those parts of the switch devices according to the tenth to fifteenth embodiments that curve substantially may have the spacer and film-form substrate removed, and a thin, insulating resistance layer may be disposed over one of the surfaces of the film-form member so as to cover a conduction route disposed thereon, thereby strengthening those parts that curve substantially.

The resistance layer can be formed so as to enter slightly between the spacer and the film-form member.

Further a thin, flexible film-form protective tape may be disposed covering the surface of the resistance layer.

Further, those parts of the switch devices related to the tenth to fifteenth embodiments that curve substantially may be provided with a double-sided tape that is thinner than the spacer 304, instead of the spacer 304.

This double-sided tape is formed of a substrate comprising for example, nonwoven fabric having flexibility, impregnated with an adhesive agent, or alternatively, is tape formed simply of an adhesive agent.

The seating detection switches according to the first to fifth embodiments have the effect of enabling easy connection of the terminals of the seating detection switch to the connection terminals such as electric wires or the like provided by a wiring harness or the like.

The seating detection switches according to the sixth to ninth embodiments have the effect that even if the switch curves substantially due to the seating of a passenger in a seat to which the seating detection switch is installed, those parts of the switch that curve substantially do not sustain damage easily.

The seating detection switches according to the tenth to fifteenth embodiments very effectively prevent erroneous detections from occurring.

Each of the embodiments of this invention were described using an example in which the switch is installed on a car seat, however any of the seating detection switches of the embodiments of this invention can be used on a seat of a vehicle other than a car or on a seat other than a vehicle seat, for example an office chair.

This entire contents of Japanese Patent Application No. 2003-141513, filed on May 20th, 2003, are incorporated by reference herein.

While the preferred embodiments of the present invention are shown and described herein, it is to be understood that the same is not so limited but shall cover and include any and all modifications thereof which fall within the scope of the invention.

The invention claimed is:

1. A thin film-form seating detection switch capable of detecting whether or not a passenger is seated in a seat, comprising:
    a film-form substrate made of insulating material;
    a first conductor fixed to one of the surfaces of the film-form substrate, including a first terminal at one end and a first electrode at the other end;
    a second conductor fixed to said one of the surfaces of the film-form substrate including a second terminal at one end and a second electrode at the other end, said second conductor being insulated from said first conductor;
    a film-form member disposed on said one of the surfaces of the film-form substrate, said film-form member being slightly spaced from the film-form substrate via a spacer and substantially parallel to the film-form substrate; and
    a third conductor pair fixed to the surface of the film-form member facing the film-form substrate, and
    a fourth conductor fixed to said one of the surfaces of the film-form substrate including a third electrode corresponding to the first electrode at one end and a fourth electrode corresponding to the second electrode at the other end, said fourth conductor being insulated from said first conductor and second conductor;
    wherein the first and third electrodes and one of the third conductor pair form a first switch portion, the second and fourth electrodes and the other of the third conductor pair form a second switch portion, and the first and second switch portions form an AND circuit,
    wherein when a passenger sits down in a seat on which the seating detection switch is provided, at least one of a part of the film-form substrate and a part of the film-form member bends due to the weight of the passenger, the first and third electrodes become conductive via said one of the third conductor pair, the second and fourth electrodes become conductive via said other of the third conductor pair, and thereby the first electrode and the second electrode enter a condition of mutual conductivity via the third conductor.

2. The seating detection switch according to claim 1, wherein the first terminal and the second terminal are disposed in mutual proximity and the film-form substrate is formed in continuity between said terminals.

3. The seating detection switch according to claim 1 or claim 2, wherein a part of seating detection switch that curves substantially when a passenger sits down in the seat is reinforced.

4. The seating detection switch according to claim 3, wherein the part that curves substantially is reinforced by removing the spacer and the film-form member from the part that curves substantially and providing an insulating, thin resistance layer on the surface of the film-form substrate on which the first and second conductors are disposed so as to cover the first conductor and the second conductor.

5. The seating detection switch according to claim 4, wherein the resistance layer enters in slightly between the spacer and the film-form substrate.

6. The seating detection switch according to claim 4, wherein the surface of the resistance layer is covered with a flexible, thin, film-form protective tape.

7. The seating detection switch according to claim 1, wherein a plurality of first electrodes are formed toward said other end of the first conductor, a plurality of second electrodes corresponding to the plurality of first electrodes are formed toward said other end of the second conductor, a plurality of third conductor pairs are formed on the film-form member corresponding to the first electrodes and the second electrodes, and a plurality of fourth conductors each including a third electrode corresponding to each of the first electrodes and a fourth electrode corresponding to each of the second electrodes, and,
    wherein the first electrodes and the third electrodes and the corresponding third conductor form a plurality of first switches, the second electrodes and the fourth electrodes and the corresponding third conductor form a plurality of second switches, and the first switches and the second switches forms a plurality of AND circuits.

8. The seating detection switch according to claim 7, wherein the plurality of AND circuits forms an OR circuit.

9. The seating detection switch according to claim 7, wherein said one end of the film-form substrate includes a first portion adapted to be disposed on the right half of the seat and a second portion adapted to be disposed on the left half of the seat, and
    wherein at least one of the plurality of AND circuits is formed on the first portion, and at least another one of the plurality of AND circuits is formed on the second portion.

* * * * *